United States Patent
Jia et al.

(10) Patent No.: US 11,916,838 B2
(45) Date of Patent: *Feb. 27, 2024

(54) WIRELESS WAKE-UP PACKET SENDING METHOD AND APPARATUS AND WIRELESS WAKE-UP PACKET RECEIVING METHOD AND APPARATUS

(71) Applicant: HUAWEI TECHNOLOGIES CO., LTD., Guangdong (CN)

(72) Inventors: Jia Jia, Dongguan (CN); Ming Gan, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,701

(22) Filed: Mar. 20, 2023

(65) Prior Publication Data

US 2023/0299926 A1    Sep. 21, 2023

Related U.S. Application Data

(63) Continuation of application No. 16/908,262, filed on Jun. 22, 2020, now Pat. No. 11,637,675, which is a
(Continued)

(30) Foreign Application Priority Data

Dec. 22, 2017   (CN) .......................... 201711409077.4

(51) Int. Cl.
    *H04W 52/02*    (2009.01)
    *H04L 5/00*    (2006.01)
    *H04W 52/52*    (2009.01)

(52) U.S. Cl.
    CPC ....... *H04L 5/0053* (2013.01); *H04W 52/0225* (2013.01); *H04W 52/0274* (2013.01); *H04W 52/52* (2013.01)

(58) Field of Classification Search
    None
    See application file for complete search history.

(56) References Cited

U.S. PATENT DOCUMENTS

| | | |
|---|---|---|
| 2005/0210157 A1 | 9/2005 | Sakoda |
| 2014/0334421 A1 | 11/2014 | Sosa et al. |

(Continued)

FOREIGN PATENT DOCUMENTS

| | | |
|---|---|---|
| CN | 102685860 A | 9/2012 |
| CN | 107360619 A | 11/2017 |

(Continued)

OTHER PUBLICATIONS

Azizi (Intel Corporation), "Simulation Scenario and Evaluation Methodology," IEEE 802.11-17/0188r5, Jan. 2017, 8 pages.

(Continued)

*Primary Examiner* — Kodzovi Acolatse
(74) *Attorney, Agent, or Firm* — Fish & Richardson P.C.

(57) ABSTRACT

A wake-up packet sending method, including: obtaining, by a sending apparatus, a wake-up packet WUP, where the WUP includes a preamble sequence, and
    the preamble sequence includes N consecutive first sequences S, where N is an integer greater than or equal to 2 (for example, [S S]), and the N consecutive first sequences S are used to indicate that a data rate used for the WUP is a first value; or the preamble sequence includes a second sequence M, where the second sequence M is used to indicate that a data rate used for the WUP is a second value; and the second sequence M and the first sequence S are in a bit logical negation
(Continued)

relationship; and sending the WUP, to wake up a main receiver of a receiving apparatus.

20 Claims, 5 Drawing Sheets

Related U.S. Application Data continuation of application No. PCT/CN2018/122940, filed on Dec. 22, 2018.

(56) References Cited

U.S. PATENT DOCUMENTS

| | | | |
|---|---|---|---|
| 2017/0245231 | A1 | 8/2017 | Huang et al. |
| 2019/0037496 | A1 | 1/2019 | Gao |
| 2019/0082385 | A1* | 3/2019 | Shellhammer .......... H04L 47/25 |
| 2019/0141700 | A1 | 5/2019 | Kwak |
| 2019/0174413 | A1* | 6/2019 | Huang .................. H04W 48/12 |
| 2019/0208470 | A1* | 7/2019 | Asterjadhi ........ H04W 52/0229 |
| 2019/0223101 | A1* | 7/2019 | Li .................... H04W 52/0229 |
| 2019/0281548 | A1* | 9/2019 | Kristem ............ H04W 52/0216 |
| 2019/0364555 | A1* | 11/2019 | Huang .................. H04W 72/51 |
| 2020/0092811 | A1 | 3/2020 | Park |
| 2020/0288396 | A1* | 9/2020 | Park ........................ H04L 27/26 |
| 2020/0322889 | A1* | 10/2020 | Chitrakar .......... H04W 52/0235 |
| 2021/0127333 | A1 | 4/2021 | Park |
| 2021/0227469 | A1 | 7/2021 | Kim |

FOREIGN PATENT DOCUMENTS

| | | |
|---|---|---|
| CN | 109729572 A | 5/2019 |
| JP | 2012175534 A | 9/2012 |
| WO | 20110134968 A | 12/2011 |
| WO | 2015076536 A1 | 5/2015 |
| WO | 2016186738 A1 | 11/2016 |

OTHER PUBLICATIONS

Cao et al., "WUR Dual SYNC Design and Performance," IEEE 802.11-17/1618r0, Nov. 6, 2017, 17 pages.

Extended European Search Report issued in European Application No. 18892090.4 dated Dec. 4, 2020, 11 pages.

Huang (Intel), "Specification Framework for TGba," IEEE 802.11-17/0575r6, Nov. 2017, 13 pages.

Huang, "Specification Framework for TGba," IEEE P802.11, Wireless LANs, Dec. 21, 2017, 13 pages.

IEEE P802.11ba/D0.01, "Part 11: Wireless LAN Medium Access Control (MAC) and Physical Layer (PHY) Specifications Amendment 9: Wake-Up Radio Operation," Nov. 2017, 28 pages.

Jia Jia et al., (Huawei), "A Simple WUR Preamble Design," IEEE 802.11-17/1636r0, Nov. 2017, 12 pages.

Office Action issued in Chinese Application No. 201711409077.4 dated Aug. 20, 2021, 9 pages.

Office Action issued in Indian Application No. 202047028059 dated Nov. 11, 2021, 6 pages.

Office Action issued in Korean Application No. 2020-7020493 dated Dec. 10, 2021, 4 pages (with English translation).

Office Action issued in Korean Application No. 2020-7020493 dated Jan. 13, 2021, 10 pages (with English translation).

Park et al., "LP-WUR (Low-Power Wake-Up Receiver) Follow-Up," IEEE 802.11-16/0341r0, Mar. 14, 2016, 9 pages.

Park et al., "WUR SYNC Preamble Design," IEEE 802.11-17/1611r1, Nov. 6, 2017, 20 pages.

PCT International Search Report and Written Opinion issued in International Application No. PCT/CN2018/122940 dated Feb. 28, 2019, 16 pages (with English translation).

Shellhammer et al., (Qualcomm), "Dual Sync Designs," IEEE 802.11-17/1617r1, Nov. 2017, 54 pages.

\* cited by examiner

WIRELESS WAKE-UP PACKET SENDING METHOD AND APPARATUS AND WIRELESS WAKE-UP PACKET RECEIVING METHOD AND APPARATUS

CROSS-REFERENCE TO RELATED APPLICATIONS

This application is U.S. patent application Ser. No. 16/908,262, filed on Jun. 22, 2020, which is a continuation of International Application No. PCT/CN2018/122940, filed on Dec. 22, 2018, which claims priority to Chinese Patent Application No. 201711409077.4, filed on Dec. 22, 2017. All of the afore-mentioned patent applications are hereby incorporated by reference in their entireties.

TECHNICAL FIELD

The present invention relates to the field of wireless communications, and more specifically, to a wireless wake-up packet sending method and apparatus and a wireless wake-up packet receiving method and apparatus.

BACKGROUND

In a short-range wireless communications network, for example, an IEEE802.11 series, that is, a WLAN, or a short-range wireless communications network such as Bluetooth, a feature of low power consumption is gradually discussed widely in the industry. Especially, to meet a development requirement of the Internet of Things (Internet of Things, IoT) based on a short-range wireless communications technology, the feature of low power consumption is particularly important. Based on this case, application of a wake-up receiver (Wake-up Receiver, WUR) can enhance overall power consumption performance of a short-range wireless network.

The WUR is configured to: when a main radio (Main Radio, MR) having a relatively strong communications function sleeps, listen to and receive a wake-up packet (Wake-up Packet, WUP) used to wake up the main radio in a sleep state. When the MR sleeps, power consumption thereof is reduced apparently. However, in this case, a communication connection of the MR is interrupted. A longer sleep time indicates lower overall power consumption. However, only after the device MR wakes up from the sleep state, a communications function of the MR can be completed. Consequently, relatively low power consumption results in a relatively long communication delay. A WUR technology is exactly generated to resolve the contradiction between power consumption and a delay.

SUMMARY

During data transmission of a WUR, a reasonable and effective preamble sequence with high performance is provided for a WUR device, to meet a requirement of the WUR device for simplicity and low power consumption.

A wake-up packet sending method, including: obtaining, by a sending apparatus, a wake-up packet WUP, where the WUP includes a preamble sequence, and the preamble sequence includes N consecutive first sequences S, where N is an integer greater than or equal to 2 (for example, [S S]), and the N consecutive first sequences S are used to indicate that a data rate used for the WUP is a first value; or the preamble sequence includes a second sequence M, where the second sequence M is used to indicate that a data rate used for the WUP is a second value; and the second sequence M and the first sequence S are in a bit logical negation relationship; and sending the WUP, to wake up a main receiver of a receiving apparatus.

According to another aspect, a wake-up packet receiving method, including: receiving, by a receiving apparatus, a data packet; and performing correlation processing on a sequence in the received data packet and a third sequence T stored in the receiving apparatus, and determining that the sequence in the data packet is a wake-up preamble sequence based on a correlation processing result; and determining that the preamble sequence includes N consecutive first sequences S, that is, [S S], or that the preamble sequence includes a second sequence M, where the N consecutive first sequences S are used to indicate that a data rate used for the WUP is a first value, and the second sequence M is used to indicate that a data rate used for the WUP is a second value; the second sequence M and the first sequence are in a bit logical negation relationship; and N is an integer greater than or equal to 2, where T meets one of the following relationships: $T=S*2-1$, $T=[N$ consecutive $Ss]*2-1$, $T=M*2-1$, or $T=[N$ consecutive $Ms]*2-1$.

According to other aspects, a corresponding processing apparatus is provided.

The foregoing method and apparatus have at least one of the following technical effects:

1. A detection success rate is relatively high.
2. A time synchronization feature is relatively desirable.
3. A data rate of a WUP payload part after a WUP preamble can be indicated, for example, is 62.5 kbps or 250 kbps.
4. Overheads are relatively low.
5. These WUP preambles have a simple receiving and processing procedure.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may derive other accompanying drawings from these accompanying drawings without creative efforts.

DESCRIPTION OF EMBODIMENTS

Figure 1:
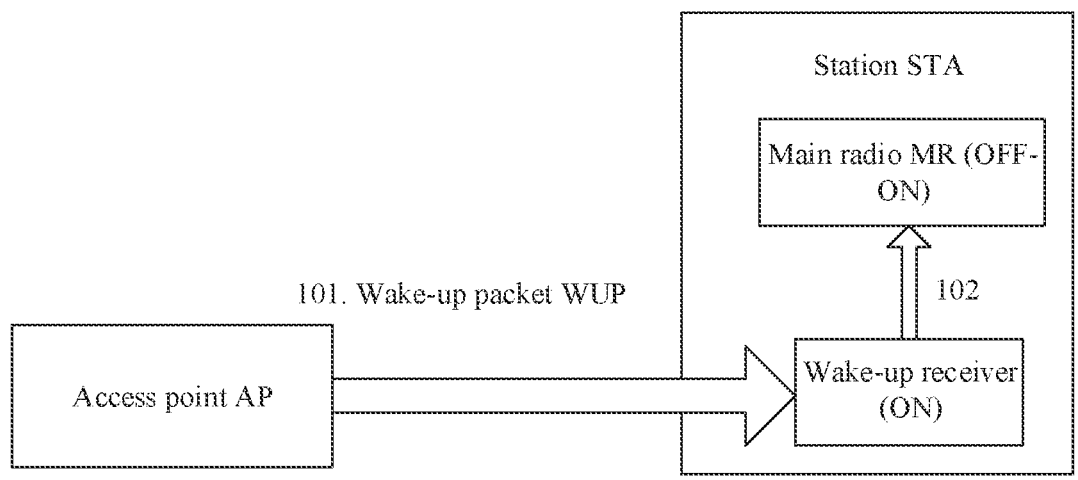
FIG. 1 is a schematic diagram of an application scenario according to an embodiment of the present invention, where a process in which an AP wakes up an MR of a STA by using a WUR is described.

The following clearly and completely describes technical solutions in the embodiments of the present invention with reference to accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The embodiments of the present invention may be applied to various wireless communications systems having a wake-up function, for example, an IoT network or a wireless local area network (Wireless Local Area Network, WLAN). Various implementations may be further applied to a communications system that complies with another standard, for example, a Bluetooth system or a ZigBee system. For a typical application scenario accompanying drawing, refer to FIG. 1.

A system in each implementation includes a sending apparatus and a receiving apparatus. The sending apparatus or the receiving apparatus is, for example, an AP, a legacy station (Legacy STA), an Internet of Things station (IoT STA) in an IEEE 802.11 network, and another device that can be woken up by using a WUR, or the WUR. The Internet of Things station (IoT STA) is an Internet of Things station that uses a technology such as IoT. This new type of station is different from a conventional IEEE 802.11 station because of features such as simple information transmission, low power consumption, low complexity, and low costs thereof. When a wake-up receiver WUR is applied to the WLAN, the AP may be the sending apparatus that sends a wake-up packet, and a non-AP STA may be the receiving apparatus that receives the wake-up packet. Certainly, in another example, the non-AP STA may be the sending apparatus that sends the wake-up packet, and the AP may be the receiving apparatus that receives the wake-up packet. A case in which the AP is a sending apparatus for wake-up is used as an example for description in the following, and is not limited to another possible application scenario.

Using the WLAN as an example, currently, a standard used by the WLAN is an IEEE802.11 series. The WLAN may include a plurality of BSSs, a network node in the BSS is a STA, and the STA includes an access-point AP station and a non-access-point station (non-Access-Point Station, non-AP STA). Each BSS may include one AP and a plurality of non-AP STAs associated with the AP.

The AP may also be referred to as a wireless access point, a hotspot, or the like. The AP is an access point used by a mobile user to access a wired network, and is mainly deployed in a house, inside a building, and inside a campus with a typical coverage radius of tens of meters to hundreds of meters. Certainly, the AP may also be deployed outdoors. The AP is equivalent to a bridge that connects a wired network and a wireless network. A main function of the AP is to connect wireless network clients together, and then connect the wireless network to an Ethernet network. Specifically, the AP may be a terminal device or a network device with a wireless fidelity (Wireless Fidelity, Wi-Fi) chip. Optionally, the AP may be a device that supports an 802.11ax standard, or another possible next-generation standard. Further, optionally, the AP may be a device that supports a plurality of WLAN standards such as 802.11ac, 802.11n, 802.11g, 802.11b, or 802.11a.

The non-AP STA may be a wireless communications chip, a wireless sensor, or a wireless communications terminal, for example, a mobile phone supporting a Wi-Fi communications function, a tablet computer supporting the communications function, a set-top box supporting the Wi-Fi communications function, a smart TV supporting the Wi-Fi communications function, a smart wearable device supporting the Wi-Fi communications function, a vehicle-mounted communications device supporting the Wi-Fi communications function, and a computer supporting the Wi-Fi communications function.

An apparatus in another network system is not described in detail again.

For ease of understanding, some acronyms/abbreviations mentioned in this specification are provided herein.

| English acronym/ abbreviation | Full English expression/Standard English term | Chinese expression/ Chinese term |
|---|---|---|
| WLAN | Wireless local area network | Wireless local area network |
| IoT | Internet of Things | Internet of Things |
| WUR | Wake-up receiver | Wake-up receiver |
| WUP | Wake-up packet | Wake-up packet |
| STA | Station | Station |
| AP | Access point | Access point. |
| MR | Main radio | Main radio |
| AGC | Automatic gain control | Automatic gain control |
| OOK | On-off keying | On-off-keying |

As shown in FIG. 1, a WUR is an independent component added to a main radio MR. When the MR sleeps, the WUR remains in an on state, or is on at a specified time point or within a specified time segment, to listen to and receive a wake-up packet WUP used to wake up the MR associated with the WUR. When the WUP received by the WUR wakes up the MR associated with the WUR, the WUR wakes up the MR by using an internal software/hardware trigger mechanism. In FIG. 1, an access point (Access Point, AP) sends, through an air interface, a WUP carrying a destination identifier, to wake up a station (Station, STA) indicated by the destination identifier. After receiving the WUP, the WUR of the STA finds that the destination identifier in the WUP is consistent with an identifier of the WUR, and therefore starts to wake up the MR associated with the WUR, so that the MR can start to normally exchange data with the AP and perform another communications function.

Compared with the MR, the WUR is only responsible for a function of receiving the WUP and does not need to perform other complex communications with the AP. Therefore, the WUR has advantages such as a simple structure, low costs, and low power consumption. In this way, when the AP does not communicate with the MR, the MR may be set to the sleep state, and the WUR is enabled to work in a listening state, thereby reducing power consumption. When the AP needs to communicate with the MR, the AP sends the WUP, the WUR wakes up the MR of the WUR after receiving the WUP, and then the MR completes a subsequent normal wireless communications process.

A current WUR standardized process (IEEE 802.11ba) has entered a key step of preamble design. An objective is to design a concise and effective preamble with an appropriate length. A typical WUP structure is shown in FIG. 2 (a final structure of a final WUP has not been determined by the IEEE 802.11ba standard, and only an example is used herein to illustrate a basic structure of the WUP).

Figure 2:
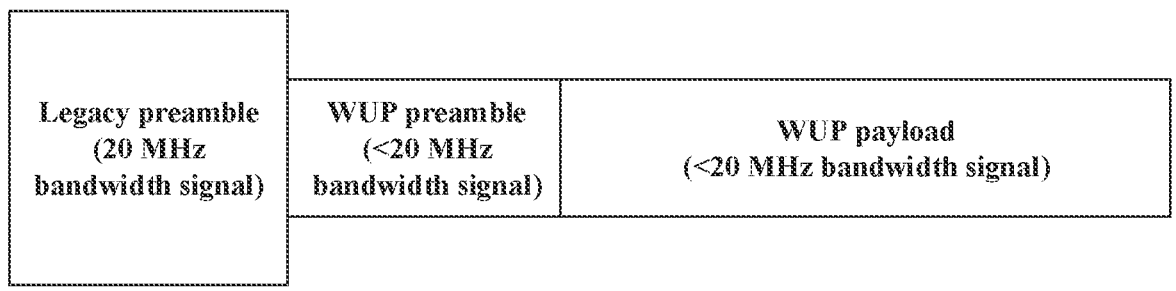
FIG. 2 is a schematic diagram of a basic frame structure of a WUP according to an embodiment of the present invention.

Referring to FIG. 2, after the WUR receives the WUP, a legacy preamble part of the WUP usually uses relatively high bandwidth, and the WUR cannot decode the part, and continues to read subsequent WUP preamble and WUP payload parts. The WUP preamble has a synchronization and automatic gain control (Automatic Gain Control, AGC) adjustment function, so that the WUR can accurately find a start location of the WUP payload, to precisely decode information in the WUP payload. For example, it is proposed in a formulating process of the IEEE 802.11ba standard that the legacy preamble part of the WUP uses 20 MHz, and bandwidths of the WUP preamble and the WUP payload should be less than 20 MHz.

Figure 3:
FIG. 3 illustrates bit information using OOK modulation according to an embodiment of the present invention.

Preferably, the WUP payload may represent bit information by usine a modulation mode of on-off keying (OOK). A basic OOK modulation mode is shown in FIG. 3:

It can be seen from FIG. 3 that in an OOK bit modulation mode, a transmission period of a blank radio signal without energy (indicated by a dashed line) is used to indicate a bit 0, and a transmission period of a radio signal with energy that is sent by a transmitter (indicated by a block) is used to indicate a bit 1. After the modulation mode is used, the WUR may perform bit information demodulation based on an apparatus related to energy detection or envelope detection, thereby greatly reducing receiver demodulation complexity.

In a specific example, the WUP may have at least two WUP payload data rates, for example, 62.5 kbps and 250 kbps in the IEEE 802.11ba standard.

In an implementation, for a system similar to the foregoing wireless communications system, a wake-up preamble sequence with high efficiency performance is provided. a sending apparatus includes the following steps:

101. A sending apparatus obtains a wake-up packet (WUP, Wake-up Packet), where the WUP includes a preamble sequence.

The preamble sequence includes N consecutive first sequences S, for example, [S S], or the preamble sequence includes a second sequence M, where the N consecutive first sequences S are used to indicate that a data rate used for the WUP is a first value, and the second sequence M is used to indicate that a data rate used for the WUP is a second value; the second sequence M and the first sequence are in a bit logical negation relationship; and N is an integer greater than or equal to 2, where T meets one of the following relationships: $T=S*2-1$, $T=[N$ consecutive $Ss]*2-1$, $T=M*2-1$, or $T=[N$ consecutive $Ms]2-1$. Optionally, because there is a unique mapping relationship between the first sequence and the second sequence, optionally, only the first sequence or only the second sequence needs to be stored at a transmit end. Optionally, the transmit end may also simultaneously store the first sequence and the second sequence.

For example, the wake-up packet has a data structure shown in FIG. 2, including a legacy preamble, and a wake-up preamble sequence (WUP preamble).

The first sequence S is used to indicate that the data rate used for the WUP is the first value, and the second sequence M is used to indicate that the data rate used for the WUP is the second value. The second sequence M and the first sequence S are in the bit-logical non-relationship.

102. Send the WUP, to wake up a main receiver of a receiving apparatus.

A quantity of 0 is the same as a quantity of 1 in the sequence in the preamble. The first sequence S, the second sequence M, and a third sequence T used for correlation processing on a receive side (for example, storing, or obtaining and storing) meet one of the following relationships: $T=S*2-1$, $T=[N$ consecutive $Ss]*2-1$, $T=M*2-1$, or $T=[N$ consecutive $Ms]*2-1$.

Specifically, the first sequence S may be one of sequences in the following specific examples, for example, sequences in Table 1 or Table 2.

The sequences in these examples all meet the following conditions: a difference between a first maximum value and a second maximum value in absolute values of results obtained after the first sequence S and the third sequence T are correlated is the largest, a difference between a first maximum value and a second maximum value in absolute values of results after the second sequence M and the third sequence T are correlated is also the largest, and the foregoing sequences also meet a condition that a sum of the foregoing two differences is the largest.

Correspondingly, based on the foregoing wake-up preamble sequence, processing, by the receiving apparatus, the wake-up packet (received signaling) based on a stored sequence to parse and obtain the wake-up packet includes the following steps:

201. The receiving apparatus receives a data packet.

Specifically, the receiving apparatus does not know a specific structure of the data. packet. A standard followed by the data packet may be learned by detecting a legacy preamble, and more information such as information in 202 and 203 may be obtained by detecting a sequence following the legacy preamble.

202. Perform correlation processing on a sequence in the received data packet and a third sequence T stored in the receiving apparatus. A specific related technology is not limited, and details are not described again.

203. Determine that the sequence in the data packet is a wake-up preamble sequence based on a correlation processing result, and determine that the preamble sequence includes N consecutive first sequences S, or that the preamble sequence includes a second sequence M, where the N consecutive first sequences S are used to indicate that a data rate used for the WUP is a first value, and the second sequence M is used to indicate that a data rate used for the WUP is a second value; the second sequence M and the first sequence are in a bit logical negation relationship; and N is an integer greater than or equal to 2, where T meets one of the following relationships: $T=S*2-1$, $T=[N$ consecutive $Ss]*2-1$, $T=M*2-1$, or $T=[N$ consecutive $Ms]*2-1$.

Preferably, N is 2.

Specifically, the third sequence T is one of sequences provided in various examples. Optionally, the third sequence T may be permanently stored in the receiving apparatus. Optionally, because the first sequence S, the second sequence M, and the third sequence T meet the foregoing relationship, S or M may alternatively be permanently stored at the receiving apparatus. When performing the correlation processing, T is first obtained based on S or M and T is temporarily stored, and then, the correlation processing is performed based on T.

Figure 4:
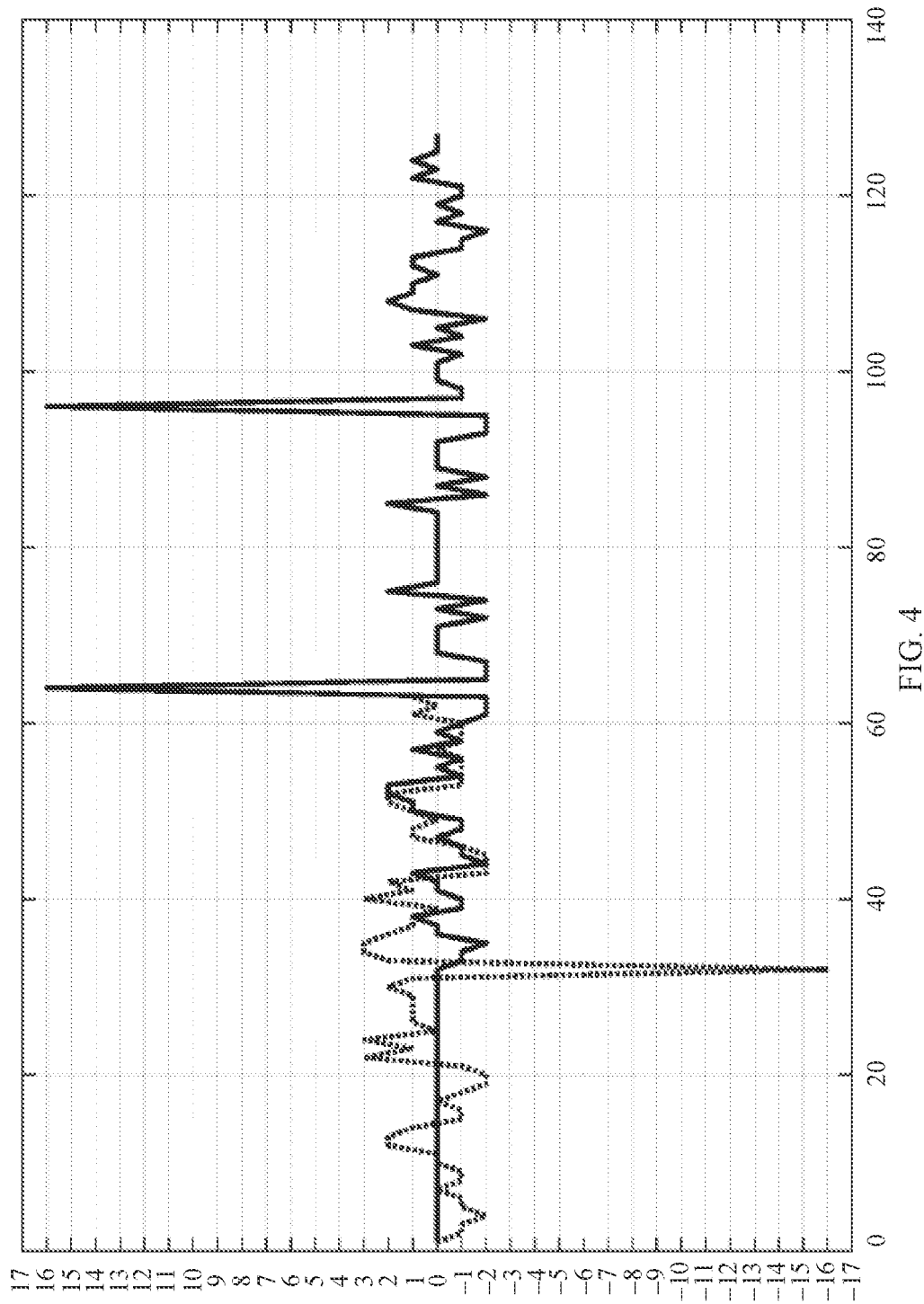
FIG. 4 is a schematic diagram of a correlation value calculated by using expressions (4) and (5) in a sequence 167 in Table 1 according to an embodiment of the present invention.

Specifically, step 203 includes but is not limited to:

when any one of absolute values or a maximum value of the absolute values in the correlation result is greater than or equal to a threshold, determining that the wake-up preamble sequence (WUP Preamble) is correctly detected; and determining whether a value whose absolute value is maximum is a positive value or a negative value, determining that the N consecutive first sequences S are received when the value is a positive value, and determining that the second sequence M is received when the value is a negative value. Referring to subsequent FIG. 4, a value whose absolute value is maximum in the correlation result is usually referred to as a peak. Generally, whether the WUP preamble is detected is determined depending on whether an absolute value of the peak reaches the threshold, and then information indicated by the WUP preamble is determined depending on whether the peak is a positive value or a negative value. In FIG. 4, a peak above a horizontal axis is a positive value, and a peak below the horizontal axis is a negative value.

The WUP preamble in the foregoing implementation has at least one of the following technical effects:

1. The WUP preamble has a relatively high detection success rate and may be easily detected by a WUR, so that a WUR precisely identifies whether a currently received packet is a WUP.

2. A time synchronization feature is relatively desirable. That is, after determining that the packet is the WUP, the WUR can precisely detect a start time of a data part, that is, a WUR payload.

3. A data rate of the WUP payload part after the WUP preamble may be indicated, for example, is 62.5 kbps or 250 kbps.

4. Overheads are relatively low. Generally, a good detection rate and precise time synchronization usually require a relatively long preamble, but an excessively long preamble causes high air interface overheads, increasing overall network load. The WUP preambles in various implementations very desirably balance performance and overheads.

5. The WUP preambles have a simple receiving and processing procedure. Because the WUR is a relatively simple electronic device with low power consumption and weak performance, a signal processing capability of the WUR is limited. Structures and detection manners of the WUP preambles are relatively simple, and can be well adapted to the WUR.

Example 1 of the first sequence S, the second sequence M, and the third sequence T A length of the first sequence S is 32 bits, and the first column in Table 1 indicates a number of a sequence and is merely used for ease of description. Table 1 includes a plurality of sequences, and any one of the sequences may be the first sequence S described above.

TABLE 1

| Number of a sequence | S(n) sequence of 32 bits |
|---|---|
| 1 | 0 0 0 0 1 0 1 1 1 1 1 0 1 0 1 0 0 1 1 |
| 2 | 0 0 0 0 1 1 0 1 1 0 1 1 1 1 0 0 1 0 0 |
| 3 | 0 0 0 0 1 1 0 1 1 1 0 1 0 1 0 1 1 1 0 |
| 4 | 0 0 0 0 1 1 1 0 1 1 1 0 1 0 1 0 1 1 0 |
| 5 | 0 0 0 0 1 1 1 1 0 0 1 0 1 1 0 1 0 1 0 |
| 6 | 0 0 0 0 1 1 1 1 1 0 0 1 1 0 0 0 1 1 0 |
| 7 | 0 0 0 0 1 1 1 1 1 0 1 0 1 0 1 0 1 1 0 |
| 8 | 0 0 0 1 0 1 0 1 1 0 1 1 1 0 1 0 1 0 0 |
| 9 | 0 0 0 1 0 1 0 1 1 1 1 0 1 1 0 1 0 0 1 |
| 10 | 0 0 0 1 0 1 0 1 1 1 1 0 1 1 0 1 1 0 0 |
| 11 | 0 0 0 1 0 1 1 0 1 0 0 1 1 1 1 1 1 0 0 |
| 12 | 0 0 0 1 0 1 1 0 1 0 1 1 0 1 1 1 0 1 1 |
| 13 | 0 0 0 1 0 1 1 0 1 1 1 1 0 1 0 1 0 0 0 |
| 14 | 0 0 0 1 0 1 1 1 0 0 1 1 1 1 1 0 0 0 0 |
| 15 | 0 0 0 1 0 1 1 1 0 1 0 1 0 0 1 0 1 0 0 |
| 16 | 0 0 0 1 0 1 1 1 0 1 0 1 1 0 1 0 1 1 0 |
| 17 | 0 0 0 1 0 1 1 1 1 0 1 0 1 0 0 1 0 0 1 |
| 18 | 0 0 0 1 0 1 1 1 1 0 1 0 1 0 0 1 1 0 1 |
| 19 | 0 0 0 1 0 1 1 1 1 0 1 0 1 1 0 0 0 1 1 |
| 20 | 0 0 0 1 0 1 1 1 1 0 1 0 1 1 0 1 0 0 1 |
| 21 | 0 0 0 1 0 1 1 1 1 1 0 0 0 1 0 0 1 1 |
| 22 | 0 0 0 1 1 0 0 1 1 0 1 1 0 1 1 1 1 0 0 |
| 23 | 0 0 0 1 1 0 0 1 1 0 1 1 1 1 0 0 0 0 1 |
| 24 | 0 0 0 1 1 0 0 1 1 1 0 1 1 0 1 0 1 1 0 |
| 25 | 0 0 0 1 1 0 1 1 0 0 1 1 0 1 0 1 0 1 0 |
| 26 | 0 0 0 1 1 0 1 1 0 0 1 1 1 1 0 0 1 0 1 |
| 27 | 0 0 0 1 1 0 1 1 0 1 0 1 0 0 1 1 1 0 0 |
| 28 | 0 0 0 1 1 0 1 1 0 1 0 1 0 1 0 1 0 0 1 |
| 29 | 0 0 0 1 1 0 1 1 0 1 1 0 1 1 1 0 0 0 1 |
| 30 | 0 0 0 1 1 0 1 1 0 1 1 1 0 0 1 0 0 0 0 |
| 31 | 0 0 0 1 1 0 1 1 1 0 0 1 0 1 0 1 1 1 0 |
| 32 | 0 0 0 1 1 1 0 0 1 1 1 0 1 0 0 1 1 1 0 |
| 33 | 0 0 0 1 1 1 0 1 0 1 1 0 0 1 0 1 1 0 1 |
| 34 | 0 0 0 1 1 1 1 0 0 0 1 0 1 0 1 1 1 0 1 |
| 35 | 0 0 0 1 1 1 1 0 1 0 0 1 1 1 0 1 1 0 0 |
| 36 | 0 0 0 1 1 1 1 0 1 1 0 0 0 1 1 0 0 0 1 |
| 37 | 0 0 0 1 1 1 1 1 0 1 0 1 0 0 1 0 0 0 1 |
| 38 | 0 0 1 0 0 0 1 1 1 0 1 1 0 1 1 1 1 0 0 |
| 39 | 0 0 1 0 0 0 1 0 1 0 1 1 0 1 1 0 1 1 0 |
| 40 | 0 0 1 0 0 1 0 1 1 0 0 1 0 1 0 1 1 1 1 |
| 41 | 0 0 1 0 0 1 1 0 0 1 1 1 1 0 0 0 1 0 0 |
| 42 | 0 0 1 0 0 1 0 1 1 1 0 1 1 1 0 1 0 0 0 |
| 43 | 0 0 1 0 0 1 1 0 0 1 0 1 0 0 0 0 1 1 |
| 44 | 0 0 1 0 0 1 1 0 0 1 0 1 1 1 1 0 0 0 0 |
| 45 | 0 0 1 0 0 1 1 1 1 0 0 0 1 1 0 0 1 1 |
| 46 | 0 0 1 0 0 1 1 1 1 1 0 0 0 1 0 1 1 0 1 |
| 47 | 0 0 1 0 1 0 0 1 1 1 0 1 0 1 0 0 1 0 0 |
| 48 | 0 0 1 0 1 0 0 1 1 1 0 1 1 1 0 1 1 1 0 |
| 49 | 0 0 1 0 1 0 1 0 1 0 1 0 1 0 1 0 1 1 1 |

TABLE 1-continued

| # | | | | | | | | | | | | | | | | | | | |
|---|---|---|---|---|---|---|---|---|---|---|---|---|---|---|---|---|---|---|---|
| 50 | 0 | 0 | 1 | 0 | 1 | 0 | 1 | 0 | 1 | 1 | 0 | 1 | 1 | 0 | 1 | 1 | 0 | 0 | 0 |
| 51 | 0 | 0 | 1 | 0 | 1 | 0 | 1 | 0 | 1 | 1 | 1 | 1 | 0 | 0 | 0 | 0 | 1 | 1 | 0 |
| 52 | 0 | 0 | 1 | 0 | 1 | 0 | 1 | 0 | 1 | 1 | 1 | 1 | 1 | 0 | 0 | 1 | 0 | 0 | 1 |
| 53 | 0 | 0 | 1 | 0 | 1 | 0 | 1 | 1 | 1 | 0 | 1 | 0 | 0 | 1 | 0 | 1 | 0 | 0 | 1 |
| 54 | 0 | 0 | 1 | 0 | 1 | 1 | 0 | 1 | 0 | 1 | 1 | 1 | 0 | 0 | 0 | 0 | 1 | 0 | 1 |
| 55 | 0 | 0 | 1 | 0 | 1 | 1 | 0 | 1 | 1 | 0 | 1 | 0 | 1 | 0 | 1 | 1 | 1 | 0 | 0 |
| 56 | 0 | 0 | 1 | 0 | 1 | 1 | 0 | 1 | 1 | 1 | 1 | 1 | 0 | 1 | 0 | 1 | 0 | 0 | 0 |
| 57 | 0 | 0 | 1 | 0 | 1 | 1 | 1 | 0 | 1 | 0 | 0 | 0 | 1 | 0 | 1 | 1 | 0 | 1 | 0 |
| 58 | 0 | 0 | 1 | 0 | 1 | 1 | 1 | 0 | 1 | 0 | 0 | 1 | 0 | 0 | 0 | 1 | 1 | 0 | 1 |
| 59 | 0 | 0 | 1 | 0 | 1 | 1 | 1 | 0 | 1 | 0 | 1 | 0 | 0 | 1 | 0 | 1 | 0 | 0 | 1 |
| 60 | 0 | 0 | 1 | 0 | 1 | 1 | 1 | 0 | 1 | 1 | 0 | 1 | 1 | 1 | 0 | 1 | 0 | 0 | 0 |
| 61 | 0 | 0 | 1 | 1 | 0 | 0 | 0 | 1 | 1 | 0 | 1 | 1 | 1 | 1 | 1 | 0 | 1 | 0 | 0 |
| 62 | 0 | 0 | 1 | 1 | 0 | 0 | 1 | 0 | 0 | 0 | 1 | 0 | 1 | 1 | 1 | 1 | 1 | 1 | 0 |
| 63 | 0 | 0 | 1 | 1 | 0 | 0 | 1 | 0 | 0 | 1 | 1 | 1 | 1 | 1 | 0 | 0 | 1 | 0 | 1 |
| 64 | 0 | 0 | 1 | 1 | 0 | 0 | 1 | 0 | 1 | 1 | 1 | 0 | 0 | 1 | 0 | 1 | 0 | 1 | 0 |
| 65 | 0 | 0 | 1 | 1 | 0 | 0 | 1 | 1 | 0 | 1 | 1 | 0 | 0 | 0 | 0 | 0 | 1 | 0 | 1 |
| 66 | 0 | 0 | 1 | 1 | 0 | 0 | 1 | 1 | 0 | 1 | 1 | 0 | 0 | 1 | 0 | 1 | 1 | 0 | 1 |
| 67 | 0 | 0 | 1 | 1 | 0 | 0 | 1 | 1 | 0 | 1 | 1 | 0 | 1 | 1 | 1 | 1 | 0 | 0 | 0 |
| 68 | 0 | 0 | 1 | 1 | 0 | 0 | 1 | 1 | 1 | 0 | 0 | 1 | 0 | 0 | 1 | 0 | 0 | 1 | 1 |
| 69 | 0 | 0 | 1 | 1 | 0 | 0 | 1 | 1 | 1 | 0 | 0 | 0 | 0 | 0 | 1 | 1 | 1 | 0 | 1 |
| 70 | 0 | 0 | 1 | 1 | 0 | 0 | 1 | 1 | 1 | 1 | 0 | 0 | 0 | 1 | 0 | 1 | 0 | 0 | 1 |
| 71 | 0 | 0 | 1 | 1 | 0 | 1 | 0 | 0 | 1 | 0 | 0 | 1 | 1 | 1 | 1 | 1 | 1 | 0 | 1 |
| 72 | 0 | 0 | 1 | 1 | 0 | 1 | 0 | 1 | 0 | 1 | 0 | 1 | 0 | 0 | 0 | 0 | 1 | 1 | 1 |
| 73 | 0 | 0 | 1 | 1 | 0 | 1 | 0 | 1 | 1 | 0 | 1 | 0 | 1 | 1 | 1 | 0 | 1 | 0 | 0 |
| 74 | 0 | 0 | 1 | 1 | 0 | 1 | 1 | 0 | 0 | 1 | 1 | 0 | 0 | 0 | 1 | 1 | 0 | 1 | 0 |
| 75 | 0 | 0 | 1 | 1 | 0 | 1 | 1 | 0 | 0 | 1 | 1 | 1 | 0 | 0 | 1 | 0 | 1 | 1 | 0 |
| 76 | 0 | 0 | 1 | 1 | 0 | 1 | 1 | 0 | 1 | 0 | 0 | 1 | 0 | 1 | 0 | 1 | 0 | 1 | 0 |
| 77 | 0 | 0 | 1 | 1 | 0 | 1 | 1 | 0 | 1 | 0 | 1 | 0 | 1 | 1 | 0 | 1 | 1 | 0 | 0 |
| 78 | 0 | 0 | 1 | 1 | 0 | 1 | 1 | 0 | 1 | 0 | 0 | 1 | 0 | 1 | 0 | 0 | 0 | 1 | 0 |
| 79 | 0 | 0 | 1 | 1 | 0 | 1 | 1 | 1 | 1 | 0 | 0 | 1 | 0 | 1 | 1 | 1 | 0 | 0 | 0 |
| 80 | 0 | 0 | 1 | 1 | 1 | 0 | 0 | 0 | 1 | 1 | 0 | 1 | 0 | 0 | 1 | 0 | 1 | 1 | 1 |
| 81 | 0 | 0 | 1 | 1 | 1 | 1 | 0 | 0 | 0 | 0 | 1 | 0 | 0 | 1 | 1 | 1 | 0 | 1 | 1 |
| 82 | 0 | 0 | 1 | 1 | 1 | 1 | 0 | 0 | 0 | 1 | 0 | 1 | 0 | 1 | 1 | 1 | 1 | 0 | 1 |
| 83 | 0 | 0 | 1 | 1 | 1 | 1 | 0 | 0 | 0 | 0 | 1 | 1 | 0 | 1 | 1 | 1 | 0 | 0 | 1 |
| 84 | 0 | 0 | 1 | 1 | 1 | 1 | 0 | 0 | 0 | 0 | 1 | 1 | 0 | 1 | 1 | 1 | 1 | 0 | 0 |
| 85 | 0 | 0 | 1 | 1 | 1 | 1 | 0 | 0 | 0 | 1 | 0 | 0 | 0 | 1 | 1 | 0 | 1 | 1 | 1 |
| 86 | 0 | 1 | 0 | 0 | 0 | 1 | 1 | 1 | 0 | 0 | 1 | 1 | 0 | 1 | 0 | 1 | 1 | 0 | 1 |
| 87 | 0 | 1 | 0 | 0 | 0 | 1 | 1 | 1 | 0 | 1 | 0 | 1 | 1 | 1 | 1 | 0 | 0 | 0 | 1 |
| 88 | 0 | 1 | 0 | 0 | 1 | 0 | 1 | 0 | 1 | 1 | 1 | 0 | 0 | 1 | 1 | 1 | 1 | 0 | 1 |
| 89 | 0 | 1 | 0 | 0 | 1 | 0 | 0 | 1 | 0 | 1 | 1 | 1 | 0 | 1 | 1 | 1 | 0 | 1 | 1 |
| 90 | 0 | 1 | 0 | 0 | 1 | 0 | 0 | 1 | 1 | 0 | 0 | 1 | 1 | 1 | 0 | 1 | 1 | 1 | 0 |
| 91 | 0 | 1 | 0 | 0 | 1 | 0 | 1 | 0 | 1 | 1 | 1 | 1 | 1 | 1 | 1 | 0 | 0 | 0 | 1 |
| 92 | 0 | 1 | 0 | 0 | 1 | 0 | 1 | 0 | 1 | 1 | 1 | 0 | 1 | 1 | 0 | 1 | 1 | 0 | 0 |
| 93 | 0 | 1 | 0 | 0 | 1 | 1 | 0 | 0 | 1 | 1 | 1 | 0 | 0 | 0 | 0 | 1 | 1 | 1 | 0 |
| 94 | 0 | 1 | 0 | 0 | 1 | 1 | 1 | 0 | 1 | 0 | 1 | 0 | 1 | 1 | 0 | 0 | 0 | 0 | 1 |
| 95 | 0 | 1 | 0 | 1 | 0 | 0 | 0 | 1 | 0 | 1 | 1 | 1 | 0 | 1 | 0 | 1 | 1 | 1 | 0 |
| 96 | 0 | 1 | 0 | 1 | 0 | 0 | 0 | 1 | 1 | 0 | 1 | 1 | 0 | 1 | 0 | 0 | 0 | 1 | 1 |
| 97 | 0 | 1 | 0 | 1 | 0 | 0 | 0 | 1 | 1 | 1 | 0 | 0 | 1 | 0 | 1 | 1 | 0 | 0 | 1 |
| 98 | 0 | 1 | 0 | 1 | 0 | 0 | 1 | 1 | 0 | 1 | 0 | 0 | 1 | 0 | 0 | 0 | 1 | 1 | 1 |
| 99 | 0 | 1 | 0 | 1 | 0 | 1 | 0 | 0 | 0 | 0 | 1 | 1 | 1 | 1 | 1 | 0 | 0 | 1 | 1 |
| 100 | 0 | 1 | 0 | 1 | 0 | 1 | 0 | 0 | 1 | 0 | 0 | 1 | 0 | 1 | 1 | 1 | 1 | 1 | 0 |
| 101 | 0 | 1 | 0 | 1 | 0 | 1 | 0 | 0 | 1 | 0 | 0 | 1 | 1 | 0 | 0 | 1 | 1 | 1 | 1 |
| 102 | 0 | 1 | 0 | 1 | 0 | 1 | 0 | 1 | 0 | 0 | 1 | 1 | 1 | 1 | 1 | 0 | 0 | 1 | 0 |
| 103 | 0 | 1 | 0 | 1 | 0 | 1 | 0 | 1 | 0 | 1 | 0 | 1 | 1 | 1 | 1 | 1 | 0 | 0 | 0 |
| 104 | 0 | 1 | 0 | 1 | 0 | 1 | 0 | 1 | 1 | 0 | 1 | 0 | 1 | 1 | 0 | 1 | 0 | 0 | 0 |
| 105 | 0 | 1 | 0 | 1 | 0 | 1 | 1 | 1 | 1 | 0 | 0 | 0 | 0 | 1 | 0 | 1 | 1 | 0 | 1 |
| 106 | 0 | 1 | 0 | 1 | 1 | 0 | 0 | 1 | 1 | 0 | 1 | 0 | 0 | 0 | 1 | 1 | 0 | 1 | 0 |
| 107 | 0 | 1 | 0 | 1 | 1 | 1 | 0 | 0 | 0 | 0 | 0 | 1 | 1 | 1 | 0 | 1 | 1 | 1 | 0 |
| 108 | 0 | 1 | 0 | 1 | 1 | 1 | 0 | 0 | 1 | 0 | 0 | 0 | 0 | 1 | 0 | 1 | 1 | 0 | 1 |
| 109 | 0 | 1 | 0 | 1 | 1 | 1 | 0 | 0 | 1 | 1 | 0 | 0 | 1 | 0 | 0 | 1 | 0 | 1 | 1 |
| 110 | 0 | 1 | 1 | 0 | 0 | 0 | 0 | 1 | 1 | 1 | 0 | 1 | 1 | 0 | 0 | 1 | 0 | 1 | 0 |
| 111 | 0 | 1 | 1 | 0 | 0 | 0 | 1 | 0 | 0 | 1 | 1 | 1 | 0 | 0 | 0 | 0 | 1 | 0 | 1 |
| 112 | 0 | 1 | 1 | 0 | 0 | 0 | 1 | 0 | 1 | 1 | 1 | 1 | 0 | 1 | 1 | 1 | 0 | 0 | 1 |
| 113 | 0 | 1 | 1 | 0 | 0 | 0 | 1 | 0 | 1 | 0 | 1 | 0 | 0 | 1 | 0 | 1 | 1 | 1 | 1 |
| 114 | 0 | 1 | 1 | 0 | 0 | 1 | 0 | 0 | 1 | 0 | 1 | 1 | 1 | 1 | 1 | 0 | 1 | 0 | 0 |
| 115 | 0 | 1 | 1 | 0 | 0 | 1 | 0 | 0 | 0 | 1 | 1 | 1 | 0 | 1 | 1 | 0 | 0 | 0 | 0 |
| 116 | 0 | 1 | 1 | 0 | 0 | 1 | 0 | 0 | 1 | 0 | 1 | 1 | 1 | 0 | 1 | 0 | 1 | 1 | 1 |
| 117 | 0 | 1 | 1 | 0 | 0 | 1 | 0 | 0 | 1 | 1 | 0 | 0 | 1 | 0 | 1 | 1 | 1 | 0 | 0 |
| 118 | 0 | 1 | 1 | 0 | 0 | 1 | 0 | 1 | 0 | 0 | 1 | 1 | 0 | 1 | 1 | 0 | 0 | 0 | 1 |
| 119 | 0 | 1 | 1 | 0 | 0 | 1 | 0 | 1 | 0 | 1 | 1 | 1 | 0 | 0 | 0 | 1 | 0 | 1 | 0 |
| 120 | 0 | 1 | 1 | 0 | 0 | 1 | 0 | 1 | 0 | 1 | 0 | 1 | 1 | 1 | 0 | 0 | 1 | 0 | 0 |
| 121 | 0 | 1 | 1 | 0 | 0 | 1 | 0 | 1 | 1 | 1 | 0 | 1 | 0 | 0 | 1 | 1 | 1 | 0 | 0 |
| 122 | 0 | 1 | 1 | 0 | 0 | 1 | 1 | 0 | 0 | 0 | 1 | 1 | 0 | 1 | 0 | 1 | 0 | 1 | 0 |
| 123 | 0 | 1 | 1 | 0 | 0 | 1 | 1 | 0 | 1 | 0 | 1 | 0 | 1 | 1 | 0 | 0 | 1 | 0 | 1 |
| 124 | 0 | 1 | 1 | 0 | 0 | 1 | 1 | 0 | 1 | 1 | 1 | 0 | 1 | 1 | 1 | 1 | 0 | 0 | 0 |
| 125 | 0 | 1 | 1 | 0 | 0 | 1 | 1 | 0 | 0 | 1 | 0 | 1 | 1 | 1 | 1 | 0 | 0 | 0 | 0 |
| 126 | 0 | 1 | 1 | 0 | 0 | 1 | 1 | 0 | 0 | 1 | 1 | 0 | 1 | 0 | 1 | 0 | 1 | 0 | 1 |
| 127 | 0 | 1 | 1 | 0 | 0 | 1 | 1 | 0 | 1 | 1 | 0 | 0 | 0 | 0 | 1 | 0 | 1 | 1 | 1 |
| 128 | 0 | 1 | 1 | 0 | 1 | 0 | 0 | 0 | 1 | 1 | 0 | 1 | 0 | 0 | 0 | 1 | 0 | 1 | 1 |
| 129 | 0 | 1 | 1 | 0 | 1 | 0 | 0 | 1 | 1 | 1 | 0 | 0 | 0 | 1 | 1 | 0 | 0 | 1 | 0 |

TABLE 1-continued

| | | | | | | | | | | | | | | | | | | | |
|---|---|---|---|---|---|---|---|---|---|---|---|---|---|---|---|---|---|---|---|
| 130 | 0 | 1 | 1 | 0 | 1 | 0 | 1 | 0 | 1 | 0 | 1 | 0 | 0 | 0 | 0 | 1 | 1 | 1 | 1 |
| 131 | 0 | 1 | 1 | 0 | 1 | 0 | 1 | 0 | 1 | 1 | 1 | 0 | 0 | 1 | 0 | 0 | 1 | 1 | 0 |
| 132 | 0 | 1 | 1 | 0 | 1 | 0 | 1 | 1 | 0 | 1 | 0 | 1 | 1 | 1 | 0 | 1 | 0 | 0 | 0 |
| 133 | 0 | 1 | 1 | 0 | 1 | 1 | 0 | 0 | 1 | 1 | 0 | 0 | 0 | 0 | 1 | 1 | 0 | 1 | 0 |
| 134 | 0 | 1 | 1 | 1 | 0 | 0 | 1 | 0 | 0 | 0 | 0 | 1 | 1 | 0 | 1 | 1 | 0 | 1 | 1 |
| 135 | 0 | 1 | 1 | 1 | 1 | 0 | 1 | 0 | 0 | 0 | 0 | 1 | 0 | 0 | 1 | 1 | 0 | 0 | 1 |
| 136 | 0 | 1 | 1 | 1 | 1 | 0 | 1 | 0 | 0 | 1 | 0 | 1 | 0 | 0 | 0 | 0 | 0 | 0 | 1 |
| 137 | 0 | 1 | 1 | 1 | 1 | 1 | 0 | 0 | 1 | 0 | 0 | 0 | 0 | 0 | 1 | 1 | 0 | 1 | 0 |
| 138 | 1 | 0 | 0 | 0 | 0 | 0 | 1 | 1 | 0 | 1 | 1 | 1 | 1 | 1 | 0 | 0 | 1 | 0 | 1 |
| 139 | 1 | 0 | 0 | 0 | 0 | 1 | 0 | 1 | 1 | 0 | 1 | 0 | 1 | 1 | 1 | 1 | 1 | 1 | 0 |
| 140 | 1 | 0 | 0 | 0 | 0 | 1 | 0 | 1 | 1 | 1 | 1 | 0 | 1 | 1 | 0 | 0 | 1 | 1 | 0 |
| 141 | 1 | 0 | 0 | 0 | 0 | 1 | 1 | 0 | 1 | 0 | 1 | 0 | 1 | 1 | 0 | 0 | 0 | 1 | 1 |
| 142 | 1 | 0 | 0 | 0 | 0 | 1 | 1 | 0 | 1 | 0 | 1 | 1 | 0 | 0 | 0 | 0 | 1 | 0 | 1 |
| 143 | 1 | 0 | 0 | 0 | 0 | 1 | 1 | 0 | 1 | 1 | 1 | 0 | 0 | 0 | 0 | 1 | 1 | 0 | 1 |
| 144 | 1 | 0 | 0 | 0 | 0 | 1 | 1 | 0 | 1 | 1 | 1 | 1 | 0 | 0 | 1 | 0 | 1 | 0 | 1 |
| 145 | 1 | 0 | 0 | 0 | 0 | 1 | 1 | 1 | 1 | 1 | 0 | 0 | 1 | 0 | 0 | 0 | 1 | 1 | 0 |
| 146 | 1 | 0 | 0 | 0 | 0 | 1 | 1 | 1 | 1 | 0 | 0 | 1 | 1 | 1 | 0 | 1 | 1 | 0 | 0 |
| 147 | 1 | 0 | 0 | 0 | 1 | 0 | 0 | 1 | 1 | 1 | 1 | 0 | 0 | 0 | 0 | 1 | 1 | 0 | 1 |
| 148 | 1 | 0 | 0 | 0 | 1 | 1 | 0 | 0 | 1 | 0 | 1 | 0 | 1 | 1 | 0 | 1 | 0 | 0 | 1 |
| 149 | 1 | 0 | 0 | 0 | 1 | 1 | 1 | 0 | 0 | 0 | 1 | 0 | 0 | 1 | 1 | 0 | 1 | 1 | 1 |
| 150 | 1 | 0 | 0 | 1 | 0 | 0 | 1 | 0 | 1 | 0 | 1 | 0 | 1 | 1 | 0 | 1 | 1 | 1 | 0 |
| 151 | 1 | 0 | 0 | 1 | 0 | 0 | 1 | 1 | 1 | 1 | 1 | 0 | 0 | 1 | 0 | 0 | 0 | 0 | 1 |
| 152 | 1 | 0 | 0 | 1 | 0 | 1 | 0 | 0 | 1 | 1 | 1 | 0 | 0 | 0 | 0 | 1 | 0 | 1 | 1 |
| 153 | 1 | 0 | 0 | 1 | 0 | 1 | 0 | 0 | 1 | 1 | 1 | 0 | 1 | 0 | 1 | 0 | 0 | 0 | 1 |
| 154 | 1 | 0 | 0 | 1 | 0 | 1 | 0 | 1 | 0 | 1 | 1 | 0 | 0 | 0 | 0 | 1 | 1 | 1 | 0 |
| 155 | 1 | 0 | 0 | 1 | 0 | 1 | 0 | 1 | 0 | 1 | 1 | 0 | 0 | 0 | 0 | 1 | 1 | 1 | 1 |
| 156 | 1 | 0 | 0 | 1 | 0 | 1 | 0 | 1 | 0 | 1 | 1 | 0 | 0 | 0 | 0 | 1 | 1 | 1 | 1 |
| 157 | 1 | 0 | 0 | 1 | 0 | 1 | 0 | 1 | 0 | 1 | 1 | 0 | 1 | 1 | 1 | 0 | 0 | 1 | 1 |
| 158 | 1 | 0 | 0 | 1 | 1 | 0 | 0 | 1 | 0 | 1 | 1 | 0 | 0 | 0 | 1 | 1 | 0 | 0 | 1 |
| 159 | 1 | 0 | 0 | 1 | 1 | 0 | 0 | 1 | 1 | 1 | 0 | 0 | 0 | 0 | 1 | 1 | 1 | 1 | 1 |
| 160 | 1 | 0 | 0 | 1 | 1 | 0 | 1 | 0 | 0 | 0 | 1 | 0 | 0 | 0 | 1 | 1 | 1 | 1 | 1 |
| 161 | 1 | 0 | 1 | 0 | 0 | 0 | 0 | 1 | 1 | 1 | 0 | 0 | 0 | 1 | 1 | 0 | 1 | 1 | 1 |
| 162 | 1 | 0 | 1 | 0 | 0 | 0 | 0 | 1 | 1 | 1 | 0 | 1 | 0 | 1 | 1 | 1 | 1 | 0 | 0 |
| 163 | 1 | 0 | 1 | 0 | 0 | 0 | 0 | 1 | 1 | 1 | 0 | 1 | 1 | 0 | 1 | 1 | 0 | 0 | 1 |
| 164 | 1 | 0 | 1 | 0 | 0 | 0 | 1 | 0 | 0 | 1 | 1 | 0 | 1 | 1 | 1 | 1 | 0 | 1 | 1 |
| 165 | 1 | 0 | 1 | 0 | 0 | 0 | 1 | 0 | 1 | 1 | 0 | 1 | 1 | 1 | 0 | 0 | 0 | 0 | 1 |
| 166 | 1 | 0 | 1 | 0 | 0 | 1 | 1 | 1 | 1 | 0 | 1 | 0 | 0 | 1 | 1 | 1 | 0 | 1 | 1 |
| 167 | 1 | 0 | 1 | 0 | 0 | 1 | 0 | 1 | 1 | 1 | 1 | 0 | 1 | 1 | 1 | 0 | 0 | 0 | 0 |
| 168 | 1 | 0 | 1 | 0 | 1 | 0 | 0 | 1 | 0 | 1 | 1 | 0 | 0 | 0 | 1 | 1 | 1 | 1 | 1 |
| 169 | 1 | 0 | 1 | 1 | 0 | 0 | 0 | 0 | 0 | 1 | 0 | 0 | 1 | 1 | 1 | 0 | 1 | 1 | 1 |
| 170 | 1 | 0 | 1 | 1 | 0 | 0 | 1 | 0 | 1 | 1 | 0 | 0 | 1 | 1 | 0 | 0 | 0 | 1 | 0 |
| 171 | 1 | 0 | 1 | 1 | 0 | 1 | 0 | 0 | 0 | 0 | 1 | 0 | 1 | 0 | 0 | 0 | 1 | 1 | 1 |
| 172 | 1 | 0 | 1 | 1 | 0 | 1 | 0 | 1 | 0 | 1 | 0 | 0 | 0 | 0 | 1 | 1 | 1 | 1 | 0 |
| 173 | 1 | 0 | 1 | 1 | 0 | 1 | 1 | 0 | 0 | 1 | 1 | 0 | 0 | 0 | 1 | 0 | 0 | 0 | 1 |
| 174 | 1 | 0 | 1 | 1 | 0 | 1 | 1 | 0 | 1 | 0 | 0 | 0 | 1 | 0 | 0 | 0 | 1 | 0 | 0 |
| 175 | 1 | 0 | 1 | 1 | 0 | 1 | 1 | 0 | 1 | 0 | 0 | 0 | 1 | 0 | 0 | 0 | 0 | 1 | 0 |
| 176 | 1 | 0 | 1 | 1 | 1 | 0 | 0 | 0 | 1 | 0 | 0 | 1 | 0 | 0 | 0 | 1 | 1 | 1 | 0 |
| 177 | 1 | 0 | 1 | 1 | 1 | 0 | 0 | 0 | 1 | 1 | 0 | 1 | 0 | 1 | 0 | 0 | 1 | 0 | 0 |
| 178 | 1 | 1 | 0 | 0 | 0 | 0 | 0 | 1 | 1 | 1 | 0 | 0 | 1 | 1 | 0 | 0 | 1 | 0 | 1 |
| 179 | 1 | 1 | 0 | 0 | 0 | 0 | 1 | 0 | 0 | 1 | 1 | 1 | 0 | 1 | 0 | 1 | 0 | 1 | 1 |
| 180 | 1 | 1 | 0 | 0 | 0 | 0 | 1 | 1 | 0 | 1 | 0 | 0 | 1 | 0 | 1 | 1 | 1 | 1 | 1 |
| 181 | 1 | 1 | 0 | 0 | 0 | 1 | 0 | 0 | 1 | 1 | 1 | 0 | 0 | 0 | 0 | 1 | 0 | 1 | 0 |
| 182 | 1 | 1 | 0 | 0 | 0 | 1 | 0 | 0 | 1 | 1 | 1 | 0 | 0 | 1 | 0 | 0 | 1 | 0 | 0 |
| 183 | 1 | 1 | 0 | 0 | 0 | 1 | 0 | 1 | 0 | 0 | 0 | 1 | 1 | 0 | 1 | 1 | 1 | 1 | 1 |
| 184 | 1 | 1 | 0 | 0 | 0 | 1 | 1 | 0 | 1 | 0 | 0 | 1 | 0 | 0 | 1 | 1 | 1 | 0 | 1 |
| 185 | 1 | 1 | 0 | 0 | 0 | 1 | 1 | 1 | 0 | 0 | 1 | 0 | 0 | 1 | 1 | 0 | 0 | 1 | 0 |
| 186 | 1 | 1 | 0 | 0 | 1 | 0 | 0 | 1 | 0 | 1 | 0 | 1 | 0 | 0 | 1 | 1 | 0 | 1 | 0 |
| 187 | 1 | 1 | 0 | 0 | 1 | 0 | 1 | 0 | 0 | 0 | 1 | 0 | 1 | 0 | 0 | 1 | 1 | 0 | 1 |
| 188 | 1 | 1 | 0 | 0 | 1 | 0 | 1 | 0 | 1 | 0 | 1 | 1 | 0 | 0 | 0 | 1 | 0 | 0 | 1 |
| 189 | 1 | 1 | 0 | 1 | 0 | 1 | 0 | 0 | 0 | 1 | 0 | 1 | 1 | 0 | 1 | 0 | 1 | 1 | 0 |
| 190 | 1 | 1 | 0 | 1 | 0 | 1 | 0 | 1 | 0 | 0 | 0 | 0 | 0 | 1 | 1 | 0 | 1 | 1 | 0 |
| 191 | 1 | 1 | 0 | 1 | 0 | 1 | 0 | 1 | 0 | 0 | 1 | 0 | 0 | 1 | 1 | 1 | 0 | 0 | 1 |
| 192 | 1 | 1 | 0 | 1 | 0 | 1 | 0 | 1 | 0 | 1 | 0 | 0 | 1 | 0 | 0 | 0 | 1 | 1 | 1 |
| 193 | 1 | 1 | 0 | 1 | 0 | 1 | 0 | 1 | 0 | 1 | 0 | 1 | 0 | 0 | 1 | 0 | 1 | 0 | 0 |
| 194 | 1 | 1 | 0 | 1 | 0 | 1 | 0 | 1 | 1 | 0 | 0 | 0 | 1 | 0 | 0 | 1 | 0 | 0 | 1 |
| 195 | 1 | 1 | 0 | 1 | 0 | 1 | 1 | 0 | 0 | 0 | 0 | 1 | 0 | 0 | 1 | 1 | 0 | 1 | 1 |
| 196 | 1 | 1 | 0 | 1 | 1 | 0 | 0 | 0 | 0 | 0 | 0 | 1 | 1 | 0 | 1 | 0 | 0 | 1 | 0 |
| 197 | 1 | 1 | 0 | 1 | 1 | 0 | 0 | 0 | 0 | 1 | 1 | 1 | 1 | 0 | 0 | 1 | 1 | 0 | 0 |
| 198 | 1 | 1 | 0 | 1 | 1 | 0 | 0 | 0 | 1 | 1 | 0 | 1 | 0 | 0 | 0 | 0 | 0 | 1 | 1 |
| 199 | 1 | 1 | 0 | 1 | 1 | 0 | 0 | 0 | 1 | 1 | 0 | 1 | 0 | 1 | 1 | 1 | 0 | 0 | 0 |
| 200 | 1 | 1 | 0 | 1 | 1 | 0 | 0 | 1 | 0 | 0 | 1 | 0 | 0 | 1 | 0 | 1 | 1 | 1 | 1 |
| 201 | 1 | 1 | 0 | 1 | 1 | 0 | 0 | 1 | 1 | 0 | 0 | 0 | 0 | 1 | 1 | 0 | 0 | 0 | 1 |
| 202 | 1 | 1 | 0 | 1 | 1 | 0 | 1 | 0 | 0 | 1 | 1 | 0 | 0 | 1 | 1 | 0 | 0 | 0 | 0 |
| 203 | 1 | 1 | 0 | 1 | 1 | 0 | 1 | 0 | 1 | 0 | 1 | 0 | 0 | 1 | 0 | 0 | 0 | 0 | 1 |
| 204 | 1 | 1 | 0 | 1 | 1 | 1 | 0 | 0 | 0 | 1 | 0 | 1 | 0 | 0 | 0 | 0 | 0 | 1 | 1 |
| 205 | 1 | 1 | 1 | 0 | 1 | 0 | 0 | 0 | 0 | 0 | 1 | 1 | 1 | 0 | 1 | 1 | 0 | 0 | 0 |
| 206 | 1 | 1 | 1 | 0 | 1 | 0 | 0 | 0 | 0 | 1 | 0 | 1 | 0 | 0 | 1 | 0 | 1 | 1 | 0 |
| 207 | 1 | 1 | 1 | 0 | 1 | 0 | 0 | 0 | 0 | 1 | 0 | 1 | 0 | 0 | 1 | 1 | 1 | 0 | 0 |
| 208 | 1 | 1 | 1 | 0 | 1 | 0 | 0 | 0 | 0 | 0 | 1 | 0 | 1 | 0 | 1 | 1 | 0 | 0 | 1 | 0 |
| 209 | 1 | 1 | 1 | 0 | 1 | 0 | 0 | 0 | 0 | 1 | 0 | 1 | 0 | 1 | 1 | 0 | 1 | 1 | 0 |

TABLE 1-continued

| | | | | | | | | | | | | | | | | | | |
|---|---|---|---|---|---|---|---|---|---|---|---|---|---|---|---|---|---|---|
| 210 | 1 | 1 | 1 | 0 | 1 | 0 | 0 | 0 | 1 | 0 | 1 | 0 | 0 | 1 | 0 | 1 | 0 | 0 | 1 |
| 211 | 1 | 1 | 1 | 0 | 1 | 0 | 0 | 0 | 1 | 0 | 1 | 0 | 1 | 1 | 0 | 1 | 0 | 1 | 1 |
| 212 | 1 | 1 | 1 | 0 | 1 | 0 | 0 | 0 | 1 | 1 | 0 | 0 | 0 | 0 | 0 | 0 | 1 | 1 | 1 |
| 213 | 1 | 1 | 1 | 0 | 1 | 0 | 0 | 1 | 0 | 0 | 0 | 0 | 0 | 1 | 0 | 1 | 0 | 1 | 1 |
| 214 | 1 | 1 | 1 | 0 | 1 | 0 | 0 | 1 | 0 | 1 | 0 | 0 | 1 | 0 | 0 | 0 | 1 | 0 | 0 |
| 215 | 1 | 1 | 1 | 0 | 1 | 0 | 0 | 1 | 0 | 1 | 1 | 0 | 0 | 0 | 0 | 0 | 0 | 1 | 1 |
| 216 | 1 | 1 | 1 | 0 | 1 | 0 | 1 | 0 | 0 | 0 | 0 | 1 | 0 | 0 | 1 | 0 | 0 | 1 | 1 |
| 217 | 1 | 1 | 1 | 0 | 1 | 0 | 1 | 0 | 0 | 0 | 0 | 1 | 0 | 0 | 1 | 0 | 1 | 1 | 0 |
| 218 | 1 | 1 | 1 | 0 | 1 | 0 | 1 | 0 | 0 | 1 | 0 | 0 | 0 | 1 | 0 | 1 | 0 | 1 | 1 |
| 219 | 1 | 1 | 1 | 1 | 0 | 0 | 0 | 0 | 0 | 0 | 1 | 0 | 1 | 0 | 1 | 1 | 0 | 0 | 1 |
| 220 | 1 | 1 | 1 | 1 | 0 | 0 | 0 | 0 | 0 | 1 | 1 | 0 | 0 | 1 | 1 | 1 | 0 | 0 | 1 |
| 221 | 1 | 1 | 1 | 1 | 0 | 0 | 0 | 0 | 1 | 1 | 0 | 1 | 0 | 0 | 1 | 0 | 1 | 0 | 1 |
| 222 | 1 | 1 | 1 | 1 | 0 | 0 | 0 | 1 | 0 | 0 | 0 | 1 | 0 | 1 | 0 | 1 | 0 | 0 | 1 |
| 223 | 1 | 1 | 1 | 1 | 0 | 0 | 1 | 0 | 0 | 0 | 1 | 0 | 1 | 0 | 1 | 0 | 0 | 0 | 1 |
| 224 | 1 | 1 | 1 | 1 | 0 | 0 | 1 | 0 | 0 | 1 | 0 | 0 | 0 | 0 | 1 | 1 | 0 | 1 | 1 |
| 225 | 1 | 1 | 1 | 1 | 0 | 1 | 0 | 0 | 0 | 0 | 0 | 1 | 0 | 1 | 0 | 1 | 1 | 0 | 0 |

| Number of a sequence | S(n) sequence of 32 bits | | | | | | | | | | | | |
|---|---|---|---|---|---|---|---|---|---|---|---|---|---|
| 1 | 0 | 0 | 1 | 0 | 0 | 1 | 1 | 1 | 0 | 0 | 0 | 1 | 1 |
| 2 | 0 | 1 | 1 | 0 | 1 | 0 | 1 | 0 | 1 | 0 | 0 | 1 | 1 |
| 3 | 0 | 1 | 0 | 0 | 1 | 0 | 1 | 1 | 0 | 0 | 0 | 1 | 1 |
| 4 | 0 | 0 | 1 | 1 | 0 | 1 | 0 | 0 | 1 | 0 | 0 | 1 | 1 |
| 5 | 1 | 0 | 1 | 1 | 0 | 0 | 1 | 1 | 0 | 0 | 1 | 1 | 0 |
| 6 | 1 | 1 | 0 | 1 | 1 | 0 | 1 | 0 | 1 | 0 | 1 | 0 | 0 |
| 7 | 0 | 0 | 1 | 1 | 0 | 1 | 0 | 0 | 1 | 1 | 0 | 0 | 1 |
| 8 | 1 | 1 | 0 | 1 | 1 | 1 | 0 | 0 | 0 | 0 | 1 | 1 | 0 |
| 9 | 1 | 0 | 0 | 1 | 1 | 1 | 0 | 0 | 0 | 0 | 0 | 1 | 1 |
| 10 | 0 | 0 | 1 | 1 | 1 | 1 | 0 | 0 | 1 | 0 | 0 | 0 | 1 |
| 11 | 1 | 1 | 0 | 0 | 0 | 1 | 0 | 1 | 0 | 0 | 0 | 1 | 1 |
| 12 | 0 | 0 | 1 | 0 | 0 | 0 | 1 | 1 | 1 | 0 | 0 | 0 | 1 |
| 13 | 0 | 0 | 1 | 1 | 1 | 0 | 0 | 1 | 0 | 0 | 0 | 1 | 1 |
| 14 | 1 | 0 | 0 | 1 | 0 | 1 | 1 | 0 | 0 | 1 | 0 | 1 | 0 |
| 15 | 1 | 1 | 1 | 1 | 0 | 0 | 1 | 1 | 0 | 1 | 1 | 0 | 0 |
| 16 | 0 | 0 | 0 | 1 | 1 | 0 | 0 | 1 | 1 | 0 | 1 | 1 | 0 |
| 17 | 1 | 1 | 0 | 0 | 1 | 1 | 0 | 1 | 0 | 0 | 1 | 1 | 0 |
| 18 | 0 | 0 | 1 | 1 | 0 | 0 | 0 | 1 | 0 | 0 | 1 | 1 | 0 |
| 19 | 0 | 1 | 1 | 0 | 0 | 1 | 0 | 1 | 0 | 0 | 1 | 1 | 0 |
| 20 | 1 | 0 | 1 | 0 | 0 | 0 | 1 | 1 | 0 | 0 | 1 | 1 | 0 |
| 21 | 0 | 0 | 0 | 1 | 1 | 1 | 0 | 0 | 1 | 0 | 1 | 1 | 0 |
| 22 | 0 | 0 | 1 | 0 | 0 | 1 | 0 | 1 | 0 | 0 | 1 | 1 | 0 |
| 23 | 1 | 1 | 0 | 1 | 1 | 0 | 1 | 0 | 0 | 0 | 1 | 0 | 1 |
| 24 | 1 | 0 | 0 | 0 | 1 | 0 | 1 | 1 | 1 | 0 | 1 | 0 | 0 |
| 25 | 1 | 1 | 1 | 1 | 0 | 0 | 1 | 0 | 0 | 0 | 0 | 1 | 1 |
| 26 | 0 | 0 | 1 | 0 | 1 | 0 | 1 | 1 | 1 | 0 | 1 | 0 | 0 |
| 27 | 0 | 1 | 0 | 1 | 1 | 1 | 0 | 1 | 0 | 0 | 1 | 1 | 0 |
| 28 | 1 | 1 | 0 | 0 | 0 | 0 | 1 | 1 | 0 | 0 | 1 | 1 | 0 |
| 29 | 1 | 0 | 1 | 0 | 1 | 0 | 1 | 1 | 0 | 0 | 0 | 0 | 1 |
| 30 | 1 | 1 | 0 | 1 | 0 | 1 | 0 | 1 | 0 | 0 | 1 | 1 | 0 |
| 31 | 0 | 0 | 1 | 0 | 1 | 1 | 0 | 0 | 1 | 1 | 0 | 1 | 0 |
| 32 | 1 | 1 | 1 | 0 | 1 | 0 | 0 | 1 | 0 | 0 | 1 | 0 | 1 |
| 33 | 0 | 1 | 1 | 1 | 0 | 0 | 1 | 0 | 0 | 0 | 1 | 1 | 0 |
| 34 | 1 | 0 | 1 | 1 | 0 | 1 | 0 | 1 | 0 | 0 | 1 | 0 | 0 |
| 35 | 1 | 0 | 1 | 0 | 0 | 0 | 1 | 0 | 1 | 0 | 0 | 1 | 1 |
| 36 | 0 | 0 | 1 | 1 | 1 | 0 | 1 | 0 | 1 | 0 | 1 | 1 | 0 |
| 37 | 1 | 0 | 0 | 1 | 1 | 0 | 1 | 0 | 0 | 1 | 1 | 0 | 1 |
| 38 | 0 | 0 | 1 | 1 | 0 | 1 | 0 | 1 | 0 | 1 | 0 | 0 | 1 |
| 39 | 1 | 0 | 1 | 0 | 0 | 0 | 1 | 1 | 1 | 1 | 0 | 0 | 0 |
| 40 | 0 | 1 | 0 | 1 | 1 | 1 | 0 | 0 | 0 | 0 | 1 | 0 | 1 |
| 41 | 1 | 0 | 1 | 1 | 1 | 0 | 0 | 1 | 0 | 1 | 0 | 0 | 1 |
| 42 | 0 | 0 | 1 | 1 | 1 | 0 | 0 | 1 | 0 | 1 | 0 | 0 | 1 |
| 43 | 1 | 1 | 1 | 0 | 1 | 0 | 1 | 0 | 1 | 0 | 0 | 1 | 0 |
| 44 | 0 | 0 | 1 | 1 | 0 | 1 | 0 | 1 | 0 | 1 | 0 | 0 | 1 |
| 45 | 1 | 0 | 1 | 1 | 0 | 1 | 0 | 1 | 0 | 1 | 0 | 0 | 1 |
| 46 | 0 | 1 | 1 | 0 | 0 | 1 | 1 | 1 | 0 | 0 | 0 | 1 | 0 |
| 47 | 1 | 1 | 0 | 1 | 1 | 1 | 0 | 0 | 0 | 0 | 1 | 0 | 1 |
| 48 | 1 | 1 | 0 | 0 | 0 | 0 | 1 | 0 | 0 | 1 | 1 | 1 | 0 |
| 49 | 0 | 0 | 1 | 0 | 0 | 0 | 0 | 1 | 1 | 1 | 1 | 0 | 0 |
| 50 | 1 | 1 | 0 | 0 | 1 | 1 | 1 | 1 | 1 | 0 | 0 | 0 | 0 |
| 51 | 1 | 1 | 0 | 1 | 0 | 0 | 1 | 1 | 0 | 0 | 1 | 1 | 0 |
| 52 | 0 | 0 | 1 | 1 | 1 | 0 | 0 | 1 | 0 | 0 | 0 | 1 | 1 |
| 53 | 1 | 1 | 1 | 1 | 0 | 0 | 1 | 0 | 0 | 1 | 1 | 0 | 0 |
| 54 | 1 | 1 | 0 | 1 | 0 | 0 | 1 | 1 | 0 | 0 | 1 | 1 | 0 |
| 55 | 0 | 0 | 1 | 1 | 1 | 0 | 0 | 1 | 1 | 0 | 0 | 0 | 0 |
| 56 | 0 | 1 | 1 | 1 | 0 | 0 | 1 | 0 | 0 | 0 | 1 | 1 | 0 |
| 57 | 1 | 1 | 0 | 1 | 1 | 1 | 0 | 0 | 1 | 1 | 0 | 0 | 0 |
| 58 | 1 | 1 | 0 | 0 | 1 | 1 | 1 | 1 | 0 | 0 | 0 | 0 | 1 |
| 59 | 1 | 1 | 1 | 0 | 0 | 1 | 1 | 0 | 1 | 1 | 0 | 0 | 0 |
| 60 | 0 | 1 | 1 | 0 | 1 | 0 | 1 | 1 | 0 | 0 | 0 | 0 | 1 |

TABLE 1-continued

| | | | | | | | | | | | | | |
|---|---|---|---|---|---|---|---|---|---|---|---|---|---|
| 61 | 0 | 1 | 0 | 1 | 1 | 0 | 0 | 0 | 1 | 0 | 1 | 1 | 0 |
| 62 | 1 | 0 | 0 | 1 | 0 | 1 | 1 | 0 | 0 | 0 | 0 | 1 | 1 |
| 63 | 0 | 0 | 1 | 0 | 1 | 1 | 1 | 0 | 1 | 0 | 1 | 0 | 0 |
| 64 | 0 | 1 | 1 | 1 | 1 | 0 | 1 | 1 | 0 | 0 | 0 | 0 | 1 |
| 65 | 1 | 1 | 0 | 1 | 0 | 1 | 1 | 0 | 1 | 0 | 1 | 1 | 0 |
| 66 | 0 | 0 | 0 | 0 | 1 | 1 | 1 | 1 | 0 | 1 | 0 | 1 | 0 |
| 67 | 0 | 1 | 0 | 1 | 0 | 1 | 0 | 1 | 0 | 1 | 1 | 0 | 0 |
| 68 | 1 | 1 | 1 | 0 | 0 | 1 | 0 | 1 | 0 | 1 | 0 | 1 | 0 |
| 69 | 1 | 0 | 1 | 0 | 1 | 1 | 0 | 1 | 0 | 1 | 0 | 1 | 0 |
| 70 | 0 | 1 | 0 | 0 | 1 | 0 | 1 | 1 | 0 | 1 | 1 | 0 | 0 |
| 71 | 0 | 0 | 1 | 0 | 1 | 0 | 1 | 0 | 0 | 0 | 1 | 1 | 0 |
| 72 | 1 | 0 | 1 | 1 | 0 | 1 | 1 | 0 | 0 | 1 | 1 | 0 | 0 |
| 73 | 0 | 0 | 0 | 1 | 1 | 0 | 1 | 1 | 0 | 0 | 1 | 1 | 0 |
| 74 | 1 | 1 | 1 | 1 | 0 | 1 | 0 | 0 | 0 | 1 | 0 | 1 | 0 |
| 75 | 0 | 1 | 0 | 1 | 0 | 1 | 1 | 1 | 0 | 1 | 0 | 0 | 0 |
| 76 | 0 | 0 | 1 | 1 | 1 | 1 | 1 | 0 | 0 | 1 | 1 | 0 | 0 |
| 77 | 0 | 0 | 1 | 1 | 0 | 0 | 0 | 1 | 1 | 1 | 0 | 1 | 0 |
| 78 | 0 | 1 | 1 | 1 | 0 | 0 | 0 | 1 | 1 | 1 | 0 | 1 | 0 |
| 79 | 0 | 0 | 1 | 1 | 0 | 1 | 0 | 1 | 0 | 1 | 0 | 0 | 1 |
| 80 | 1 | 1 | 0 | 1 | 0 | 0 | 0 | 1 | 0 | 0 | 1 | 1 | 0 |
| 81 | 0 | 1 | 1 | 0 | 1 | 0 | 1 | 0 | 1 | 0 | 1 | 0 | 0 |
| 82 | 1 | 1 | 0 | 0 | 1 | 1 | 0 | 0 | 1 | 0 | 0 | 1 | 0 |
| 83 | 1 | 0 | 1 | 0 | 1 | 0 | 1 | 0 | 0 | 1 | 0 | 0 | 1 |
| 84 | 1 | 1 | 0 | 0 | 1 | 0 | 0 | 1 | 0 | 1 | 0 | 1 | 0 |
| 85 | 0 | 1 | 1 | 1 | 0 | 1 | 0 | 0 | 1 | 0 | 0 | 1 | 0 |
| 86 | 0 | 0 | 0 | 1 | 1 | 1 | 1 | 1 | 0 | 0 | 1 | 0 | 0 |
| 87 | 0 | 1 | 1 | 0 | 1 | 1 | 0 | 0 | 0 | 1 | 0 | 1 | 0 |
| 88 | 1 | 1 | 0 | 0 | 0 | 0 | 0 | 1 | 1 | 1 | 0 | 1 | 0 |
| 89 | 0 | 0 | 0 | 1 | 0 | 0 | 0 | 1 | 1 | 1 | 1 | 0 | 0 |
| 90 | 1 | 0 | 1 | 0 | 0 | 0 | 0 | 1 | 1 | 1 | 1 | 0 | 0 |
| 91 | 0 | 1 | 1 | 0 | 0 | 1 | 1 | 1 | 0 | 0 | 1 | 0 | 0 |
| 92 | 0 | 0 | 1 | 1 | 1 | 0 | 1 | 1 | 0 | 0 | 0 | 0 | 1 |
| 93 | 1 | 0 | 1 | 0 | 1 | 1 | 0 | 1 | 1 | 0 | 1 | 0 | 0 |
| 94 | 0 | 0 | 1 | 1 | 1 | 1 | 1 | 0 | 0 | 1 | 0 | 0 | 1 |
| 95 | 0 | 0 | 1 | 1 | 0 | 0 | 1 | 1 | 0 | 1 | 1 | 0 | 0 |
| 96 | 1 | 0 | 1 | 1 | 0 | 1 | 1 | 1 | 0 | 0 | 0 | 1 | 0 |
| 97 | 1 | 0 | 1 | 1 | 1 | 1 | 0 | 1 | 0 | 0 | 0 | 0 | 1 |
| 98 | 1 | 1 | 1 | 0 | 0 | 1 | 1 | 1 | 0 | 1 | 0 | 0 | 0 |
| 99 | 1 | 1 | 0 | 0 | 1 | 0 | 0 | 1 | 0 | 0 | 1 | 1 | 0 |
| 100 | 0 | 0 | 0 | 1 | 1 | 1 | 0 | 0 | 1 | 1 | 0 | 0 | 1 |
| 101 | 0 | 1 | 1 | 0 | 0 | 0 | 0 | 1 | 1 | 1 | 1 | 0 | 0 |
| 102 | 0 | 1 | 0 | 0 | 1 | 1 | 1 | 0 | 0 | 1 | 1 | 0 | 0 |
| 103 | 0 | 0 | 0 | 1 | 1 | 1 | 1 | 0 | 0 | 1 | 1 | 0 | 0 |
| 104 | 0 | 1 | 0 | 0 | 1 | 1 | 1 | 1 | 0 | 0 | 0 | 0 | 1 |
| 105 | 0 | 0 | 1 | 1 | 0 | 1 | 1 | 0 | 0 | 1 | 1 | 0 | 0 |
| 106 | 1 | 0 | 0 | 1 | 1 | 1 | 1 | 0 | 1 | 1 | 0 | 0 | 0 |
| 107 | 0 | 1 | 1 | 1 | 0 | 1 | 0 | 0 | 1 | 0 | 0 | 1 | 0 |
| 108 | 1 | 0 | 1 | 0 | 1 | 0 | 1 | 1 | 0 | 1 | 1 | 0 | 0 |
| 109 | 1 | 0 | 0 | 1 | 0 | 1 | 1 | 1 | 0 | 1 | 1 | 0 | 0 |
| 110 | 1 | 1 | 1 | 0 | 1 | 1 | 0 | 1 | 0 | 1 | 0 | 0 | 0 |
| 111 | 0 | 1 | 1 | 1 | 1 | 1 | 0 | 1 | 1 | 0 | 1 | 0 | 0 |
| 112 | 0 | 0 | 1 | 1 | 0 | 1 | 0 | 1 | 1 | 1 | 0 | 0 | 0 |
| 113 | 1 | 1 | 0 | 0 | 1 | 0 | 0 | 1 | 0 | 1 | 1 | 0 | 0 |
| 114 | 0 | 1 | 0 | 1 | 1 | 0 | 0 | 0 | 1 | 1 | 1 | 0 | 0 |
| 115 | 0 | 0 | 1 | 1 | 0 | 1 | 0 | 0 | 1 | 0 | 1 | 0 | 1 |
| 116 | 1 | 1 | 1 | 0 | 0 | 0 | 0 | 1 | 0 | 1 | 0 | 1 | 0 |
| 117 | 1 | 0 | 1 | 0 | 1 | 1 | 1 | 1 | 0 | 1 | 0 | 0 | 0 |
| 118 | 1 | 0 | 1 | 0 | 1 | 1 | 1 | 1 | 0 | 1 | 0 | 0 | 0 |
| 119 | 1 | 1 | 1 | 1 | 0 | 1 | 1 | 0 | 1 | 1 | 0 | 0 | 0 |
| 120 | 1 | 0 | 1 | 0 | 1 | 1 | 1 | 1 | 0 | 1 | 0 | 0 | 0 |
| 121 | 0 | 1 | 0 | 1 | 0 | 1 | 1 | 0 | 1 | 1 | 0 | 0 | 0 |
| 122 | 1 | 1 | 0 | 1 | 0 | 1 | 1 | 0 | 1 | 1 | 0 | 0 | 0 |
| 123 | 1 | 0 | 1 | 0 | 1 | 1 | 1 | 0 | 1 | 1 | 0 | 0 | 0 |
| 124 | 0 | 1 | 1 | 1 | 1 | 0 | 1 | 0 | 1 | 0 | 1 | 0 | 0 |
| 125 | 0 | 1 | 1 | 1 | 0 | 1 | 0 | 1 | 1 | 0 | 1 | 0 | 0 |
| 126 | 1 | 0 | 1 | 0 | 0 | 1 | 1 | 1 | 1 | 0 | 0 | 0 | 0 |
| 127 | 1 | 0 | 1 | 0 | 1 | 1 | 0 | 1 | 0 | 1 | 1 | 0 | 0 |
| 128 | 1 | 1 | 1 | 0 | 1 | 1 | 0 | 0 | 0 | 1 | 1 | 0 | 0 |
| 129 | 0 | 0 | 1 | 1 | 1 | 1 | 1 | 1 | 0 | 1 | 0 | 0 | 0 |
| 130 | 0 | 1 | 1 | 0 | 1 | 1 | 0 | 0 | 1 | 1 | 0 | 0 | 0 |
| 131 | 0 | 0 | 0 | 1 | 1 | 0 | 1 | 1 | 1 | 1 | 0 | 0 | 0 |
| 132 | 0 | 0 | 1 | 1 | 0 | 1 | 1 | 0 | 0 | 1 | 1 | 0 | 0 |
| 133 | 1 | 1 | 0 | 1 | 0 | 1 | 1 | 0 | 1 | 0 | 0 | 0 | 0 |
| 134 | 0 | 1 | 1 | 1 | 0 | 0 | 1 | 0 | 1 | 0 | 1 | 0 | 0 |
| 135 | 0 | 1 | 1 | 0 | 0 | 0 | 1 | 1 | 1 | 0 | 1 | 0 | 1 |
| 136 | 1 | 1 | 0 | 1 | 1 | 1 | 0 | 1 | 0 | 0 | 1 | 1 | 0 |
| 137 | 0 | 1 | 0 | 1 | 0 | 1 | 1 | 0 | 0 | 1 | 1 | 1 | 0 |
| 138 | 1 | 0 | 1 | 0 | 1 | 0 | 0 | 1 | 1 | 0 | 0 | 0 | 1 |
| 139 | 0 | 0 | 1 | 0 | 0 | 0 | 1 | 0 | 1 | 1 | 0 | 0 | 1 |
| 140 | 1 | 0 | 0 | 1 | 1 | 1 | 0 | 0 | 0 | 1 | 0 | 1 | 0 |

TABLE 1-continued

| | | | | | | | | | | | | | |
|---|---|---|---|---|---|---|---|---|---|---|---|---|---|
| 141 | 1 | 0 | 1 | 1 | 0 | 1 | 1 | 0 | 1 | 1 | 0 | 0 | 0 |
| 142 | 1 | 1 | 0 | 1 | 1 | 0 | 1 | 1 | 1 | 0 | 1 | 0 | 0 |
| 143 | 1 | 0 | 1 | 1 | 1 | 0 | 1 | 0 | 1 | 0 | 0 | 1 | 0 |
| 144 | 0 | 0 | 1 | 1 | 1 | 0 | 1 | 0 | 0 | 1 | 1 | 0 | 0 |
| 145 | 1 | 1 | 1 | 0 | 1 | 1 | 0 | 1 | 0 | 1 | 0 | 1 | 0 |
| 146 | 0 | 1 | 0 | 0 | 1 | 0 | 1 | 1 | 1 | 0 | 1 | 0 | 0 |
| 147 | 1 | 0 | 1 | 1 | 1 | 1 | 0 | 1 | 0 | 1 | 0 | 0 | 0 |
| 148 | 1 | 1 | 1 | 1 | 0 | 1 | 1 | 0 | 0 | 0 | 0 | 0 | 1 |
| 149 | 0 | 1 | 1 | 0 | 1 | 0 | 1 | 1 | 0 | 1 | 0 | 0 | 0 |
| 150 | 0 | 1 | 1 | 0 | 0 | 0 | 0 | 1 | 1 | 1 | 1 | 0 | 0 |
| 151 | 1 | 0 | 1 | 0 | 1 | 0 | 1 | 1 | 1 | 0 | 0 | 1 | 0 |
| 152 | 1 | 0 | 1 | 1 | 1 | 0 | 1 | 1 | 0 | 0 | 1 | 0 | 0 |
| 153 | 1 | 1 | 1 | 1 | 0 | 0 | 1 | 1 | 0 | 0 | 1 | 0 | 0 |
| 154 | 0 | 1 | 0 | 0 | 1 | 1 | 1 | 1 | 0 | 1 | 1 | 0 | 0 |
| 155 | 0 | 1 | 1 | 0 | 0 | 1 | 1 | 1 | 0 | 0 | 1 | 0 | 0 |
| 156 | 0 | 1 | 1 | 0 | 1 | 1 | 1 | 0 | 0 | 0 | 1 | 0 | 0 |
| 157 | 0 | 0 | 0 | 0 | 1 | 1 | 1 | 1 | 0 | 0 | 1 | 0 | 0 |
| 158 | 0 | 1 | 0 | 1 | 1 | 1 | 1 | 1 | 1 | 0 | 0 | 0 | 0 |
| 159 | 0 | 1 | 0 | 0 | 1 | 0 | 0 | 1 | 0 | 1 | 0 | 1 | 0 |
| 160 | 1 | 0 | 1 | 0 | 1 | 1 | 0 | 1 | 0 | 0 | 0 | 0 | 1 |
| 161 | 1 | 0 | 1 | 1 | 0 | 0 | 1 | 0 | 0 | 0 | 1 | 0 | 1 |
| 162 | 1 | 1 | 0 | 0 | 1 | 1 | 0 | 1 | 0 | 0 | 1 | 0 | 0 |
| 163 | 1 | 0 | 1 | 1 | 1 | 1 | 0 | 0 | 1 | 0 | 1 | 0 | 0 |
| 164 | 0 | 0 | 0 | 1 | 1 | 1 | 0 | 0 | 0 | 0 | 1 | 0 | 1 |
| 165 | 1 | 1 | 1 | 0 | 1 | 1 | 0 | 0 | 1 | 1 | 0 | 0 | 0 |
| 166 | 1 | 0 | 0 | 1 | 0 | 0 | 0 | 0 | 0 | 1 | 1 | 0 | 1 |
| 167 | 1 | 0 | 1 | 1 | 1 | 0 | 0 | 1 | 1 | 1 | 0 | 0 | 0 |
| 168 | 0 | 1 | 1 | 1 | 0 | 0 | 0 | 1 | 0 | 0 | 1 | 1 | 0 |
| 169 | 0 | 0 | 1 | 0 | 1 | 1 | 1 | 0 | 0 | 0 | 1 | 0 | 1 |
| 170 | 0 | 1 | 0 | 1 | 0 | 1 | 1 | 1 | 1 | 1 | 0 | 0 | 0 |
| 171 | 1 | 1 | 0 | 0 | 0 | 1 | 0 | 0 | 1 | 1 | 1 | 1 | 0 |
| 172 | 1 | 0 | 0 | 1 | 1 | 0 | 0 | 0 | 1 | 1 | 0 | 1 | 1 |
| 173 | 0 | 1 | 0 | 1 | 1 | 1 | 1 | 0 | 0 | 0 | 0 | 1 | 1 |
| 174 | 1 | 1 | 1 | 0 | 1 | 1 | 1 | 0 | 0 | 0 | 0 | 1 | 1 |
| 175 | 0 | 0 | 1 | 1 | 1 | 1 | 1 | 0 | 0 | 0 | 1 | 0 | 1 |
| 176 | 1 | 0 | 0 | 1 | 0 | 0 | 1 | 1 | 1 | 0 | 1 | 0 | 1 |
| 177 | 1 | 1 | 1 | 0 | 0 | 0 | 0 | 0 | 1 | 1 | 0 | 1 | 1 |
| 178 | 1 | 0 | 1 | 1 | 1 | 1 | 0 | 1 | 0 | 1 | 0 | 0 | 0 |
| 179 | 0 | 1 | 1 | 0 | 0 | 1 | 1 | 0 | 1 | 1 | 0 | 0 | 0 |
| 180 | 1 | 0 | 1 | 0 | 0 | 0 | 1 | 0 | 0 | 1 | 1 | 0 | 0 |
| 181 | 1 | 1 | 1 | 1 | 1 | 0 | 1 | 1 | 0 | 1 | 0 | 0 | 0 |
| 182 | 1 | 1 | 1 | 1 | 1 | 0 | 1 | 0 | 1 | 0 | 1 | 0 | 0 |
| 183 | 1 | 1 | 0 | 0 | 1 | 0 | 1 | 1 | 0 | 1 | 0 | 0 | 0 |
| 184 | 0 | 1 | 0 | 1 | 1 | 1 | 0 | 1 | 1 | 0 | 0 | 0 | 0 |
| 185 | 1 | 0 | 1 | 1 | 1 | 1 | 1 | 0 | 1 | 0 | 0 | 0 | 0 |
| 186 | 1 | 0 | 1 | 1 | 1 | 0 | 1 | 1 | 1 | 0 | 0 | 0 | 0 |
| 187 | 1 | 1 | 0 | 0 | 1 | 0 | 1 | 1 | 1 | 1 | 0 | 0 | 0 |
| 188 | 1 | 1 | 1 | 0 | 1 | 1 | 0 | 1 | 1 | 0 | 0 | 0 | 0 |
| 189 | 0 | 0 | 0 | 0 | 1 | 1 | 0 | 1 | 1 | 0 | 0 | 1 | 1 |
| 190 | 1 | 1 | 0 | 0 | 0 | 1 | 1 | 0 | 1 | 1 | 1 | 0 | 0 |
| 191 | 0 | 0 | 1 | 0 | 1 | 1 | 0 | 0 | 1 | 1 | 0 | 0 | 1 |
| 192 | 0 | 0 | 1 | 1 | 0 | 0 | 0 | 0 | 0 | 1 | 1 | 1 | 1 |
| 193 | 1 | 1 | 0 | 1 | 1 | 1 | 1 | 0 | 0 | 0 | 0 | 1 | 1 |
| 194 | 0 | 0 | 1 | 1 | 1 | 1 | 0 | 1 | 1 | 0 | 0 | 0 | 1 |
| 195 | 0 | 0 | 1 | 0 | 0 | 0 | 1 | 1 | 1 | 1 | 0 | 1 | 0 |
| 196 | 1 | 0 | 0 | 1 | 1 | 0 | 0 | 0 | 1 | 1 | 1 | 0 | 1 |
| 197 | 0 | 1 | 0 | 0 | 1 | 0 | 1 | 0 | 1 | 0 | 1 | 1 | 0 |
| 198 | 1 | 1 | 0 | 0 | 1 | 0 | 1 | 0 | 1 | 0 | 1 | 1 | 0 |
| 199 | 0 | 0 | 0 | 1 | 0 | 1 | 0 | 1 | 0 | 1 | 1 | 0 | 1 |
| 200 | 1 | 1 | 0 | 0 | 0 | 1 | 1 | 0 | 1 | 0 | 1 | 1 | 0 |
| 201 | 0 | 1 | 0 | 0 | 0 | 1 | 1 | 0 | 1 | 0 | 1 | 1 | 0 |
| 202 | 1 | 0 | 1 | 0 | 0 | 0 | 1 | 1 | 1 | 1 | 0 | 1 | 0 |
| 203 | 0 | 1 | 0 | 1 | 1 | 1 | 0 | 0 | 0 | 0 | 1 | 1 | 1 |
| 204 | 1 | 1 | 0 | 0 | 1 | 0 | 1 | 0 | 1 | 0 | 1 | 1 | 0 |
| 205 | 1 | 1 | 1 | 0 | 0 | 0 | 1 | 1 | 0 | 1 | 0 | 0 | 1 |
| 206 | 0 | 1 | 0 | 1 | 1 | 1 | 0 | 0 | 1 | 1 | 0 | 0 | 1 |
| 207 | 1 | 0 | 0 | 1 | 0 | 0 | 1 | 0 | 1 | 1 | 0 | 0 | 1 |
| 208 | 1 | 1 | 0 | 0 | 0 | 1 | 1 | 0 | 1 | 1 | 0 | 0 | 1 |
| 209 | 0 | 0 | 1 | 1 | 0 | 0 | 1 | 0 | 1 | 1 | 0 | 0 | 1 |
| 210 | 1 | 1 | 1 | 0 | 0 | 1 | 1 | 0 | 0 | 1 | 0 | 0 | 1 |
| 211 | 0 | 0 | 0 | 0 | 1 | 1 | 0 | 0 | 1 | 0 | 0 | 1 | 1 |
| 212 | 0 | 1 | 1 | 0 | 1 | 0 | 0 | 1 | 1 | 0 | 1 | 0 | 1 |
| 213 | 1 | 1 | 0 | 0 | 0 | 1 | 1 | 0 | 1 | 1 | 1 | 0 | 0 |
| 214 | 1 | 1 | 0 | 1 | 1 | 1 | 0 | 0 | 0 | 1 | 1 | 1 | 0 |
| 215 | 0 | 0 | 1 | 1 | 1 | 0 | 1 | 0 | 1 | 1 | 1 | 0 | 0 |
| 216 | 1 | 1 | 0 | 0 | 0 | 0 | 1 | 1 | 0 | 1 | 1 | 1 | 0 |
| 217 | 0 | 1 | 1 | 0 | 0 | 0 | 1 | 1 | 1 | 1 | 1 | 0 | 0 |
| 218 | 0 | 0 | 1 | 0 | 0 | 0 | 1 | 1 | 1 | 1 | 0 | 0 | 1 |
| 219 | 1 | 1 | 0 | 0 | 1 | 0 | 1 | 1 | 0 | 0 | 1 | 1 | 0 |
| 220 | 0 | 0 | 1 | 0 | 0 | 1 | 0 | 1 | 0 | 1 | 0 | 1 | 1 |

TABLE 1-continued

| | | | | | | | | | | | | | |
|---|---|---|---|---|---|---|---|---|---|---|---|---|---|
| 221 | 0 | 1 | 0 | 0 | 1 | 1 | 0 | 0 | 1 | 1 | 0 | 0 | 1 |
| 222 | 1 | 1 | 0 | 0 | 1 | 0 | 1 | 1 | 0 | 1 | 1 | 0 | 0 |
| 223 | 1 | 0 | 1 | 1 | 0 | 1 | 0 | 0 | 1 | 1 | 1 | 0 | 0 |
| 224 | 1 | 0 | 0 | 1 | 0 | 1 | 0 | 1 | 0 | 1 | 1 | 0 | 0 |
| 225 | 1 | 1 | 0 | 1 | 1 | 0 | 0 | 0 | 1 | 1 | 1 | 0 | 0 |

One of a plurality of sequences included in Table 1a may be the local (may be stored or obtained based on S) third sequence T used for correlation processing of a receiver and is in a one-to-one correspondence with each of the first sequences S in Table 1.

TABLE 1a

| Number of a sequence | T(n) sequence body | | | | | | | | | | | | | | | | | |
|---|---|---|---|---|---|---|---|---|---|---|---|---|---|---|---|---|---|---|
| 1 | -1 | -1 | -1 | -1 | 1 | -1 | 1 | 1 | 1 | 1 | 1 | -1 | 1 | -1 | 1 | -1 | -1 | 1 | 1 |
| 2 | -1 | -1 | -1 | -1 | 1 | 1 | -1 | 1 | 1 | -1 | 1 | 1 | 1 | 1 | -1 | -1 | 1 | -1 | -1 |
| 3 | -1 | -1 | -1 | -1 | 1 | 1 | -1 | 1 | 1 | 1 | -1 | 1 | -1 | 1 | -1 | 1 | 1 | 1 | -1 |
| 4 | -1 | -1 | -1 | -1 | 1 | 1 | 1 | -1 | 1 | 1 | 1 | -1 | 1 | -1 | 1 | -1 | 1 | 1 | -1 |
| 5 | -1 | -1 | -1 | -1 | 1 | 1 | 1 | 1 | -1 | 1 | -1 | 1 | 1 | -1 | 1 | -1 | 1 | 1 | -1 |
| 6 | -1 | -1 | -1 | -1 | 1 | 1 | 1 | 1 | -1 | -1 | 1 | 1 | -1 | -1 | -1 | 1 | 1 | 1 | -1 |
| 7 | -1 | -1 | -1 | -1 | 1 | 1 | 1 | 1 | 1 | -1 | 1 | -1 | 1 | -1 | -1 | 1 | 1 | 1 | -1 |
| 8 | -1 | -1 | -1 | 1 | -1 | 1 | -1 | 1 | 1 | -1 | 1 | 1 | 1 | -1 | 1 | -1 | 1 | -1 | -1 |
| 9 | -1 | -1 | -1 | 1 | -1 | 1 | -1 | 1 | 1 | 1 | 1 | 1 | -1 | 1 | -1 | 1 | -1 | -1 | 1 |
| 10 | -1 | -1 | -1 | 1 | -1 | 1 | -1 | 1 | 1 | 1 | 1 | -1 | 1 | -1 | 1 | 1 | 1 | -1 | -1 |
| 11 | -1 | -1 | -1 | 1 | -1 | 1 | 1 | -1 | 1 | -1 | -1 | 1 | 1 | 1 | 1 | 1 | 1 | -1 | -1 |
| 12 | -1 | -1 | -1 | 1 | -1 | 1 | 1 | -1 | 1 | -1 | 1 | 1 | -1 | 1 | 1 | 1 | -1 | 1 | 1 |
| 13 | -1 | -1 | -1 | 1 | -1 | 1 | 1 | 1 | -1 | 1 | 1 | 1 | 1 | -1 | 1 | -1 | 1 | -1 | 1 |
| 14 | -1 | -1 | -1 | 1 | -1 | 1 | 1 | 1 | -1 | -1 | 1 | 1 | 1 | 1 | 1 | -1 | -1 | 1 | 1 |
| 15 | -1 | -1 | -1 | 1 | -1 | 1 | 1 | 1 | -1 | 1 | -1 | 1 | -1 | -1 | 1 | -1 | 1 | -1 | -1 |
| 16 | -1 | -1 | -1 | 1 | -1 | 1 | 1 | 1 | -1 | 1 | -1 | 1 | 1 | -1 | 1 | -1 | 1 | 1 | -1 |
| 17 | -1 | -1 | -1 | 1 | -1 | 1 | 1 | 1 | 1 | -1 | 1 | -1 | 1 | -1 | -1 | 1 | -1 | -1 | 1 |
| 18 | -1 | -1 | -1 | 1 | -1 | 1 | 1 | 1 | 1 | -1 | 1 | 1 | -1 | 1 | -1 | 1 | 1 | -1 | 1 |
| 19 | -1 | -1 | -1 | 1 | -1 | 1 | 1 | 1 | 1 | -1 | 1 | -1 | 1 | -1 | -1 | -1 | 1 | 1 | 1 |
| 20 | -1 | -1 | -1 | 1 | -1 | 1 | 1 | 1 | 1 | -1 | 1 | -1 | 1 | -1 | 1 | -1 | -1 | 1 | 1 |
| 21 | -1 | -1 | -1 | 1 | -1 | 1 | 1 | 1 | 1 | 1 | -1 | 1 | -1 | -1 | 1 | -1 | 1 | 1 | 1 |
| 22 | -1 | -1 | -1 | 1 | 1 | -1 | -1 | 1 | 1 | -1 | 1 | 1 | -1 | 1 | 1 | 1 | 1 | -1 | -1 |
| 23 | -1 | -1 | -1 | 1 | 1 | -1 | -1 | 1 | 1 | -1 | 1 | 1 | 1 | -1 | -1 | -1 | 1 | -1 | 1 |
| 24 | -1 | -1 | -1 | 1 | 1 | -1 | -1 | 1 | 1 | 1 | -1 | 1 | 1 | -1 | 1 | -1 | 1 | 1 | -1 |
| 25 | -1 | -1 | -1 | 1 | 1 | -1 | 1 | 1 | -1 | -1 | 1 | 1 | -1 | 1 | -1 | 1 | 1 | 1 | 1 |
| 26 | -1 | -1 | -1 | 1 | 1 | -1 | 1 | 1 | -1 | -1 | 1 | 1 | 1 | -1 | 1 | -1 | 1 | -1 | 1 |
| 27 | -1 | -1 | -1 | 1 | 1 | -1 | 1 | 1 | -1 | 1 | -1 | 1 | -1 | -1 | 1 | 1 | 1 | -1 | -1 |
| 28 | -1 | -1 | -1 | 1 | 1 | -1 | 1 | 1 | -1 | 1 | -1 | 1 | -1 | 1 | -1 | 1 | -1 | 1 | 1 |
| 29 | -1 | -1 | -1 | 1 | 1 | -1 | 1 | 1 | -1 | 1 | 1 | -1 | 1 | 1 | 1 | -1 | -1 | -1 | 1 |
| 30 | -1 | -1 | -1 | 1 | 1 | -1 | 1 | 1 | -1 | 1 | 1 | 1 | 1 | -1 | -1 | -1 | 1 | -1 | -1 |
| 31 | -1 | -1 | -1 | 1 | 1 | -1 | 1 | 1 | 1 | -1 | -1 | 1 | 1 | -1 | 1 | -1 | 1 | 1 | -1 |
| 32 | -1 | -1 | -1 | 1 | 1 | 1 | -1 | -1 | 1 | 1 | 1 | -1 | 1 | -1 | -1 | -1 | 1 | 1 | -1 |
| 33 | -1 | -1 | -1 | 1 | 1 | 1 | -1 | 1 | -1 | 1 | 1 | -1 | -1 | 1 | -1 | 1 | 1 | -1 | 1 |
| 34 | -1 | -1 | -1 | 1 | 1 | 1 | -1 | -1 | -1 | 1 | -1 | 1 | -1 | 1 | 1 | 1 | 1 | -1 | 1 |
| 35 | -1 | -1 | -1 | 1 | 1 | 1 | -1 | 1 | -1 | 1 | -1 | 1 | 1 | -1 | 1 | 1 | 1 | -1 | -1 |
| 36 | -1 | -1 | -1 | 1 | 1 | 1 | -1 | 1 | 1 | -1 | -1 | -1 | -1 | 1 | 1 | -1 | -1 | 1 | 1 |
| 37 | -1 | -1 | -1 | 1 | 1 | 1 | 1 | -1 | 1 | -1 | 1 | -1 | -1 | 1 | -1 | -1 | 1 | 1 | 1 |
| 38 | -1 | -1 | 1 | -1 | -1 | 1 | 1 | 1 | 1 | 1 | 1 | -1 | 1 | 1 | 1 | 1 | 1 | -1 | -1 |
| 39 | -1 | -1 | 1 | -1 | -1 | 1 | -1 | 1 | -1 | 1 | 1 | -1 | 1 | 1 | -1 | 1 | 1 | 1 | 1 |
| 40 | -1 | -1 | 1 | -1 | -1 | 1 | -1 | 1 | 1 | -1 | 1 | 1 | -1 | 1 | -1 | 1 | 1 | 1 | 1 |
| 41 | -1 | -1 | 1 | -1 | -1 | 1 | 1 | -1 | -1 | 1 | 1 | 1 | 1 | -1 | -1 | -1 | 1 | -1 | 1 |
| 42 | -1 | -1 | 1 | -1 | -1 | 1 | 1 | -1 | 1 | 1 | 1 | -1 | 1 | 1 | 1 | -1 | 1 | -1 | -1 |
| 43 | -1 | -1 | 1 | -1 | -1 | 1 | 1 | 1 | -1 | -1 | 1 | -1 | 1 | -1 | -1 | -1 | 1 | 1 | 1 |
| 44 | -1 | -1 | 1 | -1 | -1 | 1 | 1 | 1 | -1 | -1 | 1 | 1 | 1 | 1 | 1 | 1 | -1 | -1 | 1 |
| 45 | -1 | -1 | 1 | -1 | -1 | 1 | 1 | 1 | 1 | -1 | -1 | -1 | -1 | 1 | 1 | -1 | -1 | 1 | 1 |
| 46 | -1 | -1 | 1 | -1 | -1 | 1 | 1 | 1 | 1 | -1 | -1 | 1 | 1 | -1 | 1 | -1 | 1 | -1 | 1 |
| 47 | -1 | -1 | 1 | -1 | 1 | -1 | -1 | 1 | 1 | 1 | -1 | 1 | 1 | -1 | -1 | 1 | 1 | -1 | -1 |
| 48 | -1 | -1 | 1 | -1 | 1 | -1 | 1 | -1 | 1 | 1 | -1 | 1 | 1 | -1 | 1 | -1 | 1 | 1 | 1 |
| 49 | -1 | -1 | 1 | -1 | 1 | -1 | 1 | -1 | 1 | -1 | 1 | -1 | 1 | 1 | -1 | 1 | 1 | 1 | 1 |
| 50 | -1 | -1 | 1 | -1 | 1 | -1 | 1 | 1 | -1 | 1 | 1 | 1 | -1 | 1 | 1 | -1 | -1 | 1 | -1 |
| 51 | -1 | -1 | 1 | -1 | 1 | -1 | 1 | 1 | 1 | 1 | 1 | 1 | -1 | -1 | -1 | -1 | 1 | 1 | 1 |
| 52 | -1 | -1 | 1 | -1 | 1 | -1 | 1 | 1 | 1 | 1 | 1 | -1 | -1 | -1 | -1 | 1 | -1 | 1 | 1 |
| 53 | -1 | -1 | 1 | -1 | 1 | -1 | 1 | 1 | -1 | 1 | -1 | -1 | 1 | -1 | 1 | -1 | 1 | -1 | 1 |
| 54 | -1 | -1 | 1 | -1 | 1 | 1 | -1 | -1 | 1 | -1 | 1 | -1 | -1 | -1 | -1 | -1 | 1 | -1 | 1 |
| 55 | -1 | -1 | 1 | -1 | 1 | 1 | -1 | 1 | 1 | 1 | 1 | -1 | -1 | 1 | 1 | 1 | -1 | 1 | -1 |
| 56 | -1 | -1 | 1 | -1 | 1 | 1 | -1 | 1 | 1 | 1 | 1 | 1 | -1 | 1 | -1 | 1 | 1 | -1 | 1 |
| 57 | -1 | -1 | 1 | -1 | 1 | 1 | 1 | -1 | 1 | -1 | -1 | -1 | 1 | -1 | 1 | -1 | 1 | 1 | -1 |
| 58 | -1 | -1 | 1 | -1 | 1 | 1 | 1 | -1 | 1 | -1 | -1 | -1 | 1 | -1 | -1 | 1 | 1 | -1 | 1 |
| 59 | -1 | -1 | 1 | -1 | 1 | 1 | 1 | -1 | 1 | -1 | -1 | 1 | -1 | 1 | -1 | 1 | -1 | 1 | 1 |
| 60 | -1 | -1 | 1 | -1 | 1 | 1 | 1 | -1 | 1 | 1 | -1 | 1 | 1 | 1 | -1 | 1 | -1 | -1 | -1 |

TABLE 1a-continued

| | | | | | | | | | | | | | | | | | | | |
|---|---|---|---|---|---|---|---|---|---|---|---|---|---|---|---|---|---|---|---|
| 61 | -1 | -1 | 1 | 1 | -1 | -1 | -1 | 1 | 1 | -1 | 1 | 1 | 1 | 1 | 1 | -1 | 1 | -1 | -1 |
| 62 | -1 | -1 | 1 | 1 | -1 | -1 | 1 | -1 | -1 | -1 | 1 | -1 | 1 | 1 | 1 | 1 | 1 | 1 | -1 |
| 63 | -1 | -1 | 1 | 1 | -1 | -1 | 1 | -1 | -1 | 1 | 1 | 1 | 1 | 1 | -1 | -1 | 1 | -1 | 1 |
| 64 | -1 | -1 | 1 | 1 | -1 | -1 | 1 | -1 | 1 | 1 | 1 | -1 | -1 | 1 | -1 | 1 | -1 | 1 | -1 |
| 65 | -1 | -1 | 1 | 1 | -1 | -1 | 1 | 1 | -1 | 1 | 1 | -1 | -1 | -1 | -1 | -1 | -1 | -1 | 1 |
| 66 | -1 | -1 | 1 | 1 | -1 | -1 | 1 | 1 | -1 | 1 | 1 | -1 | -1 | 1 | -1 | 1 | 1 | -1 | 1 |
| 67 | -1 | -1 | 1 | 1 | -1 | -1 | 1 | 1 | -1 | 1 | 1 | -1 | 1 | 1 | 1 | -1 | -1 | -1 | -1 |
| 68 | -1 | -1 | 1 | 1 | -1 | -1 | 1 | 1 | 1 | -1 | -1 | 1 | -1 | -1 | 1 | -1 | -1 | 1 | 1 |
| 69 | -1 | -1 | 1 | 1 | -1 | -1 | 1 | 1 | 1 | 1 | 1 | -1 | -1 | -1 | -1 | -1 | 1 | 1 | 1 |
| 70 | -1 | -1 | 1 | 1 | -1 | -1 | 1 | 1 | 1 | 1 | 1 | -1 | -1 | 1 | -1 | 1 | 1 | -1 | 1 |
| 71 | -1 | -1 | 1 | 1 | -1 | 1 | -1 | -1 | 1 | -1 | -1 | 1 | 1 | 1 | 1 | 1 | 1 | -1 | 1 |
| 72 | -1 | -1 | 1 | 1 | -1 | 1 | -1 | 1 | -1 | 1 | -1 | 1 | -1 | -1 | -1 | -1 | 1 | 1 | 1 |
| 73 | -1 | -1 | 1 | 1 | -1 | 1 | -1 | 1 | 1 | 1 | 1 | -1 | 1 | 1 | -1 | 1 | -1 | -1 | -1 |
| 74 | -1 | -1 | 1 | 1 | -1 | 1 | 1 | 1 | -1 | -1 | 1 | 1 | -1 | -1 | -1 | 1 | 1 | -1 | 1 |
| 75 | -1 | -1 | 1 | 1 | -1 | 1 | 1 | 1 | -1 | -1 | 1 | 1 | 1 | -1 | -1 | 1 | -1 | 1 | 1 |
| 76 | -1 | -1 | 1 | 1 | -1 | 1 | 1 | 1 | -1 | 1 | 1 | -1 | -1 | 1 | -1 | 1 | 1 | -1 | 1 |
| 77 | -1 | -1 | 1 | 1 | -1 | 1 | 1 | 1 | -1 | 1 | 1 | -1 | 1 | 1 | -1 | 1 | -1 | 1 | -1 |
| 78 | -1 | -1 | 1 | 1 | -1 | 1 | 1 | 1 | -1 | 1 | 1 | -1 | 1 | 1 | -1 | 1 | -1 | 1 | 1 |
| 79 | -1 | -1 | 1 | 1 | -1 | 1 | 1 | 1 | 1 | 1 | -1 | -1 | 1 | -1 | 1 | 1 | 1 | -1 | -1 |
| 80 | -1 | -1 | 1 | 1 | 1 | -1 | -1 | -1 | 1 | -1 | 1 | -1 | 1 | -1 | 1 | -1 | 1 | 1 | 1 |
| 81 | -1 | -1 | 1 | 1 | 1 | 1 | -1 | -1 | -1 | -1 | 1 | -1 | 1 | -1 | 1 | -1 | 1 | -1 | 1 |
| 82 | -1 | -1 | 1 | 1 | 1 | 1 | -1 | -1 | -1 | -1 | 1 | -1 | 1 | -1 | 1 | 1 | 1 | -1 | 1 |
| 83 | -1 | -1 | 1 | 1 | 1 | 1 | -1 | -1 | -1 | -1 | 1 | -1 | 1 | -1 | 1 | 1 | 1 | 1 | 1 |
| 84 | -1 | -1 | 1 | 1 | 1 | 1 | -1 | -1 | -1 | 1 | 1 | -1 | -1 | 1 | 1 | 1 | 1 | 1 | -1 |
| 85 | -1 | -1 | 1 | 1 | 1 | 1 | -1 | -1 | -1 | 1 | 1 | -1 | 1 | -1 | 1 | 1 | 1 | 1 | 1 |
| 86 | -1 | 1 | -1 | -1 | -1 | 1 | 1 | -1 | 1 | -1 | 1 | -1 | 1 | -1 | 1 | 1 | 1 | 1 | 1 |
| 87 | -1 | 1 | -1 | -1 | -1 | 1 | 1 | 1 | -1 | 1 | 1 | -1 | 1 | 1 | 1 | -1 | -1 | -1 | 1 |
| 88 | -1 | 1 | -1 | -1 | 1 | -1 | -1 | 1 | -1 | 1 | 1 | -1 | 1 | -1 | 1 | 1 | -1 | 1 | 1 |
| 89 | -1 | 1 | -1 | -1 | 1 | -1 | 1 | 1 | 1 | 1 | -1 | 1 | 1 | 1 | 1 | 1 | -1 | 1 | 1 |
| 90 | -1 | 1 | -1 | -1 | 1 | 1 | -1 | 1 | 1 | -1 | -1 | 1 | 1 | -1 | 1 | 1 | 1 | 1 | -1 |
| 91 | -1 | 1 | -1 | -1 | 1 | -1 | 1 | -1 | 1 | -1 | 1 | 1 | 1 | 1 | 1 | -1 | -1 | -1 | 1 |
| 92 | -1 | 1 | -1 | -1 | 1 | -1 | 1 | -1 | 1 | 1 | 1 | -1 | 1 | 1 | -1 | 1 | 1 | -1 | -1 |
| 93 | -1 | 1 | -1 | -1 | 1 | 1 | 1 | -1 | 1 | -1 | 1 | 1 | -1 | -1 | 1 | 1 | -1 | -1 | 1 |
| 94 | -1 | 1 | -1 | -1 | 1 | 1 | 1 | 1 | 1 | -1 | 1 | 1 | 1 | 1 | -1 | -1 | -1 | 1 | -1 |
| 95 | -1 | 1 | -1 | 1 | -1 | -1 | -1 | 1 | -1 | 1 | 1 | 1 | -1 | 1 | 1 | 1 | 1 | 1 | -1 |
| 96 | -1 | 1 | -1 | 1 | -1 | -1 | -1 | 1 | 1 | -1 | 1 | 1 | -1 | 1 | -1 | -1 | -1 | 1 | 1 |
| 97 | -1 | 1 | -1 | 1 | -1 | -1 | -1 | 1 | 1 | 1 | -1 | -1 | 1 | -1 | 1 | 1 | -1 | 1 | 1 |
| 98 | -1 | 1 | -1 | 1 | -1 | -1 | 1 | -1 | 1 | 1 | 1 | -1 | 1 | -1 | 1 | 1 | 1 | -1 | 1 |
| 99 | -1 | 1 | -1 | 1 | -1 | 1 | 1 | -1 | -1 | -1 | 1 | 1 | 1 | 1 | 1 | -1 | -1 | 1 | 1 |
| 100 | -1 | 1 | -1 | 1 | -1 | 1 | -1 | -1 | 1 | -1 | -1 | 1 | -1 | 1 | 1 | 1 | 1 | 1 | -1 |
| 101 | -1 | 1 | -1 | 1 | -1 | 1 | -1 | 1 | 1 | -1 | -1 | 1 | -1 | 1 | -1 | 1 | 1 | 1 | 1 |
| 102 | -1 | 1 | -1 | 1 | -1 | 1 | 1 | -1 | -1 | 1 | 1 | -1 | 1 | 1 | -1 | 1 | 1 | -1 | -1 |
| 103 | -1 | 1 | -1 | 1 | -1 | 1 | 1 | 1 | -1 | 1 | 1 | -1 | 1 | -1 | 1 | 1 | 1 | -1 | 1 |
| 104 | -1 | 1 | -1 | 1 | -1 | 1 | 1 | -1 | 1 | 1 | -1 | 1 | -1 | 1 | 1 | 1 | -1 | -1 | 1 |
| 105 | -1 | 1 | -1 | 1 | -1 | 1 | 1 | 1 | 1 | -1 | -1 | -1 | 1 | -1 | 1 | 1 | 1 | -1 | 1 |
| 106 | -1 | 1 | -1 | 1 | 1 | -1 | -1 | 1 | -1 | 1 | 1 | -1 | -1 | -1 | 1 | 1 | -1 | 1 | -1 |
| 107 | -1 | 1 | -1 | 1 | 1 | 1 | -1 | -1 | -1 | -1 | 1 | 1 | -1 | -1 | 1 | 1 | 1 | -1 | 1 |
| 108 | -1 | 1 | -1 | 1 | 1 | 1 | -1 | -1 | -1 | 1 | 1 | -1 | -1 | -1 | 1 | 1 | -1 | -1 | 1 |
| 109 | -1 | 1 | -1 | 1 | 1 | 1 | -1 | -1 | -1 | 1 | 1 | -1 | -1 | 1 | -1 | -1 | 1 | -1 | 1 |
| 110 | -1 | 1 | 1 | -1 | -1 | -1 | -1 | 1 | -1 | 1 | 1 | -1 | 1 | -1 | -1 | -1 | 1 | 1 | -1 |
| 111 | -1 | 1 | 1 | -1 | -1 | -1 | 1 | -1 | 1 | 1 | 1 | -1 | -1 | -1 | -1 | -1 | 1 | -1 | 1 |
| 112 | -1 | 1 | 1 | -1 | -1 | -1 | 1 | -1 | 1 | 1 | 1 | -1 | 1 | 1 | 1 | 1 | 1 | -1 | 1 |
| 113 | -1 | 1 | 1 | -1 | -1 | -1 | 1 | -1 | 1 | -1 | 1 | -1 | -1 | -1 | -1 | 1 | 1 | 1 | 1 |
| 114 | -1 | 1 | 1 | -1 | -1 | 1 | 1 | -1 | -1 | 1 | 1 | 1 | 1 | 1 | -1 | 1 | 1 | -1 | -1 |
| 115 | -1 | 1 | 1 | -1 | -1 | 1 | -1 | -1 | 1 | -1 | 1 | -1 | 1 | 1 | -1 | 1 | 1 | -1 | 1 |
| 116 | -1 | 1 | 1 | -1 | -1 | 1 | -1 | -1 | 1 | 1 | -1 | -1 | 1 | 1 | 1 | -1 | 1 | 1 | 1 |
| 117 | -1 | 1 | 1 | -1 | -1 | 1 | -1 | 1 | -1 | 1 | 1 | 1 | -1 | -1 | 1 | 1 | -1 | -1 | 1 |
| 118 | -1 | 1 | 1 | -1 | -1 | 1 | 1 | -1 | 1 | -1 | 1 | -1 | 1 | 1 | -1 | 1 | -1 | 1 | 1 |
| 119 | -1 | 1 | 1 | -1 | 1 | -1 | -1 | -1 | 1 | -1 | 1 | 1 | -1 | 1 | -1 | -1 | -1 | 1 | -1 |
| 120 | -1 | 1 | 1 | -1 | 1 | -1 | -1 | -1 | 1 | -1 | 1 | 1 | 1 | -1 | 1 | -1 | -1 | -1 | -1 |
| 121 | -1 | 1 | 1 | -1 | 1 | -1 | 1 | 1 | 1 | -1 | 1 | -1 | 1 | -1 | -1 | -1 | 1 | 1 | -1 |
| 122 | -1 | 1 | 1 | -1 | 1 | 1 | -1 | 1 | -1 | -1 | 1 | -1 | 1 | 1 | -1 | 1 | 1 | 1 | 1 |
| 123 | -1 | 1 | 1 | -1 | 1 | -1 | -1 | 1 | -1 | -1 | 1 | 1 | 1 | 1 | -1 | -1 | 1 | -1 | 1 |
| 124 | -1 | 1 | 1 | -1 | 1 | -1 | 1 | -1 | -1 | -1 | 1 | 1 | 1 | -1 | 1 | -1 | 1 | -1 | 1 |
| 125 | -1 | 1 | 1 | -1 | 1 | -1 | 1 | -1 | -1 | -1 | 1 | 1 | 1 | -1 | 1 | 1 | 1 | -1 | 1 |
| 126 | -1 | 1 | 1 | -1 | 1 | 1 | 1 | -1 | 1 | -1 | 1 | -1 | 1 | -1 | -1 | 1 | 1 | -1 | 1 |
| 127 | -1 | 1 | 1 | -1 | 1 | 1 | -1 | 1 | 1 | -1 | 1 | -1 | -1 | -1 | 1 | -1 | 1 | 1 | 1 |
| 128 | -1 | 1 | 1 | 1 | -1 | 1 | -1 | -1 | -1 | 1 | -1 | -1 | -1 | 1 | -1 | 1 | -1 | 1 | 1 |
| 129 | -1 | 1 | 1 | 1 | -1 | 1 | -1 | -1 | 1 | 1 | -1 | 1 | -1 | -1 | -1 | 1 | -1 | 1 | 1 |
| 130 | -1 | 1 | 1 | 1 | -1 | 1 | -1 | -1 | 1 | 1 | -1 | 1 | -1 | 1 | -1 | 1 | 1 | -1 | 1 |
| 131 | -1 | 1 | 1 | 1 | -1 | -1 | 1 | -1 | -1 | -1 | -1 | 1 | 1 | -1 | 1 | 1 | -1 | 1 | -1 |
| 132 | -1 | 1 | 1 | 1 | -1 | -1 | 1 | -1 | 1 | -1 | 1 | 1 | -1 | 1 | -1 | 1 | -1 | -1 | 1 |
| 133 | -1 | 1 | 1 | 1 | -1 | -1 | 1 | -1 | 1 | -1 | 1 | -1 | -1 | 1 | -1 | 1 | 1 | -1 | 1 |
| 134 | -1 | 1 | 1 | 1 | -1 | -1 | -1 | 1 | -1 | 1 | -1 | 1 | 1 | -1 | 1 | -1 | 1 | -1 | 1 |
| 135 | -1 | 1 | 1 | 1 | -1 | 1 | -1 | -1 | -1 | -1 | 1 | -1 | -1 | -1 | 1 | 1 | -1 | 1 | -1 |
| 136 | -1 | 1 | 1 | 1 | -1 | 1 | -1 | -1 | -1 | -1 | -1 | -1 | -1 | -1 | 1 | -1 | -1 | -1 | 1 |
| 137 | -1 | 1 | 1 | 1 | -1 | 1 | -1 | -1 | 1 | -1 | -1 | -1 | -1 | -1 | 1 | 1 | 1 | -1 | -1 |
| 138 | 1 | -1 | -1 | -1 | -1 | -1 | 1 | -1 | 1 | -1 | 1 | 1 | 1 | -1 | -1 | 1 | -1 | 1 | 1 |
| 139 | 1 | -1 | -1 | -1 | -1 | 1 | -1 | 1 | 1 | -1 | 1 | -1 | 1 | 1 | 1 | 1 | 1 | 1 | -1 |
| 140 | 1 | -1 | -1 | -1 | -1 | 1 | -1 | 1 | 1 | 1 | 1 | -1 | 1 | 1 | -1 | -1 | 1 | 1 | -1 |

TABLE 1a-continued

| | | | | | | | | | | | | | | | | | | | |
|---|---|---|---|---|---|---|---|---|---|---|---|---|---|---|---|---|---|---|---|
| 141 | 1 | −1 | −1 | −1 | −1 | 1 | 1 | −1 | 1 | −1 | 1 | −1 | 1 | 1 | −1 | −1 | −1 | 1 | 1 |
| 142 | 1 | −1 | −1 | −1 | −1 | 1 | 1 | −1 | 1 | −1 | 1 | 1 | −1 | −1 | −1 | −1 | 1 | −1 | 1 |
| 143 | 1 | −1 | −1 | −1 | −1 | 1 | 1 | −1 | 1 | 1 | 1 | −1 | −1 | −1 | −1 | 1 | 1 | −1 | 1 |
| 144 | 1 | −1 | −1 | −1 | −1 | 1 | 1 | −1 | 1 | 1 | 1 | 1 | −1 | −1 | 1 | −1 | 1 | −1 | 1 |
| 145 | 1 | −1 | −1 | −1 | −1 | 1 | 1 | 1 | 1 | −1 | −1 | 1 | −1 | −1 | −1 | −1 | 1 | 1 | −1 |
| 146 | 1 | −1 | −1 | −1 | −1 | 1 | 1 | 1 | 1 | −1 | −1 | 1 | 1 | −1 | 1 | 1 | 1 | −1 | −1 |
| 147 | 1 | −1 | −1 | −1 | 1 | −1 | −1 | 1 | 1 | 1 | 1 | −1 | −1 | −1 | −1 | 1 | 1 | −1 | 1 |
| 148 | 1 | −1 | −1 | −1 | 1 | 1 | −1 | 1 | 1 | 1 | 1 | −1 | 1 | 1 | −1 | 1 | −1 | 1 | 1 |
| 149 | 1 | −1 | −1 | −1 | 1 | 1 | 1 | −1 | −1 | −1 | 1 | −1 | −1 | 1 | −1 | 1 | 1 | 1 | 1 |
| 150 | 1 | −1 | −1 | 1 | −1 | −1 | 1 | −1 | 1 | −1 | 1 | 1 | −1 | 1 | 1 | 1 | 1 | 1 | −1 |
| 151 | 1 | −1 | −1 | 1 | −1 | −1 | 1 | 1 | 1 | 1 | 1 | −1 | −1 | 1 | −1 | −1 | −1 | −1 | 1 |
| 152 | 1 | −1 | −1 | 1 | −1 | 1 | −1 | −1 | 1 | 1 | 1 | −1 | −1 | 1 | −1 | 1 | −1 | 1 | 1 |
| 153 | 1 | −1 | −1 | 1 | −1 | 1 | −1 | 1 | 1 | 1 | 1 | −1 | 1 | −1 | 1 | −1 | −1 | −1 | 1 |
| 154 | 1 | −1 | −1 | 1 | −1 | 1 | 1 | 1 | −1 | 1 | 1 | −1 | −1 | −1 | −1 | 1 | 1 | 1 | −1 |
| 155 | 1 | −1 | −1 | 1 | −1 | 1 | −1 | 1 | −1 | 1 | 1 | −1 | −1 | −1 | −1 | 1 | 1 | 1 | 1 |
| 156 | 1 | −1 | −1 | 1 | −1 | 1 | 1 | 1 | 1 | 1 | 1 | −1 | −1 | −1 | 1 | 1 | 1 | 1 | 1 |
| 157 | 1 | −1 | −1 | 1 | −1 | 1 | 1 | 1 | 1 | 1 | 1 | −1 | −1 | 1 | 1 | −1 | −1 | 1 | 1 |
| 158 | 1 | −1 | −1 | 1 | 1 | −1 | −1 | 1 | −1 | 1 | 1 | −1 | −1 | 1 | 1 | 1 | −1 | −1 | 1 |
| 159 | 1 | −1 | −1 | 1 | 1 | −1 | −1 | 1 | 1 | 1 | −1 | −1 | −1 | −1 | 1 | 1 | 1 | 1 | 1 |
| 160 | 1 | −1 | −1 | 1 | 1 | −1 | 1 | −1 | −1 | −1 | 1 | 1 | −1 | −1 | 1 | 1 | 1 | 1 | 1 |
| 161 | 1 | −1 | 1 | −1 | −1 | −1 | −1 | 1 | 1 | 1 | −1 | −1 | 1 | 1 | 1 | −1 | 1 | 1 | 1 |
| 162 | 1 | −1 | 1 | −1 | −1 | −1 | −1 | 1 | 1 | 1 | 1 | −1 | 1 | 1 | 1 | 1 | 1 | −1 | −1 |
| 163 | 1 | −1 | 1 | −1 | −1 | −1 | −1 | 1 | 1 | 1 | −1 | 1 | 1 | −1 | −1 | 1 | −1 | −1 | 1 |
| 164 | 1 | −1 | 1 | −1 | −1 | −1 | 1 | −1 | −1 | 1 | 1 | −1 | 1 | 1 | 1 | 1 | 1 | 1 | 1 |
| 165 | 1 | −1 | 1 | −1 | −1 | −1 | 1 | 1 | 1 | 1 | −1 | 1 | 1 | −1 | −1 | 1 | −1 | −1 | 1 |
| 166 | 1 | −1 | 1 | −1 | −1 | −1 | 1 | 1 | 1 | −1 | 1 | −1 | −1 | 1 | 1 | 1 | −1 | 1 | 1 |
| 167 | 1 | −1 | 1 | −1 | −1 | 1 | −1 | −1 | 1 | −1 | 1 | 1 | −1 | 1 | 1 | −1 | 1 | −1 | −1 |
| 168 | 1 | −1 | 1 | −1 | 1 | −1 | −1 | 1 | −1 | 1 | 1 | −1 | −1 | −1 | 1 | 1 | 1 | 1 | 1 |
| 169 | 1 | −1 | 1 | −1 | −1 | −1 | −1 | 1 | −1 | 1 | −1 | 1 | 1 | 1 | 1 | −1 | 1 | 1 | 1 |
| 170 | 1 | −1 | 1 | −1 | −1 | 1 | −1 | 1 | 1 | 1 | 1 | −1 | 1 | −1 | 1 | −1 | 1 | 1 | −1 |
| 171 | 1 | −1 | 1 | −1 | 1 | 1 | −1 | 1 | −1 | −1 | −1 | 1 | −1 | 1 | 1 | −1 | 1 | 1 | 1 |
| 172 | 1 | −1 | 1 | 1 | −1 | 1 | −1 | 1 | −1 | 1 | −1 | −1 | −1 | −1 | 1 | 1 | 1 | 1 | −1 |
| 173 | 1 | −1 | 1 | 1 | −1 | 1 | 1 | 1 | 1 | −1 | 1 | −1 | −1 | −1 | 1 | 1 | 1 | −1 | 1 |
| 174 | 1 | −1 | 1 | 1 | −1 | 1 | 1 | 1 | −1 | 1 | −1 | 1 | −1 | −1 | 1 | −1 | 1 | 1 | −1 |
| 175 | 1 | −1 | 1 | 1 | −1 | 1 | 1 | −1 | 1 | −1 | −1 | 1 | 1 | −1 | −1 | 1 | 1 | 1 | −1 |
| 176 | 1 | −1 | 1 | 1 | 1 | −1 | −1 | −1 | 1 | −1 | −1 | 1 | −1 | −1 | −1 | 1 | 1 | 1 | −1 |
| 177 | 1 | −1 | 1 | 1 | 1 | 1 | −1 | −1 | 1 | −1 | −1 | 1 | −1 | 1 | −1 | −1 | 1 | 1 | 1 |
| 178 | 1 | 1 | −1 | −1 | −1 | −1 | −1 | 1 | 1 | 1 | −1 | 1 | −1 | 1 | −1 | 1 | 1 | −1 | 1 |
| 179 | 1 | 1 | −1 | −1 | −1 | −1 | 1 | −1 | −1 | 1 | 1 | 1 | 1 | 1 | 1 | 1 | 1 | −1 | 1 |
| 180 | 1 | 1 | −1 | −1 | −1 | −1 | 1 | 1 | −1 | 1 | −1 | −1 | 1 | −1 | 1 | 1 | 1 | 1 | 1 |
| 181 | 1 | 1 | −1 | −1 | −1 | 1 | −1 | 1 | −1 | 1 | 1 | −1 | −1 | −1 | 1 | −1 | 1 | 1 | −1 |
| 182 | 1 | 1 | −1 | −1 | −1 | 1 | −1 | −1 | 1 | 1 | 1 | 1 | −1 | 1 | −1 | 1 | −1 | 1 | 1 |
| 183 | 1 | 1 | −1 | −1 | −1 | 1 | −1 | 1 | −1 | 1 | −1 | −1 | 1 | −1 | −1 | 1 | 1 | 1 | 1 |
| 184 | 1 | 1 | −1 | −1 | −1 | 1 | 1 | −1 | 1 | −1 | −1 | 1 | −1 | −1 | 1 | 1 | −1 | 1 | 1 |
| 185 | 1 | 1 | −1 | −1 | −1 | 1 | 1 | 1 | −1 | −1 | 1 | 1 | −1 | 1 | −1 | −1 | 1 | −1 | 1 |
| 186 | 1 | 1 | −1 | −1 | 1 | −1 | −1 | 1 | −1 | 1 | 1 | −1 | −1 | 1 | −1 | 1 | 1 | −1 | −1 |
| 187 | 1 | 1 | −1 | −1 | 1 | 1 | −1 | 1 | −1 | 1 | −1 | 1 | −1 | −1 | 1 | −1 | 1 | −1 | 1 |
| 188 | 1 | 1 | −1 | −1 | 1 | 1 | 1 | −1 | 1 | −1 | 1 | 1 | −1 | −1 | 1 | 1 | −1 | 1 | 1 |
| 189 | 1 | 1 | −1 | 1 | −1 | 1 | −1 | −1 | −1 | 1 | −1 | 1 | 1 | −1 | 1 | −1 | 1 | 1 | −1 |
| 190 | 1 | 1 | −1 | 1 | −1 | 1 | −1 | 1 | −1 | −1 | −1 | −1 | 1 | 1 | −1 | 1 | 1 | −1 | 1 |
| 191 | 1 | 1 | −1 | 1 | −1 | −1 | 1 | 1 | −1 | −1 | −1 | 1 | 1 | 1 | 1 | 1 | −1 | −1 | 1 |
| 192 | 1 | 1 | −1 | 1 | −1 | 1 | −1 | 1 | −1 | −1 | 1 | −1 | −1 | 1 | −1 | 1 | 1 | 1 | 1 |
| 193 | 1 | 1 | −1 | 1 | −1 | 1 | 1 | −1 | 1 | −1 | −1 | −1 | 1 | −1 | 1 | −1 | 1 | −1 | −1 |
| 194 | 1 | 1 | −1 | 1 | −1 | 1 | 1 | 1 | 1 | −1 | −1 | −1 | 1 | −1 | 1 | 1 | −1 | 1 | 1 |
| 195 | 1 | 1 | −1 | 1 | −1 | 1 | 1 | −1 | 1 | 1 | −1 | 1 | −1 | 1 | 1 | −1 | 1 | 1 | 1 |
| 196 | 1 | 1 | −1 | 1 | 1 | −1 | −1 | −1 | −1 | 1 | 1 | 1 | 1 | −1 | 1 | 1 | 1 | 1 | −1 |
| 197 | 1 | 1 | −1 | 1 | 1 | −1 | −1 | −1 | −1 | 1 | 1 | 1 | −1 | 1 | −1 | 1 | 1 | −1 | −1 |
| 198 | 1 | 1 | −1 | 1 | 1 | 1 | −1 | 1 | 1 | 1 | 1 | −1 | −1 | −1 | 1 | 1 | 1 | 1 | 1 |
| 199 | 1 | 1 | −1 | 1 | 1 | 1 | 1 | −1 | −1 | −1 | 1 | −1 | −1 | 1 | 1 | 1 | −1 | −1 | −1 |
| 200 | 1 | 1 | −1 | 1 | 1 | 1 | 1 | −1 | −1 | −1 | 1 | 1 | −1 | 1 | −1 | 1 | 1 | −1 | 1 |
| 201 | 1 | 1 | −1 | 1 | −1 | 1 | 1 | 1 | 1 | −1 | −1 | −1 | −1 | 1 | 1 | 1 | −1 | 1 | 1 |
| 202 | 1 | 1 | −1 | 1 | 1 | −1 | 1 | 1 | −1 | 1 | −1 | −1 | 1 | −1 | 1 | −1 | −1 | −1 | 1 |
| 203 | 1 | 1 | −1 | 1 | −1 | 1 | −1 | 1 | 1 | −1 | 1 | −1 | −1 | 1 | −1 | −1 | 1 | 1 | 1 |
| 204 | 1 | 1 | −1 | 1 | 1 | 1 | −1 | 1 | −1 | 1 | −1 | 1 | 1 | −1 | −1 | −1 | 1 | 1 | 1 |
| 205 | 1 | 1 | 1 | −1 | 1 | −1 | −1 | −1 | −1 | −1 | −1 | 1 | 1 | −1 | −1 | 1 | 1 | −1 | 1 |
| 206 | 1 | 1 | 1 | −1 | 1 | −1 | 1 | 1 | −1 | −1 | 1 | −1 | 1 | −1 | 1 | 1 | 1 | −1 | 1 |
| 207 | 1 | 1 | 1 | −1 | 1 | 1 | −1 | −1 | −1 | 1 | −1 | 1 | −1 | 1 | 1 | 1 | −1 | 1 | −1 |
| 208 | 1 | 1 | 1 | −1 | 1 | 1 | 1 | −1 | −1 | −1 | 1 | 1 | 1 | 1 | 1 | −1 | 1 | 1 | 1 |
| 209 | 1 | 1 | 1 | −1 | 1 | −1 | −1 | −1 | −1 | 1 | −1 | 1 | 1 | 1 | −1 | 1 | 1 | 1 | 1 |
| 210 | 1 | 1 | 1 | −1 | 1 | −1 | −1 | 1 | −1 | 1 | −1 | 1 | −1 | 1 | 1 | −1 | 1 | −1 | 1 |
| 211 | 1 | 1 | 1 | −1 | 1 | −1 | −1 | −1 | 1 | −1 | 1 | 1 | −1 | 1 | 1 | 1 | 1 | 1 | 1 |
| 212 | 1 | 1 | 1 | −1 | 1 | 1 | −1 | 1 | −1 | 1 | 1 | −1 | −1 | 1 | −1 | 1 | 1 | 1 | 1 |
| 213 | 1 | 1 | 1 | −1 | 1 | −1 | −1 | 1 | −1 | 1 | −1 | 1 | −1 | 1 | −1 | −1 | 1 | −1 | 1 |
| 214 | 1 | 1 | 1 | −1 | 1 | 1 | −1 | 1 | 1 | −1 | 1 | −1 | −1 | −1 | 1 | 1 | 1 | −1 | −1 |
| 215 | 1 | 1 | 1 | −1 | 1 | 1 | −1 | 1 | −1 | −1 | 1 | −1 | 1 | −1 | 1 | −1 | 1 | 1 | 1 |
| 216 | 1 | 1 | 1 | −1 | 1 | 1 | 1 | −1 | 1 | −1 | −1 | 1 | 1 | −1 | −1 | −1 | 1 | 1 | 1 |
| 217 | 1 | 1 | 1 | −1 | 1 | 1 | 1 | 1 | −1 | −1 | −1 | 1 | 1 | −1 | 1 | 1 | 1 | 1 | −1 |
| 218 | 1 | 1 | 1 | −1 | 1 | −1 | 1 | −1 | −1 | 1 | −1 | −1 | 1 | −1 | 1 | −1 | 1 | 1 | 1 |
| 219 | 1 | 1 | 1 | 1 | −1 | −1 | −1 | −1 | −1 | −1 | 1 | −1 | 1 | −1 | 1 | 1 | −1 | −1 | 1 |
| 220 | 1 | 1 | 1 | 1 | −1 | −1 | −1 | −1 | −1 | 1 | 1 | −1 | −1 | 1 | 1 | 1 | −1 | −1 | 1 |

TABLE 1a-continued

| | | | | | | | | | | | | | | | | | | | |
|---|---|---|---|---|---|---|---|---|---|---|---|---|---|---|---|---|---|---|---|
| 221 | 1 | 1 | 1 | 1 | -1 | -1 | -1 | -1 | 1 | 1 | -1 | 1 | -1 | -1 | 1 | -1 | 1 | -1 | 1 |
| 222 | 1 | 1 | 1 | 1 | -1 | -1 | -1 | 1 | -1 | -1 | -1 | 1 | -1 | 1 | -1 | 1 | -1 | -1 | 1 |
| 223 | 1 | 1 | 1 | 1 | -1 | -1 | 1 | -1 | -1 | -1 | 1 | -1 | 1 | -1 | 1 | -1 | -1 | -1 | 1 |
| 224 | 1 | 1 | 1 | 1 | -1 | -1 | 1 | -1 | -1 | 1 | -1 | -1 | -1 | 1 | 1 | -1 | 1 | 1 | |
| 225 | 1 | 1 | 1 | 1 | -1 | 1 | -1 | -1 | -1 | -1 | -1 | 1 | -1 | 1 | -1 | 1 | 1 | -1 | -1 |

| Number of a sequence | T(n) sequence body | | | | | | | | | | | | |
|---|---|---|---|---|---|---|---|---|---|---|---|---|---|
| 1 | -1 | -1 | 1 | -1 | -1 | 1 | 1 | 1 | -1 | -1 | -1 | 1 | 1 |
| 2 | -1 | 1 | 1 | -1 | 1 | -1 | 1 | -1 | 1 | -1 | -1 | 1 | 1 |
| 3 | -1 | 1 | -1 | -1 | 1 | -1 | 1 | 1 | -1 | -1 | -1 | 1 | 1 |
| 4 | -1 | -1 | 1 | 1 | -1 | 1 | -1 | 1 | 1 | -1 | -1 | 1 | 1 |
| 5 | 1 | -1 | 1 | 1 | -1 | -1 | 1 | 1 | -1 | -1 | 1 | 1 | -1 |
| 6 | 1 | 1 | -1 | 1 | 1 | -1 | 1 | -1 | 1 | -1 | 1 | -1 | -1 |
| 7 | -1 | -1 | 1 | 1 | -1 | 1 | -1 | -1 | 1 | 1 | -1 | -1 | 1 |
| 8 | 1 | 1 | -1 | 1 | 1 | 1 | -1 | -1 | -1 | -1 | 1 | 1 | -1 |
| 9 | 1 | -1 | -1 | 1 | 1 | 1 | -1 | -1 | -1 | -1 | -1 | 1 | 1 |
| 10 | -1 | -1 | 1 | 1 | 1 | 1 | -1 | -1 | 1 | -1 | -1 | -1 | 1 |
| 11 | 1 | 1 | -1 | -1 | -1 | 1 | -1 | 1 | -1 | -1 | -1 | 1 | 1 |
| 12 | -1 | -1 | 1 | -1 | -1 | 1 | -1 | 1 | 1 | -1 | -1 | -1 | 1 |
| 13 | -1 | -1 | 1 | 1 | 1 | -1 | 1 | -1 | 1 | -1 | -1 | 1 | 1 |
| 14 | 1 | -1 | -1 | 1 | -1 | 1 | 1 | -1 | -1 | 1 | -1 | 1 | -1 |
| 15 | 1 | 1 | 1 | 1 | -1 | -1 | 1 | 1 | -1 | 1 | 1 | -1 | -1 |
| 16 | -1 | -1 | -1 | 1 | 1 | -1 | 1 | 1 | 1 | -1 | 1 | 1 | -1 |
| 17 | 1 | 1 | -1 | -1 | 1 | 1 | -1 | 1 | -1 | -1 | 1 | 1 | 1 |
| 18 | -1 | -1 | 1 | 1 | 1 | -1 | -1 | 1 | -1 | -1 | 1 | 1 | 1 |
| 19 | -1 | 1 | 1 | -1 | -1 | 1 | -1 | 1 | -1 | -1 | 1 | 1 | 1 |
| 20 | 1 | -1 | 1 | 1 | -1 | 1 | 1 | 1 | -1 | -1 | 1 | 1 | 1 |
| 21 | -1 | -1 | -1 | 1 | 1 | 1 | -1 | -1 | 1 | -1 | 1 | 1 | 1 |
| 22 | -1 | -1 | 1 | -1 | 1 | -1 | 1 | -1 | 1 | -1 | 1 | 1 | 1 |
| 23 | 1 | 1 | -1 | 1 | 1 | -1 | 1 | -1 | -1 | -1 | 1 | -1 | 1 |
| 24 | 1 | -1 | -1 | 1 | -1 | 1 | 1 | 1 | -1 | 1 | -1 | 1 | 1 |
| 25 | 1 | 1 | 1 | 1 | -1 | -1 | 1 | -1 | -1 | -1 | -1 | 1 | 1 |
| 26 | -1 | -1 | 1 | -1 | 1 | 1 | 1 | 1 | -1 | 1 | -1 | 1 | -1 |
| 27 | -1 | 1 | -1 | 1 | 1 | 1 | -1 | 1 | -1 | -1 | 1 | 1 | -1 |
| 28 | 1 | 1 | -1 | -1 | -1 | -1 | 1 | 1 | -1 | -1 | 1 | 1 | 1 |
| 29 | 1 | -1 | 1 | -1 | 1 | 1 | 1 | 1 | -1 | -1 | -1 | 1 | 1 |
| 30 | 1 | 1 | -1 | 1 | -1 | 1 | -1 | 1 | -1 | 1 | 1 | 1 | 1 |
| 31 | -1 | -1 | 1 | -1 | 1 | 1 | -1 | -1 | 1 | 1 | -1 | 1 | -1 |
| 32 | 1 | 1 | 1 | -1 | 1 | -1 | 1 | 1 | -1 | -1 | 1 | -1 | 1 |
| 33 | -1 | 1 | 1 | 1 | -1 | 1 | 1 | -1 | -1 | -1 | 1 | 1 | -1 |
| 34 | 1 | -1 | 1 | 1 | -1 | -1 | 1 | -1 | -1 | -1 | 1 | -1 | 1 |
| 35 | 1 | -1 | 1 | -1 | -1 | -1 | 1 | -1 | 1 | -1 | -1 | 1 | 1 |
| 36 | -1 | -1 | 1 | 1 | 1 | -1 | 1 | -1 | 1 | -1 | 1 | 1 | -1 |
| 37 | 1 | -1 | -1 | 1 | 1 | 1 | 1 | -1 | -1 | 1 | 1 | -1 | 1 |
| 38 | -1 | -1 | 1 | 1 | -1 | 1 | -1 | 1 | -1 | 1 | -1 | -1 | 1 |
| 39 | 1 | -1 | 1 | -1 | -1 | -1 | 1 | 1 | 1 | 1 | -1 | -1 | -1 |
| 40 | -1 | 1 | -1 | 1 | 1 | 1 | -1 | -1 | -1 | -1 | 1 | -1 | 1 |
| 41 | 1 | -1 | 1 | 1 | 1 | -1 | 1 | -1 | 1 | 1 | 1 | -1 | 1 |
| 42 | -1 | -1 | 1 | 1 | 1 | -1 | 1 | -1 | 1 | 1 | -1 | -1 | 1 |
| 43 | 1 | 1 | 1 | -1 | 1 | -1 | 1 | -1 | 1 | -1 | -1 | 1 | -1 |
| 44 | -1 | -1 | 1 | 1 | -1 | 1 | -1 | 1 | -1 | 1 | -1 | -1 | 1 |
| 45 | 1 | -1 | 1 | 1 | -1 | 1 | 1 | 1 | 1 | 1 | -1 | -1 | 1 |
| 46 | -1 | 1 | 1 | -1 | -1 | 1 | 1 | 1 | 1 | -1 | -1 | 1 | -1 |
| 47 | 1 | 1 | -1 | 1 | 1 | 1 | -1 | -1 | -1 | -1 | 1 | -1 | 1 |
| 48 | 1 | 1 | -1 | -1 | -1 | -1 | 1 | -1 | -1 | 1 | 1 | 1 | -1 |
| 49 | -1 | -1 | 1 | -1 | -1 | -1 | 1 | 1 | 1 | 1 | 1 | -1 | 1 |
| 50 | 1 | 1 | -1 | -1 | 1 | -1 | 1 | 1 | -1 | -1 | -1 | -1 | 1 |
| 51 | 1 | 1 | 1 | 1 | -1 | -1 | 1 | 1 | 1 | -1 | -1 | 1 | 1 |
| 52 | -1 | -1 | 1 | 1 | 1 | -1 | -1 | 1 | -1 | -1 | -1 | 1 | 1 |
| 53 | 1 | 1 | 1 | 1 | -1 | -1 | 1 | -1 | -1 | 1 | 1 | -1 | 1 |
| 54 | 1 | 1 | -1 | 1 | -1 | 1 | 1 | 1 | -1 | -1 | 1 | 1 | -1 |
| 55 | -1 | -1 | 1 | 1 | 1 | -1 | 1 | -1 | -1 | 1 | 1 | 1 | -1 |
| 56 | -1 | 1 | 1 | 1 | -1 | -1 | 1 | -1 | -1 | -1 | 1 | 1 | 1 |
| 57 | 1 | 1 | -1 | 1 | 1 | 1 | -1 | -1 | 1 | 1 | 1 | -1 | 1 |
| 58 | 1 | 1 | -1 | 1 | -1 | 1 | 1 | 1 | -1 | 1 | -1 | -1 | 1 |
| 59 | 1 | 1 | 1 | -1 | -1 | 1 | 1 | 1 | -1 | 1 | -1 | -1 | 1 |
| 60 | -1 | 1 | 1 | -1 | 1 | -1 | 1 | 1 | -1 | -1 | 1 | -1 | 1 |
| 61 | -1 | 1 | -1 | 1 | 1 | -1 | -1 | -1 | 1 | -1 | 1 | 1 | -1 |
| 62 | 1 | -1 | -1 | 1 | 1 | 1 | 1 | 1 | -1 | -1 | 1 | 1 | 1 |
| 63 | -1 | -1 | 1 | -1 | 1 | -1 | 1 | 1 | 1 | 1 | -1 | -1 | -1 |
| 64 | -1 | 1 | 1 | 1 | 1 | -1 | 1 | 1 | -1 | -1 | 1 | 1 | 1 |
| 65 | 1 | 1 | -1 | 1 | -1 | 1 | 1 | -1 | 1 | -1 | 1 | 1 | 1 |
| 66 | -1 | -1 | 1 | -1 | -1 | 1 | 1 | 1 | 1 | -1 | 1 | -1 | -1 |
| 67 | -1 | 1 | -1 | 1 | -1 | 1 | 1 | 1 | 1 | 1 | -1 | -1 | -1 |
| 68 | 1 | 1 | 1 | -1 | -1 | 1 | -1 | 1 | 1 | -1 | 1 | 1 | -1 |
| 69 | 1 | -1 | 1 | -1 | 1 | 1 | -1 | 1 | 1 | -1 | 1 | 1 | -1 |
| 70 | -1 | 1 | -1 | -1 | 1 | -1 | 1 | 1 | -1 | 1 | 1 | -1 | -1 |
| 71 | -1 | -1 | 1 | -1 | 1 | -1 | 1 | -1 | -1 | -1 | 1 | 1 | -1 |

TABLE 1a-continued

| | | | | | | | | | | | | | |
|---|---|---|---|---|---|---|---|---|---|---|---|---|---|
| 72 | 1 | −1 | 1 | 1 | −1 | 1 | 1 | −1 | −1 | 1 | 1 | −1 | −1 |
| 73 | −1 | −1 | −1 | 1 | 1 | −1 | 1 | 1 | −1 | −1 | 1 | 1 | −1 |
| 74 | 1 | 1 | 1 | 1 | −1 | 1 | −1 | −1 | −1 | 1 | −1 | 1 | −1 |
| 75 | −1 | 1 | −1 | 1 | −1 | 1 | 1 | 1 | −1 | 1 | −1 | −1 | −1 |
| 76 | −1 | −1 | 1 | 1 | 1 | 1 | 1 | −1 | −1 | 1 | 1 | −1 | −1 |
| 77 | −1 | −1 | 1 | 1 | −1 | −1 | −1 | 1 | 1 | 1 | −1 | 1 | −1 |
| 78 | −1 | 1 | 1 | 1 | −1 | −1 | −1 | 1 | 1 | 1 | −1 | 1 | −1 |
| 79 | −1 | −1 | 1 | 1 | 1 | 1 | 1 | −1 | 1 | −1 | −1 | −1 | 1 |
| 80 | 1 | 1 | −1 | 1 | −1 | −1 | −1 | 1 | −1 | −1 | 1 | 1 | −1 |
| 81 | −1 | 1 | 1 | −1 | 1 | −1 | 1 | −1 | 1 | −1 | 1 | −1 | −1 |
| 82 | 1 | 1 | −1 | −1 | 1 | 1 | −1 | −1 | 1 | −1 | −1 | 1 | −1 |
| 83 | 1 | −1 | 1 | −1 | 1 | −1 | 1 | −1 | 1 | −1 | −1 | −1 | 1 |
| 84 | 1 | 1 | −1 | 1 | −1 | 1 | −1 | −1 | 1 | 1 | 1 | 1 | −1 |
| 85 | −1 | 1 | 1 | 1 | −1 | 1 | −1 | −1 | 1 | −1 | −1 | 1 | −1 |
| 86 | −1 | −1 | −1 | 1 | 1 | 1 | 1 | 1 | −1 | −1 | 1 | −1 | −1 |
| 87 | −1 | 1 | 1 | −1 | 1 | 1 | 1 | −1 | −1 | 1 | 1 | 1 | −1 |
| 88 | 1 | 1 | −1 | −1 | −1 | −1 | −1 | 1 | 1 | 1 | −1 | 1 | −1 |
| 89 | −1 | −1 | −1 | 1 | −1 | −1 | −1 | 1 | 1 | 1 | 1 | −1 | −1 |
| 90 | 1 | −1 | 1 | −1 | −1 | −1 | −1 | 1 | 1 | 1 | 1 | −1 | −1 |
| 91 | −1 | 1 | 1 | −1 | −1 | 1 | 1 | −1 | −1 | 1 | −1 | −1 | −1 |
| 92 | −1 | −1 | 1 | 1 | 1 | −1 | 1 | −1 | −1 | −1 | −1 | −1 | 1 |
| 93 | 1 | −1 | 1 | −1 | 1 | −1 | 1 | 1 | −1 | 1 | −1 | −1 | −1 |
| 94 | −1 | −1 | 1 | 1 | 1 | 1 | 1 | −1 | −1 | 1 | −1 | −1 | 1 |
| 95 | −1 | −1 | 1 | 1 | −1 | −1 | 1 | 1 | −1 | 1 | 1 | −1 | −1 |
| 96 | 1 | −1 | 1 | 1 | −1 | 1 | 1 | 1 | −1 | −1 | −1 | 1 | −1 |
| 97 | 1 | −1 | 1 | 1 | 1 | 1 | −1 | 1 | −1 | −1 | −1 | −1 | 1 |
| 98 | 1 | 1 | 1 | −1 | −1 | 1 | 1 | 1 | −1 | 1 | −1 | −1 | −1 |
| 99 | 1 | 1 | −1 | −1 | 1 | −1 | −1 | 1 | −1 | −1 | 1 | 1 | −1 |
| 100 | −1 | −1 | −1 | 1 | 1 | 1 | −1 | −1 | 1 | 1 | −1 | −1 | 1 |
| 101 | −1 | 1 | 1 | −1 | −1 | −1 | −1 | 1 | 1 | 1 | 1 | −1 | −1 |
| 102 | −1 | 1 | −1 | −1 | 1 | 1 | 1 | −1 | −1 | 1 | 1 | −1 | −1 |
| 103 | −1 | −1 | −1 | 1 | 1 | 1 | 1 | −1 | −1 | 1 | 1 | −1 | −1 |
| 104 | −1 | 1 | −1 | 1 | −1 | 1 | 1 | 1 | 1 | −1 | −1 | −1 | 1 |
| 105 | −1 | −1 | 1 | 1 | −1 | −1 | 1 | 1 | −1 | 1 | 1 | −1 | −1 |
| 106 | 1 | −1 | −1 | 1 | 1 | 1 | 1 | −1 | 1 | −1 | −1 | −1 | −1 |
| 107 | −1 | 1 | 1 | 1 | −1 | 1 | −1 | −1 | 1 | −1 | −1 | 1 | −1 |
| 108 | 1 | −1 | 1 | −1 | 1 | −1 | 1 | 1 | −1 | 1 | 1 | −1 | −1 |
| 109 | 1 | −1 | −1 | 1 | −1 | 1 | 1 | 1 | −1 | −1 | −1 | −1 | −1 |
| 110 | 1 | 1 | 1 | −1 | 1 | 1 | −1 | 1 | −1 | 1 | −1 | −1 | −1 |
| 111 | −1 | 1 | 1 | 1 | 1 | 1 | −1 | 1 | 1 | −1 | 1 | −1 | −1 |
| 112 | −1 | −1 | 1 | 1 | 1 | −1 | 1 | 1 | 1 | 1 | −1 | −1 | −1 |
| 113 | 1 | 1 | −1 | −1 | 1 | −1 | −1 | 1 | −1 | 1 | 1 | −1 | −1 |
| 114 | −1 | 1 | −1 | 1 | 1 | −1 | −1 | −1 | 1 | 1 | 1 | −1 | −1 |
| 115 | −1 | −1 | 1 | 1 | −1 | 1 | −1 | −1 | 1 | −1 | 1 | −1 | 1 |
| 116 | 1 | 1 | 1 | −1 | −1 | −1 | −1 | 1 | −1 | 1 | −1 | 1 | −1 |
| 117 | 1 | −1 | 1 | 1 | 1 | 1 | 1 | 1 | −1 | 1 | −1 | −1 | −1 |
| 118 | 1 | −1 | 1 | −1 | 1 | 1 | 1 | 1 | −1 | 1 | −1 | −1 | −1 |
| 119 | 1 | 1 | 1 | 1 | −1 | 1 | 1 | −1 | 1 | 1 | −1 | −1 | −1 |
| 120 | 1 | −1 | 1 | −1 | 1 | 1 | 1 | −1 | 1 | 1 | −1 | −1 | −1 |
| 121 | −1 | 1 | −1 | 1 | −1 | 1 | 1 | −1 | 1 | 1 | 1 | −1 | −1 |
| 122 | 1 | 1 | −1 | 1 | −1 | 1 | 1 | −1 | 1 | 1 | −1 | −1 | −1 |
| 123 | 1 | −1 | 1 | −1 | 1 | 1 | 1 | 1 | −1 | 1 | −1 | −1 | −1 |
| 124 | −1 | 1 | 1 | 1 | 1 | −1 | 1 | −1 | 1 | −1 | 1 | −1 | −1 |
| 125 | −1 | 1 | 1 | 1 | −1 | 1 | −1 | 1 | 1 | −1 | 1 | −1 | −1 |
| 126 | 1 | −1 | 1 | −1 | −1 | 1 | 1 | 1 | 1 | −1 | −1 | −1 | −1 |
| 127 | 1 | −1 | 1 | −1 | 1 | 1 | −1 | 1 | −1 | 1 | −1 | −1 | −1 |
| 128 | 1 | 1 | 1 | −1 | 1 | 1 | −1 | −1 | −1 | 1 | 1 | −1 | −1 |
| 129 | −1 | 1 | 1 | 1 | 1 | 1 | 1 | −1 | 1 | 1 | −1 | −1 | −1 |
| 130 | −1 | 1 | 1 | −1 | 1 | 1 | −1 | −1 | 1 | 1 | −1 | −1 | −1 |
| 131 | −1 | −1 | −1 | 1 | 1 | −1 | 1 | 1 | 1 | 1 | −1 | −1 | −1 |
| 132 | −1 | −1 | 1 | 1 | −1 | 1 | 1 | −1 | 1 | 1 | −1 | 1 | −1 |
| 133 | 1 | 1 | −1 | 1 | −1 | 1 | 1 | −1 | 1 | 1 | −1 | −1 | −1 |
| 134 | −1 | 1 | 1 | 1 | −1 | 1 | −1 | 1 | 1 | −1 | 1 | −1 | −1 |
| 135 | −1 | 1 | 1 | −1 | −1 | −1 | 1 | 1 | 1 | 1 | −1 | −1 | 1 |
| 136 | 1 | 1 | −1 | 1 | 1 | 1 | −1 | 1 | −1 | −1 | 1 | 1 | −1 |
| 137 | −1 | 1 | −1 | 1 | −1 | 1 | 1 | −1 | −1 | 1 | 1 | 1 | −1 |
| 138 | 1 | −1 | 1 | 1 | −1 | −1 | 1 | 1 | 1 | −1 | −1 | −1 | 1 |
| 139 | −1 | −1 | 1 | −1 | −1 | 1 | 1 | 1 | 1 | −1 | −1 | −1 | 1 |
| 140 | 1 | −1 | −1 | 1 | 1 | 1 | −1 | −1 | −1 | 1 | −1 | 1 | −1 |
| 141 | 1 | −1 | 1 | 1 | −1 | 1 | −1 | 1 | 1 | −1 | −1 | −1 | −1 |
| 142 | 1 | 1 | −1 | 1 | 1 | −1 | 1 | 1 | 1 | −1 | 1 | −1 | −1 |
| 143 | 1 | −1 | 1 | 1 | 1 | 1 | −1 | 1 | −1 | −1 | −1 | −1 | −1 |
| 144 | −1 | −1 | 1 | 1 | −1 | 1 | 1 | −1 | 1 | 1 | −1 | 1 | −1 |
| 145 | 1 | 1 | 1 | −1 | 1 | 1 | −1 | 1 | −1 | 1 | −1 | 1 | −1 |
| 146 | −1 | 1 | −1 | −1 | 1 | 1 | 1 | −1 | 1 | 1 | −1 | 1 | −1 |
| 147 | 1 | −1 | 1 | 1 | 1 | 1 | −1 | 1 | −1 | 1 | −1 | −1 | −1 |
| 148 | 1 | 1 | 1 | 1 | −1 | 1 | 1 | −1 | −1 | −1 | −1 | −1 | 1 |
| 149 | −1 | 1 | 1 | −1 | 1 | −1 | 1 | 1 | −1 | 1 | −1 | −1 | −1 |
| 150 | −1 | 1 | 1 | −1 | −1 | −1 | −1 | 1 | 1 | 1 | 1 | −1 | −1 |
| 151 | 1 | −1 | 1 | −1 | 1 | −1 | 1 | 1 | 1 | −1 | −1 | 1 | −1 |

TABLE 1a-continued

| | | | | | | | | | | | | | |
|---|---|---|---|---|---|---|---|---|---|---|---|---|---|
| 152 | 1 | −1 | 1 | 1 | 1 | −1 | 1 | 1 | −1 | −1 | 1 | −1 | −1 |
| 153 | 1 | 1 | 1 | 1 | −1 | −1 | 1 | 1 | −1 | −1 | 1 | −1 | −1 |
| 154 | −1 | 1 | −1 | −1 | 1 | 1 | 1 | 1 | −1 | 1 | 1 | −1 | −1 |
| 155 | −1 | 1 | 1 | −1 | −1 | 1 | 1 | 1 | −1 | −1 | 1 | −1 | −1 |
| 156 | −1 | 1 | 1 | −1 | 1 | 1 | 1 | −1 | −1 | −1 | 1 | −1 | −1 |
| 157 | −1 | −1 | −1 | −1 | 1 | 1 | 1 | 1 | −1 | −1 | 1 | −1 | −1 |
| 158 | −1 | 1 | −1 | 1 | 1 | 1 | 1 | 1 | 1 | −1 | −1 | −1 | −1 |
| 159 | −1 | 1 | −1 | −1 | 1 | −1 | −1 | 1 | −1 | 1 | −1 | 1 | −1 |
| 160 | 1 | −1 | 1 | −1 | 1 | 1 | −1 | 1 | −1 | −1 | −1 | −1 | 1 |
| 161 | 1 | −1 | 1 | 1 | −1 | −1 | 1 | −1 | −1 | −1 | 1 | −1 | 1 |
| 162 | 1 | 1 | −1 | −1 | 1 | 1 | −1 | 1 | −1 | −1 | 1 | −1 | −1 |
| 163 | 1 | −1 | 1 | 1 | 1 | 1 | −1 | −1 | 1 | −1 | 1 | −1 | 1 |
| 164 | −1 | −1 | −1 | 1 | 1 | 1 | −1 | −1 | −1 | −1 | 1 | −1 | 1 |
| 165 | 1 | 1 | 1 | −1 | 1 | 1 | −1 | −1 | 1 | 1 | −1 | −1 | −1 |
| 166 | 1 | −1 | −1 | 1 | −1 | −1 | −1 | −1 | −1 | 1 | 1 | −1 | 1 |
| 167 | 1 | −1 | 1 | 1 | 1 | 1 | −1 | 1 | 1 | 1 | −1 | −1 | 1 |
| 168 | −1 | 1 | 1 | 1 | −1 | 1 | −1 | 1 | −1 | −1 | 1 | 1 | −1 |
| 169 | −1 | −1 | 1 | −1 | 1 | 1 | 1 | −1 | −1 | −1 | 1 | −1 | 1 |
| 170 | −1 | 1 | −1 | 1 | −1 | 1 | 1 | 1 | 1 | 1 | −1 | −1 | −1 |
| 171 | 1 | 1 | −1 | −1 | −1 | 1 | −1 | −1 | 1 | 1 | 1 | 1 | −1 |
| 172 | 1 | −1 | −1 | 1 | 1 | −1 | −1 | 1 | 1 | 1 | −1 | 1 | 1 |
| 173 | −1 | 1 | −1 | 1 | 1 | 1 | 1 | −1 | −1 | −1 | −1 | 1 | 1 |
| 174 | 1 | 1 | 1 | −1 | 1 | 1 | −1 | −1 | −1 | −1 | 1 | 1 | 1 |
| 175 | −1 | −1 | 1 | 1 | 1 | 1 | 1 | −1 | −1 | −1 | 1 | −1 | 1 |
| 176 | 1 | −1 | −1 | 1 | −1 | −1 | 1 | 1 | 1 | −1 | 1 | −1 | 1 |
| 177 | 1 | 1 | 1 | 1 | −1 | 1 | −1 | 1 | 1 | 1 | 1 | −1 | 1 |
| 178 | 1 | −1 | 1 | 1 | 1 | 1 | −1 | 1 | −1 | 1 | −1 | −1 | −1 |
| 179 | −1 | 1 | 1 | −1 | −1 | 1 | 1 | −1 | 1 | 1 | −1 | −1 | −1 |
| 180 | 1 | −1 | 1 | −1 | −1 | −1 | 1 | −1 | −1 | 1 | 1 | −1 | −1 |
| 181 | 1 | 1 | 1 | 1 | 1 | −1 | 1 | 1 | −1 | 1 | −1 | −1 | −1 |
| 182 | 1 | 1 | 1 | 1 | 1 | −1 | 1 | −1 | 1 | −1 | 1 | −1 | −1 |
| 183 | 1 | 1 | −1 | −1 | 1 | −1 | 1 | 1 | −1 | 1 | −1 | −1 | −1 |
| 184 | −1 | 1 | −1 | 1 | 1 | 1 | −1 | 1 | 1 | −1 | −1 | −1 | −1 |
| 185 | 1 | −1 | 1 | 1 | 1 | 1 | 1 | −1 | 1 | −1 | −1 | −1 | −1 |
| 186 | 1 | −1 | 1 | 1 | 1 | −1 | 1 | 1 | 1 | −1 | −1 | −1 | −1 |
| 187 | 1 | 1 | −1 | −1 | 1 | −1 | 1 | 1 | 1 | 1 | −1 | −1 | −1 |
| 188 | 1 | 1 | 1 | −1 | 1 | 1 | −1 | 1 | 1 | −1 | −1 | −1 | −1 |
| 189 | −1 | −1 | −1 | −1 | 1 | 1 | −1 | 1 | 1 | −1 | −1 | 1 | 1 |
| 190 | 1 | 1 | −1 | −1 | −1 | 1 | 1 | −1 | 1 | 1 | 1 | −1 | −1 |
| 191 | −1 | −1 | 1 | −1 | 1 | 1 | −1 | −1 | 1 | 1 | −1 | −1 | 1 |
| 192 | −1 | −1 | 1 | 1 | −1 | −1 | −1 | −1 | −1 | 1 | 1 | 1 | 1 |
| 193 | 1 | 1 | −1 | 1 | 1 | 1 | 1 | −1 | −1 | −1 | −1 | 1 | 1 |
| 194 | −1 | −1 | 1 | 1 | 1 | 1 | −1 | 1 | 1 | −1 | −1 | −1 | 1 |
| 195 | −1 | −1 | 1 | −1 | −1 | −1 | 1 | 1 | 1 | 1 | −1 | 1 | −1 |
| 196 | 1 | −1 | −1 | 1 | 1 | −1 | −1 | −1 | 1 | 1 | 1 | −1 | 1 |
| 197 | −1 | 1 | −1 | −1 | 1 | −1 | 1 | −1 | 1 | −1 | 1 | 1 | −1 |
| 198 | 1 | 1 | −1 | 1 | 1 | 1 | 1 | −1 | 1 | −1 | 1 | 1 | −1 |
| 199 | −1 | −1 | −1 | 1 | −1 | 1 | −1 | 1 | −1 | 1 | 1 | −1 | 1 |
| 200 | 1 | 1 | −1 | −1 | −1 | 1 | 1 | −1 | 1 | −1 | 1 | 1 | −1 |
| 201 | −1 | 1 | −1 | −1 | −1 | 1 | 1 | −1 | 1 | −1 | 1 | 1 | −1 |
| 202 | 1 | −1 | 1 | −1 | −1 | −1 | 1 | 1 | 1 | 1 | −1 | 1 | −1 |
| 203 | −1 | 1 | −1 | 1 | 1 | 1 | −1 | −1 | −1 | −1 | 1 | 1 | 1 |
| 204 | 1 | 1 | 1 | −1 | 1 | −1 | 1 | 1 | 1 | −1 | 1 | 1 | −1 |
| 205 | 1 | 1 | 1 | −1 | −1 | 1 | 1 | −1 | 1 | 1 | −1 | −1 | 1 |
| 206 | −1 | 1 | −1 | 1 | 1 | 1 | −1 | −1 | 1 | 1 | −1 | −1 | 1 |
| 207 | 1 | −1 | −1 | 1 | 1 | −1 | 1 | −1 | 1 | 1 | −1 | −1 | 1 |
| 208 | 1 | 1 | −1 | −1 | 1 | −1 | 1 | −1 | 1 | 1 | −1 | −1 | 1 |
| 209 | −1 | −1 | 1 | 1 | −1 | 1 | −1 | 1 | 1 | 1 | −1 | −1 | 1 |
| 210 | 1 | 1 | 1 | −1 | −1 | 1 | 1 | −1 | −1 | 1 | −1 | −1 | 1 |
| 211 | −1 | −1 | −1 | −1 | 1 | 1 | −1 | −1 | 1 | −1 | −1 | 1 | 1 |
| 212 | −1 | 1 | 1 | 1 | −1 | 1 | −1 | 1 | 1 | −1 | 1 | −1 | 1 |
| 213 | 1 | 1 | −1 | 1 | −1 | 1 | 1 | −1 | 1 | 1 | 1 | −1 | −1 |
| 214 | 1 | 1 | −1 | 1 | 1 | 1 | −1 | 1 | −1 | 1 | 1 | 1 | −1 |
| 215 | −1 | −1 | 1 | 1 | 1 | −1 | 1 | −1 | 1 | 1 | 1 | −1 | −1 |
| 216 | 1 | 1 | −1 | −1 | −1 | −1 | 1 | 1 | −1 | 1 | 1 | 1 | −1 |
| 217 | −1 | 1 | 1 | −1 | −1 | −1 | 1 | 1 | 1 | 1 | 1 | −1 | −1 |
| 218 | −1 | −1 | 1 | −1 | −1 | −1 | 1 | 1 | 1 | 1 | −1 | −1 | −1 |
| 219 | 1 | 1 | −1 | 1 | 1 | 1 | 1 | 1 | −1 | −1 | 1 | −1 | −1 |
| 220 | −1 | 1 | 1 | −1 | −1 | 1 | 1 | −1 | 1 | 1 | −1 | 1 | 1 |
| 221 | −1 | 1 | −1 | −1 | 1 | 1 | −1 | −1 | 1 | 1 | −1 | −1 | 1 |
| 222 | 1 | 1 | −1 | −1 | 1 | −1 | 1 | 1 | −1 | 1 | −1 | 1 | −1 |
| 223 | 1 | −1 | 1 | 1 | −1 | 1 | −1 | −1 | 1 | 1 | 1 | −1 | −1 |
| 224 | 1 | −1 | −1 | 1 | −1 | 1 | −1 | 1 | −1 | 1 | 1 | −1 | −1 |
| 225 | 1 | 1 | −1 | 1 | 1 | −1 | −1 | −1 | 1 | 1 | 1 | −1 | −1 |

A plurality of sequences included in Table 1b are respectively second sequences M that are in a one-to-one correspondence with the first sequences S in Table 1, and may also be referred to as complementary sequences. Optionally, the first sequence may also be formed by repeating any sequence in Table 1b by N times. In this case, the second sequence M corresponding to the first sequence still needs to be in a bit logical negation relationship with the first sequence; or the sequence M is a sequence in Table 1 corresponding to that in Table 1b.

TABLE 1b

| Number of a sequence | M(n) sequence body |
|---|---|
| 1  | 1 1 1 1 0 1 0 0 0 0 0 1 0 1 0 1 |
| 2  | 1 1 1 1 0 0 1 0 0 1 0 0 0 0 1 1 |
| 3  | 1 1 1 1 0 0 1 0 0 0 1 0 1 0 1 0 |
| 4  | 1 1 1 1 0 0 0 1 0 0 0 1 0 1 0 1 |
| 5  | 1 1 1 1 0 0 0 0 1 1 0 1 0 0 1 0 |
| 6  | 1 1 1 1 0 0 0 0 0 1 1 0 0 1 1 1 |
| 7  | 1 1 1 1 0 0 0 0 0 0 1 0 1 0 1 1 |
| 8  | 1 1 1 0 1 0 1 0 0 1 0 0 0 1 0 1 |
| 9  | 1 1 1 0 1 0 1 0 0 0 0 1 0 0 1 0 |
| 10 | 1 1 1 0 1 0 1 0 0 0 0 1 0 0 1 0 |
| 11 | 1 1 1 0 1 0 0 1 0 1 1 0 0 0 0 0 |
| 12 | 1 1 1 0 1 0 0 1 0 1 0 0 1 0 0 0 |
| 13 | 1 1 1 0 1 0 0 1 0 0 0 0 0 1 0 1 |
| 14 | 1 1 1 0 1 0 0 0 1 1 0 0 0 0 0 0 |
| 15 | 1 1 1 0 1 0 0 0 1 0 1 0 1 1 0 1 |
| 16 | 1 1 1 0 1 0 0 0 1 0 1 0 0 1 0 1 |
| 17 | 1 1 1 0 1 0 0 0 0 1 0 1 0 1 1 0 |
| 18 | 1 1 1 0 1 0 0 0 0 1 0 1 0 1 1 0 |
| 19 | 1 1 1 0 1 0 0 0 0 1 0 1 0 0 1 1 |
| 20 | 1 1 1 0 1 0 0 0 0 1 0 1 0 0 1 0 |
| 21 | 1 1 1 0 1 0 0 0 0 0 0 1 1 1 0 1 |
| 22 | 1 1 1 0 0 1 1 0 0 1 0 0 1 0 0 0 |
| 23 | 1 1 1 0 0 1 1 0 0 0 1 0 0 0 1 1 |
| 24 | 1 1 1 0 0 1 1 0 0 0 0 1 0 0 1 0 1 |
| 25 | 1 1 1 0 0 1 0 0 1 1 0 0 1 0 1 0 |
| 26 | 1 1 1 0 0 1 0 0 1 1 0 0 0 0 1 1 |
| 27 | 1 1 1 0 0 1 0 0 1 0 1 0 1 1 0 0 |
| 28 | 1 1 1 0 0 1 0 0 1 0 1 0 0 1 0 1 |
| 29 | 1 1 1 0 0 1 0 0 1 0 0 1 0 0 0 1 |
| 30 | 1 1 1 0 0 1 0 0 1 0 0 0 0 1 1 0 |
| 31 | 1 1 1 0 0 1 0 0 0 0 1 1 0 1 0 1 |
| 32 | 1 1 1 0 0 0 1 1 0 0 0 1 0 1 1 1 |
| 33 | 1 1 1 0 0 0 1 0 1 0 0 1 1 0 1 0 |
| 34 | 1 1 1 0 0 0 0 1 1 1 0 1 0 1 0 0 |
| 35 | 1 1 1 0 0 0 0 1 0 1 1 0 0 0 1 0 |
| 36 | 1 1 1 0 0 0 0 1 0 0 1 1 1 1 0 0 |
| 37 | 1 1 1 0 0 0 0 0 1 0 1 0 1 1 0 1 |
| 38 | 1 1 0 1 1 1 0 0 0 1 0 0 1 0 0 0 |
| 39 | 1 1 0 1 1 0 1 0 1 0 0 1 0 0 1 0 |
| 40 | 1 1 0 1 1 0 1 0 0 0 1 1 0 1 1 0 |
| 41 | 1 1 0 1 1 0 0 1 1 0 0 0 0 0 1 1 |
| 42 | 1 1 0 1 1 0 0 1 0 0 0 1 0 0 0 1 |
| 43 | 1 1 0 1 1 0 0 0 1 1 0 0 1 0 1 1 |
| 44 | 1 1 0 1 1 0 0 0 1 1 0 0 1 0 0 0 0 |
| 45 | 1 1 0 1 1 0 0 0 0 1 1 1 1 0 0 1 |
| 46 | 1 1 0 1 1 0 0 0 0 0 1 1 1 0 1 0 |
| 47 | 1 1 0 1 0 1 1 0 0 0 0 1 0 0 1 1 |
| 48 | 1 1 0 1 0 1 0 1 1 0 0 0 1 0 0 1 |
| 49 | 1 1 0 1 0 1 0 1 0 1 0 0 1 0 0 1 |
| 50 | 1 1 0 1 0 1 0 1 0 0 1 0 0 1 0 0 |
| 51 | 1 1 0 1 0 1 0 1 0 0 0 0 1 1 1 1 |
| 52 | 1 1 0 1 0 1 0 1 0 0 0 0 0 1 1 0 |
| 53 | 1 1 0 1 0 1 0 0 0 1 0 1 1 0 1 0 |
| 54 | 1 1 0 1 0 0 1 0 1 0 0 0 1 1 1 1 |
| 55 | 1 1 0 1 0 0 1 0 0 1 0 1 0 1 0 0 |
| 56 | 1 1 0 1 0 0 1 0 0 1 0 0 0 1 0 0 |
| 57 | 1 1 0 1 0 0 0 1 0 1 1 1 0 1 0 0 |
| 58 | 1 1 0 1 0 0 0 1 0 1 1 0 1 1 1 0 |
| 59 | 1 1 0 1 0 0 0 1 0 1 0 1 1 0 1 0 |
| 60 | 1 1 0 1 0 0 0 1 0 0 1 0 0 0 1 0 |
| 61 | 1 1 0 0 1 1 1 0 0 1 0 0 0 0 0 1 |
| 62 | 1 1 0 0 1 1 0 1 1 1 0 1 0 0 0 0 |
| 63 | 1 1 0 0 1 1 0 1 1 0 0 0 0 0 1 1 |
| 64 | 1 1 0 0 1 1 0 1 0 0 0 1 1 0 1 0 |
| 65 | 1 1 0 0 1 1 0 1 0 0 0 1 1 1 1 1 |
| 66 | 1 1 0 0 1 1 0 0 1 0 0 1 1 0 1 0 |
| 67 | 1 1 0 0 1 1 0 0 1 0 0 1 0 0 0 0 |
| 68 | 1 1 0 0 1 1 0 0 0 1 1 0 1 1 0 1 |
| 69 | 1 1 0 0 1 1 0 0 0 0 1 1 1 1 1 0 |
| 70 | 1 1 0 0 1 1 0 0 0 0 0 1 1 1 0 1 |

TABLE 1b-continued

| | | | | | | | | | | | | | | | | |
|---|---|---|---|---|---|---|---|---|---|---|---|---|---|---|---|---|
| 71 | 1 | 1 | 0 | 0 | 1 | 0 | 1 | 1 | 0 | 1 | 1 | 0 | 0 | 0 | 0 | 0 |
| 72 | 1 | 1 | 0 | 0 | 1 | 0 | 1 | 0 | 1 | 0 | 1 | 0 | 1 | 1 | 1 | 1 |
| 73 | 1 | 1 | 0 | 0 | 1 | 0 | 1 | 0 | 0 | 1 | 0 | 1 | 0 | 0 | 0 | 1 |
| 74 | 1 | 1 | 0 | 0 | 1 | 0 | 0 | 1 | 1 | 0 | 0 | 1 | 1 | 1 | 0 | 0 |
| 75 | 1 | 1 | 0 | 0 | 1 | 0 | 0 | 1 | 1 | 0 | 0 | 0 | 0 | 1 | 1 | 0 |
| 76 | 1 | 1 | 0 | 0 | 1 | 0 | 0 | 1 | 0 | 1 | 1 | 0 | 1 | 0 | 1 | 0 |
| 77 | 1 | 1 | 0 | 0 | 1 | 0 | 0 | 1 | 0 | 1 | 0 | 1 | 0 | 0 | 1 | 0 |
| 78 | 1 | 1 | 0 | 0 | 1 | 0 | 0 | 0 | 1 | 0 | 1 | 1 | 0 | 1 | 0 | 1 |
| 79 | 1 | 1 | 0 | 0 | 1 | 0 | 0 | 0 | 0 | 1 | 1 | 0 | 1 | 1 | 0 | 0 |
| 80 | 1 | 1 | 0 | 0 | 0 | 1 | 1 | 1 | 0 | 0 | 1 | 0 | 1 | 1 | 0 | 1 |
| 81 | 1 | 1 | 0 | 0 | 0 | 0 | 1 | 1 | 1 | 1 | 0 | 1 | 1 | 0 | 0 | 0 |
| 82 | 1 | 1 | 0 | 0 | 0 | 0 | 1 | 1 | 1 | 1 | 0 | 1 | 0 | 1 | 0 | 0 |
| 83 | 1 | 1 | 0 | 0 | 0 | 0 | 1 | 1 | 1 | 1 | 0 | 0 | 1 | 1 | 0 | 0 |
| 84 | 1 | 1 | 0 | 0 | 0 | 0 | 1 | 1 | 1 | 1 | 0 | 0 | 1 | 0 | 0 | 0 |
| 85 | 1 | 1 | 0 | 0 | 0 | 0 | 1 | 1 | 1 | 0 | 1 | 1 | 1 | 0 | 0 | 1 |
| 86 | 1 | 0 | 1 | 1 | 1 | 0 | 0 | 0 | 1 | 1 | 0 | 0 | 1 | 0 | 1 | 0 |
| 87 | 1 | 0 | 1 | 1 | 1 | 0 | 0 | 0 | 1 | 0 | 0 | 1 | 0 | 0 | 0 | 1 |
| 88 | 1 | 0 | 1 | 1 | 0 | 1 | 1 | 0 | 1 | 0 | 0 | 0 | 1 | 1 | 0 | 0 |
| 89 | 1 | 0 | 1 | 1 | 0 | 1 | 1 | 0 | 1 | 0 | 0 | 0 | 1 | 0 | 0 | 0 |
| 90 | 1 | 0 | 1 | 1 | 0 | 1 | 1 | 0 | 0 | 1 | 1 | 0 | 0 | 0 | 1 | 0 |
| 91 | 1 | 0 | 1 | 1 | 0 | 1 | 0 | 1 | 0 | 1 | 0 | 0 | 0 | 0 | 0 | 1 |
| 92 | 1 | 0 | 1 | 1 | 0 | 1 | 0 | 1 | 0 | 0 | 0 | 1 | 0 | 0 | 1 | 0 |
| 93 | 1 | 0 | 1 | 1 | 0 | 0 | 1 | 1 | 0 | 0 | 0 | 1 | 1 | 1 | 1 | 0 |
| 94 | 1 | 0 | 1 | 1 | 0 | 0 | 0 | 1 | 0 | 1 | 0 | 1 | 0 | 0 | 1 | 1 |
| 95 | 1 | 0 | 1 | 0 | 1 | 1 | 1 | 0 | 1 | 0 | 0 | 0 | 0 | 1 | 0 | 1 |
| 96 | 1 | 0 | 1 | 0 | 1 | 1 | 1 | 0 | 0 | 1 | 0 | 0 | 1 | 0 | 1 | 1 |
| 97 | 1 | 0 | 1 | 0 | 1 | 1 | 1 | 0 | 0 | 0 | 1 | 1 | 0 | 1 | 0 | 0 |
| 98 | 1 | 0 | 1 | 0 | 1 | 1 | 0 | 0 | 1 | 0 | 1 | 1 | 0 | 1 | 1 | 1 |
| 99 | 1 | 0 | 1 | 0 | 1 | 1 | 0 | 1 | 1 | 1 | 1 | 0 | 0 | 0 | 0 | 0 |
| 100 | 1 | 0 | 1 | 0 | 1 | 0 | 1 | 1 | 0 | 1 | 1 | 0 | 1 | 0 | 0 | 0 |
| 101 | 1 | 0 | 1 | 0 | 1 | 0 | 1 | 1 | 0 | 1 | 1 | 0 | 0 | 1 | 1 | 0 |
| 102 | 1 | 0 | 1 | 0 | 1 | 0 | 1 | 0 | 1 | 1 | 0 | 0 | 0 | 0 | 0 | 1 |
| 103 | 1 | 0 | 1 | 0 | 1 | 0 | 1 | 0 | 0 | 1 | 0 | 1 | 0 | 0 | 1 | 0 |
| 104 | 1 | 0 | 1 | 0 | 1 | 0 | 1 | 0 | 0 | 1 | 0 | 0 | 0 | 1 | 0 | 0 |
| 105 | 1 | 0 | 1 | 0 | 1 | 0 | 0 | 0 | 1 | 1 | 1 | 1 | 0 | 1 | 0 | 0 |
| 106 | 1 | 0 | 1 | 0 | 0 | 1 | 1 | 0 | 0 | 1 | 0 | 1 | 1 | 1 | 0 | 0 |
| 107 | 1 | 0 | 1 | 0 | 0 | 0 | 1 | 1 | 1 | 1 | 1 | 0 | 0 | 0 | 1 | 0 |
| 108 | 1 | 0 | 1 | 0 | 0 | 0 | 1 | 1 | 1 | 0 | 0 | 1 | 1 | 1 | 1 | 0 |
| 109 | 1 | 0 | 1 | 0 | 0 | 0 | 1 | 1 | 1 | 0 | 0 | 1 | 1 | 0 | 0 | 1 |
| 110 | 1 | 0 | 0 | 1 | 1 | 1 | 1 | 0 | 0 | 0 | 1 | 0 | 0 | 1 | 1 | 0 |
| 111 | 1 | 0 | 0 | 1 | 1 | 1 | 0 | 1 | 1 | 0 | 0 | 0 | 1 | 1 | 1 | 1 |
| 112 | 1 | 0 | 0 | 1 | 1 | 1 | 0 | 1 | 1 | 0 | 0 | 0 | 1 | 0 | 1 | 0 |
| 113 | 1 | 0 | 0 | 1 | 1 | 1 | 0 | 1 | 0 | 1 | 0 | 1 | 1 | 0 | 1 | 0 |
| 114 | 1 | 0 | 0 | 1 | 1 | 0 | 1 | 1 | 1 | 0 | 1 | 0 | 0 | 0 | 0 | 0 |
| 115 | 1 | 0 | 0 | 1 | 1 | 0 | 1 | 1 | 1 | 0 | 0 | 0 | 1 | 0 | 0 | 0 |
| 116 | 1 | 0 | 0 | 1 | 1 | 0 | 1 | 1 | 0 | 1 | 1 | 0 | 0 | 0 | 1 | 1 |
| 117 | 1 | 0 | 0 | 1 | 1 | 0 | 1 | 1 | 0 | 0 | 0 | 1 | 1 | 0 | 1 | 0 |
| 118 | 1 | 0 | 0 | 1 | 1 | 0 | 1 | 0 | 1 | 1 | 0 | 0 | 1 | 0 | 0 | 1 |
| 119 | 1 | 0 | 0 | 1 | 1 | 0 | 1 | 0 | 1 | 0 | 1 | 0 | 0 | 1 | 1 | 1 |
| 120 | 1 | 0 | 0 | 1 | 1 | 0 | 1 | 0 | 0 | 0 | 1 | 0 | 0 | 0 | 1 | 1 |
| 121 | 1 | 0 | 0 | 1 | 1 | 0 | 1 | 0 | 0 | 0 | 1 | 0 | 1 | 1 | 1 | 0 |
| 122 | 1 | 0 | 0 | 1 | 1 | 0 | 0 | 1 | 1 | 1 | 1 | 0 | 0 | 0 | 1 | 0 |
| 123 | 1 | 0 | 0 | 1 | 1 | 0 | 0 | 1 | 1 | 1 | 0 | 1 | 0 | 0 | 1 | 1 |
| 124 | 1 | 0 | 0 | 1 | 1 | 0 | 0 | 1 | 1 | 0 | 1 | 0 | 0 | 1 | 0 | 0 |
| 125 | 1 | 0 | 0 | 1 | 1 | 0 | 0 | 1 | 1 | 0 | 1 | 0 | 0 | 0 | 1 | 0 |
| 126 | 1 | 0 | 0 | 1 | 1 | 0 | 0 | 1 | 1 | 0 | 0 | 1 | 0 | 1 | 0 | 1 |
| 127 | 1 | 0 | 0 | 1 | 1 | 0 | 0 | 1 | 0 | 0 | 1 | 1 | 1 | 1 | 1 | 0 |
| 128 | 1 | 0 | 0 | 1 | 0 | 1 | 1 | 1 | 0 | 0 | 1 | 0 | 1 | 1 | 1 | 0 |
| 129 | 1 | 0 | 0 | 1 | 0 | 1 | 1 | 0 | 0 | 0 | 1 | 1 | 1 | 0 | 0 | 1 |
| 130 | 1 | 0 | 0 | 1 | 0 | 1 | 0 | 1 | 0 | 1 | 0 | 1 | 1 | 1 | 1 | 0 |
| 131 | 1 | 0 | 0 | 1 | 0 | 1 | 0 | 1 | 0 | 0 | 0 | 1 | 1 | 0 | 1 | 1 |
| 132 | 1 | 0 | 0 | 1 | 0 | 1 | 0 | 0 | 1 | 0 | 1 | 0 | 0 | 0 | 1 | 0 |
| 133 | 1 | 0 | 0 | 1 | 0 | 0 | 1 | 1 | 0 | 1 | 1 | 1 | 1 | 1 | 0 | 0 |
| 134 | 1 | 0 | 0 | 0 | 1 | 1 | 0 | 1 | 1 | 1 | 1 | 0 | 0 | 1 | 0 | 0 |
| 135 | 1 | 0 | 0 | 0 | 0 | 1 | 0 | 1 | 1 | 1 | 1 | 0 | 1 | 1 | 0 | 0 |
| 136 | 1 | 0 | 0 | 0 | 0 | 1 | 0 | 1 | 1 | 0 | 1 | 0 | 1 | 1 | 1 | 1 |
| 137 | 1 | 0 | 0 | 0 | 0 | 0 | 1 | 1 | 0 | 1 | 1 | 1 | 1 | 1 | 0 | 0 |
| 138 | 0 | 1 | 1 | 1 | 1 | 1 | 0 | 0 | 1 | 0 | 0 | 0 | 0 | 0 | 1 | 1 |
| 139 | 0 | 1 | 1 | 1 | 1 | 0 | 1 | 0 | 0 | 1 | 0 | 1 | 0 | 0 | 0 | 0 |
| 140 | 0 | 1 | 1 | 1 | 1 | 0 | 1 | 0 | 0 | 0 | 0 | 1 | 0 | 0 | 1 | 1 |
| 141 | 0 | 1 | 1 | 1 | 1 | 0 | 0 | 1 | 0 | 1 | 0 | 1 | 0 | 0 | 1 | 1 |
| 142 | 0 | 1 | 1 | 1 | 1 | 0 | 0 | 0 | 1 | 0 | 1 | 0 | 0 | 1 | 1 | 1 |
| 143 | 0 | 1 | 1 | 1 | 1 | 0 | 0 | 0 | 1 | 0 | 0 | 0 | 1 | 1 | 1 | 0 |
| 144 | 0 | 1 | 1 | 1 | 1 | 0 | 0 | 0 | 1 | 0 | 0 | 0 | 1 | 1 | 0 | 1 |
| 145 | 0 | 1 | 1 | 1 | 0 | 0 | 0 | 0 | 0 | 1 | 1 | 0 | 1 | 1 | 1 | 1 |
| 146 | 0 | 1 | 1 | 1 | 1 | 0 | 0 | 0 | 1 | 1 | 0 | 1 | 0 | 0 | 1 | 0 |
| 147 | 0 | 1 | 1 | 1 | 0 | 1 | 1 | 0 | 0 | 0 | 0 | 1 | 1 | 1 | 1 | 0 |
| 148 | 0 | 1 | 1 | 1 | 0 | 0 | 1 | 1 | 0 | 1 | 0 | 1 | 0 | 0 | 1 | 0 |
| 149 | 0 | 1 | 1 | 1 | 0 | 0 | 0 | 1 | 1 | 1 | 0 | 1 | 1 | 0 | 0 | 1 |
| 150 | 0 | 1 | 1 | 0 | 1 | 1 | 0 | 1 | 0 | 1 | 0 | 1 | 0 | 0 | 1 | 0 |

TABLE 1b-continued

| | | | | | | | | | | | | | | | | |
|---|---|---|---|---|---|---|---|---|---|---|---|---|---|---|---|---|
| 151 | 0 | 1 | 1 | 0 | 1 | 1 | 0 | 0 | 0 | 0 | 0 | 1 | 1 | 0 | 1 | 1 |
| 152 | 0 | 1 | 1 | 0 | 1 | 0 | 1 | 1 | 0 | 0 | 0 | 1 | 1 | 1 | 1 | 0 |
| 153 | 0 | 1 | 1 | 0 | 1 | 0 | 1 | 1 | 0 | 0 | 0 | 1 | 0 | 1 | 0 | 1 |
| 154 | 0 | 1 | 1 | 0 | 1 | 0 | 1 | 0 | 1 | 0 | 0 | 1 | 1 | 1 | 1 | 0 |
| 155 | 0 | 1 | 1 | 0 | 1 | 0 | 1 | 0 | 1 | 0 | 0 | 1 | 1 | 1 | 1 | 0 |
| 156 | 0 | 1 | 1 | 0 | 1 | 0 | 1 | 0 | 1 | 0 | 0 | 1 | 1 | 1 | 1 | 0 |
| 157 | 0 | 1 | 1 | 0 | 1 | 0 | 1 | 0 | 1 | 0 | 0 | 1 | 0 | 0 | 0 | 1 |
| 158 | 0 | 1 | 1 | 0 | 0 | 1 | 1 | 0 | 1 | 0 | 0 | 1 | 1 | 1 | 0 | 0 |
| 159 | 0 | 1 | 1 | 0 | 0 | 1 | 1 | 0 | 0 | 0 | 1 | 1 | 1 | 1 | 0 | 0 |
| 160 | 0 | 1 | 1 | 0 | 0 | 1 | 0 | 1 | 1 | 1 | 0 | 1 | 1 | 1 | 0 | 0 |
| 161 | 0 | 1 | 0 | 1 | 1 | 1 | 1 | 0 | 0 | 0 | 1 | 1 | 1 | 0 | 0 | 1 |
| 162 | 0 | 1 | 0 | 1 | 1 | 1 | 1 | 0 | 0 | 0 | 1 | 0 | 1 | 0 | 0 | 0 |
| 163 | 0 | 1 | 0 | 1 | 1 | 1 | 1 | 0 | 0 | 0 | 1 | 0 | 0 | 1 | 1 | 0 |
| 164 | 0 | 1 | 0 | 1 | 1 | 1 | 0 | 1 | 1 | 0 | 0 | 1 | 0 | 0 | 0 | 0 |
| 165 | 0 | 1 | 0 | 1 | 1 | 1 | 0 | 1 | 0 | 0 | 1 | 0 | 0 | 0 | 1 | 1 |
| 166 | 0 | 1 | 0 | 1 | 1 | 1 | 0 | 0 | 0 | 1 | 0 | 1 | 1 | 0 | 0 | 0 |
| 167 | 0 | 1 | 0 | 1 | 1 | 0 | 1 | 1 | 0 | 1 | 0 | 0 | 0 | 1 | 0 | 0 |
| 168 | 0 | 1 | 0 | 1 | 0 | 1 | 1 | 0 | 1 | 0 | 0 | 1 | 1 | 1 | 1 | 0 |
| 169 | 0 | 1 | 0 | 0 | 1 | 1 | 1 | 1 | 0 | 0 | 1 | 1 | 0 | 0 | 0 | 1 |
| 170 | 0 | 1 | 0 | 0 | 1 | 1 | 0 | 1 | 0 | 0 | 1 | 1 | 0 | 0 | 1 | 1 |
| 171 | 0 | 1 | 0 | 0 | 1 | 0 | 1 | 0 | 1 | 1 | 1 | 0 | 1 | 1 | 0 | 1 |
| 172 | 0 | 1 | 0 | 0 | 1 | 0 | 1 | 0 | 1 | 0 | 1 | 1 | 1 | 1 | 1 | 0 |
| 173 | 0 | 1 | 0 | 0 | 1 | 0 | 0 | 1 | 1 | 0 | 0 | 1 | 1 | 1 | 0 | 1 |
| 174 | 0 | 1 | 0 | 0 | 1 | 0 | 0 | 1 | 0 | 1 | 1 | 1 | 0 | 1 | 1 | 1 |
| 175 | 0 | 1 | 0 | 0 | 1 | 0 | 0 | 1 | 0 | 1 | 1 | 1 | 0 | 0 | 1 | 1 |
| 176 | 0 | 1 | 0 | 0 | 0 | 1 | 1 | 1 | 0 | 1 | 1 | 0 | 1 | 1 | 1 | 0 |
| 177 | 0 | 1 | 0 | 0 | 0 | 1 | 1 | 1 | 0 | 0 | 1 | 1 | 0 | 1 | 0 | 1 |
| 178 | 0 | 0 | 1 | 1 | 1 | 1 | 1 | 0 | 0 | 0 | 1 | 1 | 0 | 0 | 1 | 1 |
| 179 | 0 | 0 | 1 | 1 | 1 | 1 | 0 | 1 | 1 | 0 | 0 | 0 | 0 | 1 | 0 | 1 |
| 180 | 0 | 0 | 1 | 1 | 1 | 1 | 0 | 0 | 1 | 0 | 1 | 1 | 0 | 1 | 0 | 0 |
| 181 | 0 | 0 | 1 | 1 | 1 | 0 | 1 | 1 | 0 | 0 | 0 | 1 | 1 | 1 | 1 | 0 |
| 182 | 0 | 0 | 1 | 1 | 1 | 0 | 1 | 1 | 0 | 0 | 0 | 1 | 1 | 0 | 1 | 1 |
| 183 | 0 | 0 | 1 | 1 | 1 | 0 | 1 | 0 | 1 | 1 | 1 | 0 | 0 | 1 | 1 | 0 |
| 184 | 0 | 0 | 1 | 1 | 1 | 0 | 0 | 1 | 0 | 1 | 1 | 0 | 1 | 1 | 0 | 0 |
| 185 | 0 | 0 | 1 | 1 | 1 | 0 | 0 | 0 | 1 | 1 | 0 | 1 | 1 | 0 | 0 | 1 |
| 186 | 0 | 0 | 1 | 1 | 0 | 1 | 1 | 0 | 1 | 0 | 0 | 1 | 1 | 1 | 0 | 0 |
| 187 | 0 | 0 | 1 | 1 | 0 | 1 | 0 | 1 | 1 | 1 | 0 | 1 | 0 | 1 | 1 | 0 |
| 188 | 0 | 0 | 1 | 1 | 0 | 1 | 0 | 1 | 0 | 1 | 0 | 0 | 1 | 1 | 1 | 0 |
| 189 | 0 | 0 | 1 | 0 | 1 | 0 | 1 | 1 | 1 | 0 | 1 | 0 | 0 | 1 | 0 | 1 |
| 190 | 0 | 0 | 1 | 0 | 1 | 0 | 1 | 0 | 1 | 1 | 1 | 1 | 1 | 0 | 0 | 0 |
| 191 | 0 | 0 | 1 | 0 | 1 | 0 | 1 | 0 | 1 | 1 | 1 | 0 | 0 | 0 | 0 | 0 |
| 192 | 0 | 0 | 1 | 0 | 1 | 0 | 1 | 0 | 1 | 1 | 0 | 1 | 1 | 0 | 1 | 1 |
| 193 | 0 | 0 | 1 | 0 | 1 | 0 | 1 | 0 | 1 | 0 | 1 | 1 | 0 | 1 | 1 | 0 |
| 194 | 0 | 0 | 1 | 0 | 1 | 0 | 1 | 0 | 0 | 0 | 1 | 1 | 0 | 1 | 1 | 0 |
| 195 | 0 | 0 | 1 | 0 | 1 | 0 | 0 | 1 | 1 | 1 | 1 | 0 | 1 | 1 | 0 | 0 |
| 196 | 0 | 0 | 1 | 0 | 0 | 1 | 1 | 1 | 1 | 1 | 0 | 0 | 0 | 1 | 0 | 1 |
| 197 | 0 | 0 | 1 | 0 | 0 | 1 | 1 | 1 | 1 | 0 | 0 | 0 | 0 | 1 | 1 | 0 |
| 198 | 0 | 0 | 1 | 0 | 0 | 1 | 1 | 1 | 0 | 0 | 1 | 1 | 0 | 1 | 1 | 1 |
| 199 | 0 | 0 | 1 | 0 | 0 | 1 | 1 | 1 | 0 | 0 | 1 | 1 | 0 | 1 | 0 | 0 |
| 200 | 0 | 0 | 1 | 0 | 0 | 1 | 1 | 0 | 1 | 1 | 1 | 0 | 1 | 1 | 1 | 0 |
| 201 | 0 | 0 | 1 | 0 | 0 | 1 | 1 | 0 | 0 | 1 | 1 | 1 | 1 | 1 | 0 | 0 |
| 202 | 0 | 0 | 1 | 0 | 0 | 1 | 0 | 1 | 1 | 0 | 0 | 1 | 1 | 0 | 0 | 1 |
| 203 | 0 | 0 | 1 | 0 | 0 | 1 | 0 | 1 | 0 | 1 | 1 | 0 | 1 | 1 | 0 | 1 |
| 204 | 0 | 0 | 1 | 0 | 0 | 0 | 1 | 1 | 1 | 0 | 1 | 1 | 0 | 1 | 1 | 1 |
| 205 | 0 | 0 | 0 | 1 | 0 | 1 | 1 | 1 | 1 | 1 | 1 | 0 | 0 | 0 | 1 | 0 |
| 206 | 0 | 0 | 0 | 1 | 0 | 1 | 1 | 1 | 1 | 0 | 1 | 0 | 1 | 1 | 0 | 1 |
| 207 | 0 | 0 | 0 | 1 | 0 | 1 | 1 | 1 | 1 | 0 | 1 | 0 | 1 | 1 | 0 | 0 |
| 208 | 0 | 0 | 0 | 1 | 0 | 1 | 1 | 1 | 1 | 0 | 1 | 0 | 1 | 0 | 0 | 1 |
| 209 | 0 | 0 | 0 | 1 | 0 | 1 | 1 | 1 | 1 | 0 | 1 | 0 | 1 | 0 | 0 | 1 |
| 210 | 0 | 0 | 0 | 1 | 0 | 1 | 1 | 1 | 0 | 1 | 0 | 1 | 1 | 0 | 1 | 0 |
| 211 | 0 | 0 | 0 | 1 | 0 | 1 | 1 | 1 | 0 | 1 | 0 | 1 | 0 | 0 | 1 | 0 |
| 212 | 0 | 0 | 0 | 1 | 0 | 1 | 1 | 1 | 0 | 0 | 1 | 1 | 1 | 1 | 1 | 1 |
| 213 | 0 | 0 | 0 | 1 | 0 | 1 | 1 | 0 | 1 | 1 | 1 | 1 | 1 | 0 | 1 | 0 |
| 214 | 0 | 0 | 0 | 1 | 0 | 1 | 1 | 0 | 1 | 0 | 1 | 1 | 0 | 1 | 1 | 1 |
| 215 | 0 | 0 | 0 | 1 | 0 | 1 | 1 | 0 | 1 | 0 | 0 | 1 | 1 | 1 | 1 | 1 |
| 216 | 0 | 0 | 0 | 1 | 0 | 1 | 0 | 1 | 1 | 1 | 0 | 1 | 1 | 0 | 0 | 1 |
| 217 | 0 | 0 | 0 | 1 | 0 | 1 | 0 | 1 | 1 | 1 | 0 | 1 | 1 | 0 | 0 | 1 |
| 218 | 0 | 0 | 0 | 1 | 0 | 1 | 0 | 1 | 1 | 0 | 1 | 1 | 0 | 1 | 1 | 0 |
| 219 | 0 | 0 | 0 | 0 | 1 | 1 | 1 | 1 | 1 | 1 | 0 | 1 | 0 | 1 | 0 | 0 |
| 220 | 0 | 0 | 0 | 0 | 1 | 1 | 1 | 1 | 1 | 0 | 0 | 1 | 1 | 0 | 0 | 0 |
| 221 | 0 | 0 | 0 | 0 | 1 | 1 | 1 | 1 | 0 | 0 | 1 | 0 | 1 | 1 | 0 | 1 |
| 222 | 0 | 0 | 0 | 0 | 1 | 1 | 1 | 0 | 1 | 1 | 0 | 1 | 0 | 1 | 0 | 0 |
| 223 | 0 | 0 | 0 | 0 | 1 | 1 | 0 | 1 | 1 | 0 | 1 | 0 | 1 | 0 | 0 | 1 |
| 224 | 0 | 0 | 0 | 0 | 1 | 1 | 0 | 1 | 0 | 1 | 1 | 1 | 1 | 1 | 0 | 0 |
| 225 | 0 | 0 | 0 | 0 | 1 | 0 | 1 | 1 | 1 | 1 | 1 | 0 | 1 | 0 | 1 | 0 |

TABLE 1b-continued

| Number of a sequence | M(n) sequence body | | | | | | | | | | | | | | |
|---|---|---|---|---|---|---|---|---|---|---|---|---|---|---|---|
| 1 | 1 | 0 | 0 | 1 | 1 | 0 | 1 | 1 | 0 | 0 | 0 | 1 | 1 | 1 | 0 | 0 |
| 2 | 0 | 1 | 1 | 1 | 0 | 0 | 1 | 0 | 1 | 0 | 1 | 0 | 1 | 1 | 0 | 0 |
| 3 | 0 | 0 | 1 | 1 | 0 | 1 | 1 | 0 | 1 | 0 | 0 | 1 | 1 | 1 | 0 | 0 |
| 4 | 0 | 0 | 1 | 1 | 1 | 0 | 0 | 1 | 0 | 1 | 1 | 0 | 1 | 1 | 0 | 0 |
| 5 | 1 | 0 | 1 | 0 | 1 | 0 | 0 | 1 | 1 | 0 | 1 | 1 | 0 | 0 | 1 |
| 6 | 0 | 0 | 1 | 0 | 0 | 1 | 0 | 0 | 1 | 0 | 1 | 0 | 1 | 0 | 1 | 1 |
| 7 | 0 | 0 | 1 | 1 | 1 | 0 | 0 | 1 | 0 | 1 | 1 | 0 | 0 | 1 | 1 | 0 |
| 8 | 0 | 1 | 1 | 0 | 0 | 1 | 0 | 0 | 0 | 1 | 1 | 1 | 1 | 0 | 0 | 1 |
| 9 | 1 | 1 | 0 | 0 | 1 | 1 | 0 | 0 | 0 | 1 | 1 | 1 | 1 | 1 | 0 | 0 |
| 10 | 0 | 1 | 1 | 1 | 1 | 0 | 0 | 0 | 0 | 1 | 1 | 0 | 1 | 1 | 1 | 0 |
| 11 | 0 | 1 | 1 | 0 | 0 | 1 | 1 | 1 | 0 | 1 | 0 | 1 | 1 | 1 | 0 | 0 |
| 12 | 1 | 0 | 0 | 1 | 1 | 0 | 1 | 1 | 1 | 0 | 0 | 0 | 1 | 1 | 1 | 0 |
| 13 | 0 | 1 | 1 | 1 | 1 | 0 | 0 | 0 | 1 | 1 | 0 | 1 | 1 | 1 | 0 | 0 |
| 14 | 1 | 1 | 1 | 0 | 1 | 1 | 0 | 1 | 0 | 0 | 1 | 1 | 0 | 1 | 0 | 0 |
| 15 | 0 | 1 | 1 | 0 | 0 | 0 | 0 | 1 | 1 | 0 | 0 | 1 | 0 | 0 | 1 | 1 |
| 16 | 0 | 0 | 1 | 1 | 1 | 1 | 0 | 0 | 1 | 1 | 0 | 0 | 1 | 0 | 0 | 1 |
| 17 | 1 | 1 | 0 | 0 | 0 | 1 | 1 | 0 | 0 | 1 | 0 | 1 | 1 | 0 | 0 | 1 |
| 18 | 0 | 1 | 0 | 1 | 1 | 0 | 0 | 0 | 1 | 1 | 0 | 1 | 1 | 0 | 0 | 1 |
| 19 | 1 | 0 | 0 | 1 | 0 | 0 | 1 | 1 | 0 | 1 | 0 | 1 | 1 | 0 | 0 | 1 |
| 20 | 1 | 1 | 0 | 0 | 1 | 0 | 1 | 1 | 1 | 0 | 0 | 1 | 1 | 0 | 0 | 1 |
| 21 | 1 | 0 | 0 | 1 | 1 | 1 | 0 | 0 | 0 | 1 | 1 | 0 | 1 | 0 | 0 | 1 |
| 22 | 0 | 1 | 1 | 1 | 1 | 0 | 1 | 0 | 1 | 0 | 1 | 0 | 1 | 0 | 0 | 1 |
| 23 | 1 | 1 | 0 | 0 | 0 | 1 | 0 | 0 | 1 | 0 | 1 | 1 | 1 | 0 | 1 | 0 |
| 24 | 0 | 0 | 1 | 0 | 1 | 1 | 1 | 0 | 1 | 0 | 0 | 0 | 1 | 0 | 1 | 1 |
| 25 | 1 | 0 | 1 | 0 | 0 | 0 | 0 | 1 | 1 | 0 | 1 | 1 | 1 | 1 | 0 | 0 |
| 26 | 0 | 1 | 0 | 1 | 1 | 0 | 1 | 0 | 1 | 0 | 0 | 0 | 1 | 0 | 1 | 1 |
| 27 | 0 | 1 | 1 | 1 | 0 | 1 | 0 | 0 | 0 | 1 | 0 | 1 | 1 | 0 | 0 | 1 |
| 28 | 0 | 1 | 0 | 0 | 0 | 1 | 1 | 1 | 1 | 0 | 0 | 1 | 1 | 0 | 0 | 1 |
| 29 | 1 | 1 | 0 | 0 | 1 | 0 | 1 | 0 | 1 | 0 | 0 | 1 | 1 | 1 | 1 | 0 |
| 30 | 1 | 1 | 1 | 0 | 0 | 1 | 0 | 1 | 0 | 1 | 0 | 1 | 1 | 0 | 0 | 1 |
| 31 | 0 | 0 | 1 | 1 | 0 | 1 | 0 | 0 | 1 | 1 | 0 | 0 | 1 | 0 | 1 | 0 |
| 32 | 0 | 0 | 1 | 0 | 0 | 1 | 0 | 1 | 1 | 0 | 1 | 1 | 0 | 1 | 0 |
| 33 | 0 | 1 | 0 | 1 | 0 | 0 | 0 | 1 | 1 | 0 | 1 | 1 | 1 | 0 | 0 | 1 |
| 34 | 0 | 1 | 0 | 0 | 1 | 0 | 0 | 1 | 0 | 1 | 0 | 1 | 1 | 0 | 1 | 1 |
| 35 | 0 | 1 | 1 | 0 | 1 | 0 | 1 | 1 | 1 | 0 | 1 | 0 | 1 | 0 | 0 | 0 |
| 36 | 1 | 1 | 0 | 1 | 1 | 0 | 0 | 0 | 1 | 0 | 1 | 0 | 1 | 0 | 0 | 1 |
| 37 | 1 | 1 | 0 | 0 | 1 | 1 | 0 | 0 | 1 | 0 | 1 | 1 | 0 | 0 | 1 | 0 |
| 38 | 0 | 1 | 1 | 1 | 1 | 0 | 0 | 1 | 0 | 1 | 0 | 1 | 0 | 1 | 1 | 0 |
| 39 | 0 | 0 | 1 | 0 | 1 | 0 | 1 | 1 | 1 | 0 | 0 | 0 | 0 | 1 | 1 | 1 |
| 40 | 0 | 0 | 0 | 1 | 0 | 1 | 0 | 0 | 0 | 1 | 1 | 1 | 1 | 0 | 1 | 0 |
| 41 | 1 | 0 | 1 | 0 | 1 | 0 | 0 | 0 | 1 | 1 | 0 | 1 | 0 | 1 | 1 | 0 |
| 42 | 0 | 1 | 1 | 1 | 1 | 0 | 0 | 0 | 1 | 1 | 0 | 1 | 0 | 1 | 1 | 0 |
| 43 | 1 | 0 | 0 | 0 | 0 | 0 | 1 | 0 | 1 | 0 | 1 | 0 | 1 | 1 | 0 | 1 |
| 44 | 0 | 1 | 1 | 1 | 1 | 0 | 1 | 0 | 1 | 0 | 1 | 0 | 1 | 1 | 1 | 0 |
| 45 | 1 | 0 | 0 | 0 | 1 | 0 | 0 | 1 | 0 | 1 | 0 | 1 | 0 | 1 | 1 | 0 |
| 46 | 0 | 1 | 0 | 1 | 0 | 0 | 1 | 1 | 0 | 0 | 0 | 1 | 1 | 1 | 0 | 1 |
| 47 | 0 | 1 | 1 | 0 | 0 | 1 | 0 | 0 | 0 | 1 | 1 | 1 | 1 | 0 | 1 | 0 |
| 48 | 0 | 0 | 1 | 0 | 0 | 1 | 1 | 1 | 1 | 0 | 1 | 1 | 0 | 0 | 0 | 1 |
| 49 | 0 | 0 | 0 | 1 | 1 | 0 | 1 | 1 | 1 | 1 | 0 | 0 | 0 | 0 | 1 | 1 |
| 50 | 1 | 1 | 1 | 0 | 0 | 1 | 1 | 0 | 0 | 0 | 0 | 0 | 1 | 1 | 1 | 1 |
| 51 | 0 | 0 | 1 | 0 | 0 | 1 | 0 | 1 | 1 | 0 | 0 | 1 | 1 | 0 | 0 | 1 |
| 52 | 1 | 1 | 0 | 1 | 1 | 0 | 0 | 1 | 1 | 0 | 1 | 1 | 1 | 0 | 0 | 0 |
| 53 | 1 | 1 | 0 | 0 | 0 | 0 | 1 | 1 | 0 | 1 | 1 | 0 | 0 | 1 | 1 |
| 54 | 0 | 1 | 0 | 0 | 0 | 1 | 0 | 1 | 1 | 0 | 0 | 1 | 1 | 0 | 0 | 1 |
| 55 | 0 | 1 | 1 | 1 | 1 | 0 | 0 | 0 | 1 | 0 | 0 | 1 | 1 | 1 | 0 | 1 |
| 56 | 1 | 1 | 1 | 1 | 0 | 0 | 0 | 1 | 0 | 1 | 0 | 1 | 1 | 0 | 0 | 1 |
| 57 | 1 | 0 | 1 | 0 | 0 | 1 | 0 | 0 | 1 | 1 | 0 | 0 | 1 | 1 | 1 |
| 58 | 0 | 1 | 0 | 0 | 0 | 1 | 1 | 0 | 0 | 0 | 0 | 1 | 1 | 1 | 1 | 0 |
| 59 | 1 | 1 | 0 | 0 | 0 | 0 | 1 | 1 | 0 | 0 | 1 | 0 | 0 | 1 | 1 | 1 |
| 60 | 1 | 1 | 1 | 1 | 0 | 0 | 1 | 0 | 1 | 0 | 0 | 1 | 1 | 1 | 1 | 0 |
| 61 | 0 | 1 | 1 | 1 | 0 | 1 | 0 | 0 | 1 | 1 | 1 | 0 | 1 | 0 | 0 | 1 |
| 62 | 0 | 0 | 1 | 0 | 1 | 1 | 0 | 1 | 0 | 0 | 1 | 1 | 1 | 1 | 0 | 0 |
| 63 | 0 | 1 | 0 | 1 | 1 | 0 | 1 | 0 | 0 | 0 | 1 | 0 | 1 | 0 | 1 | 1 |
| 64 | 1 | 0 | 1 | 1 | 0 | 0 | 0 | 0 | 1 | 0 | 0 | 1 | 1 | 1 | 1 | 0 |
| 65 | 0 | 1 | 0 | 0 | 0 | 1 | 0 | 1 | 0 | 1 | 0 | 1 | 0 | 0 | 0 | 1 |
| 66 | 0 | 1 | 0 | 1 | 1 | 1 | 1 | 0 | 0 | 0 | 0 | 1 | 0 | 1 | 0 | 1 |
| 67 | 1 | 1 | 1 | 1 | 0 | 1 | 0 | 1 | 0 | 1 | 0 | 1 | 0 | 0 | 1 | 1 |
| 68 | 1 | 0 | 0 | 0 | 0 | 0 | 1 | 1 | 0 | 1 | 0 | 1 | 0 | 1 | 0 | 1 |
| 69 | 1 | 0 | 0 | 1 | 0 | 0 | 1 | 0 | 0 | 1 | 0 | 1 | 0 | 1 | 0 | 1 |
| 70 | 0 | 1 | 0 | 1 | 0 | 1 | 1 | 0 | 1 | 0 | 0 | 1 | 0 | 0 | 1 | 1 |
| 71 | 0 | 1 | 0 | 1 | 1 | 0 | 1 | 0 | 1 | 0 | 1 | 1 | 0 | 0 | 0 | 1 |
| 72 | 0 | 0 | 0 | 0 | 1 | 0 | 0 | 1 | 0 | 1 | 1 | 0 | 1 | 0 | 1 | 1 |
| 73 | 0 | 1 | 1 | 1 | 1 | 1 | 0 | 0 | 1 | 0 | 1 | 1 | 0 | 0 | 0 | 1 |
| 74 | 1 | 0 | 1 | 0 | 0 | 0 | 0 | 1 | 0 | 1 | 1 | 0 | 1 | 0 | 0 | 1 |
| 75 | 1 | 0 | 1 | 1 | 0 | 1 | 0 | 1 | 0 | 0 | 0 | 1 | 0 | 1 | 1 | 1 |
| 76 | 1 | 0 | 1 | 1 | 1 | 0 | 0 | 0 | 0 | 0 | 1 | 1 | 0 | 0 | 1 | 1 |
| 77 | 0 | 1 | 1 | 1 | 1 | 0 | 0 | 1 | 1 | 1 | 0 | 0 | 0 | 1 | 0 | 1 |

TABLE 1b-continued

| | | | | | | | | | | | | | | | | |
|---|---|---|---|---|---|---|---|---|---|---|---|---|---|---|---|---|
| 78 | 1 | 0 | 1 | 1 | 0 | 0 | 0 | 1 | 1 | 1 | 0 | 0 | 0 | 1 | 0 | 1 |
| 79 | 0 | 1 | 1 | 1 | 1 | 0 | 0 | 1 | 0 | 1 | 0 | 1 | 0 | 1 | 1 | 0 |
| 80 | 0 | 0 | 0 | 0 | 0 | 1 | 0 | 1 | 1 | 1 | 0 | 1 | 1 | 0 | 0 | 1 |
| 81 | 1 | 0 | 0 | 1 | 0 | 0 | 1 | 0 | 1 | 0 | 1 | 0 | 1 | 0 | 1 | 1 |
| 82 | 0 | 1 | 0 | 0 | 0 | 1 | 1 | 0 | 0 | 1 | 1 | 0 | 1 | 1 | 0 | 1 |
| 83 | 0 | 1 | 0 | 0 | 1 | 0 | 1 | 0 | 1 | 0 | 1 | 1 | 0 | 1 | 1 | 0 |
| 84 | 0 | 1 | 1 | 0 | 0 | 1 | 1 | 0 | 1 | 1 | 0 | 1 | 0 | 1 | 0 | 1 |
| 85 | 0 | 0 | 0 | 1 | 0 | 0 | 0 | 1 | 0 | 1 | 1 | 0 | 1 | 1 | 0 | 1 |
| 86 | 0 | 1 | 0 | 1 | 1 | 1 | 0 | 0 | 0 | 0 | 1 | 1 | 0 | 1 | 1 | 1 |
| 87 | 1 | 1 | 0 | 1 | 0 | 0 | 1 | 0 | 0 | 1 | 1 | 1 | 0 | 1 | 0 | 1 |
| 88 | 0 | 1 | 0 | 0 | 0 | 1 | 1 | 1 | 1 | 1 | 0 | 0 | 0 | 1 | 0 | 1 |
| 89 | 1 | 0 | 0 | 1 | 1 | 1 | 0 | 1 | 1 | 1 | 0 | 0 | 0 | 0 | 1 | 1 |
| 90 | 0 | 0 | 1 | 0 | 1 | 0 | 1 | 1 | 1 | 1 | 0 | 0 | 0 | 0 | 1 | 1 |
| 91 | 1 | 1 | 0 | 1 | 0 | 0 | 1 | 1 | 0 | 0 | 0 | 1 | 1 | 0 | 1 | 1 |
| 92 | 0 | 1 | 1 | 1 | 1 | 0 | 0 | 0 | 1 | 0 | 0 | 1 | 1 | 1 | 1 | 0 |
| 93 | 0 | 0 | 1 | 0 | 1 | 0 | 1 | 0 | 0 | 1 | 0 | 0 | 1 | 0 | 1 | 1 |
| 94 | 1 | 1 | 0 | 1 | 1 | 0 | 0 | 0 | 0 | 0 | 1 | 1 | 0 | 1 | 1 | 0 |
| 95 | 0 | 0 | 1 | 1 | 1 | 0 | 0 | 1 | 1 | 0 | 1 | 0 | 0 | 1 | 1 | 1 |
| 96 | 1 | 0 | 0 | 0 | 1 | 0 | 0 | 1 | 0 | 0 | 0 | 1 | 1 | 1 | 0 | 1 |
| 97 | 1 | 1 | 0 | 0 | 1 | 0 | 0 | 0 | 1 | 0 | 1 | 1 | 1 | 1 | 1 | 0 |
| 98 | 0 | 0 | 0 | 0 | 0 | 0 | 1 | 1 | 0 | 0 | 0 | 1 | 0 | 1 | 1 | 1 |
| 99 | 1 | 1 | 0 | 0 | 0 | 1 | 1 | 0 | 1 | 1 | 0 | 1 | 1 | 0 | 0 | 1 |
| 100 | 0 | 0 | 1 | 1 | 1 | 1 | 0 | 0 | 0 | 1 | 1 | 0 | 0 | 1 | 1 | 0 |
| 101 | 0 | 0 | 0 | 1 | 0 | 0 | 1 | 1 | 1 | 1 | 0 | 0 | 0 | 0 | 1 | 1 |
| 102 | 1 | 0 | 1 | 1 | 0 | 1 | 1 | 0 | 0 | 0 | 1 | 1 | 0 | 0 | 1 | 1 |
| 103 | 0 | 1 | 1 | 1 | 1 | 1 | 0 | 0 | 0 | 1 | 1 | 0 | 0 | 1 | 1 | 1 |
| 104 | 1 | 1 | 1 | 1 | 0 | 1 | 1 | 0 | 0 | 0 | 0 | 1 | 1 | 1 | 1 | 0 |
| 105 | 0 | 1 | 0 | 1 | 1 | 0 | 0 | 1 | 0 | 0 | 1 | 1 | 0 | 0 | 1 | 1 |
| 106 | 1 | 0 | 1 | 0 | 1 | 1 | 0 | 0 | 0 | 0 | 1 | 0 | 0 | 1 | 1 | 1 |
| 107 | 0 | 0 | 1 | 1 | 0 | 0 | 0 | 1 | 0 | 1 | 1 | 0 | 1 | 1 | 0 | 1 |
| 108 | 0 | 1 | 0 | 0 | 1 | 0 | 1 | 0 | 1 | 0 | 0 | 1 | 0 | 0 | 1 | 1 |
| 109 | 1 | 0 | 1 | 0 | 1 | 1 | 0 | 1 | 0 | 0 | 0 | 1 | 0 | 0 | 1 | 1 |
| 110 | 1 | 0 | 1 | 0 | 0 | 0 | 1 | 0 | 0 | 0 | 1 | 0 | 1 | 1 | 1 | 1 |
| 111 | 0 | 1 | 0 | 1 | 0 | 0 | 0 | 0 | 0 | 1 | 0 | 0 | 1 | 0 | 1 | 1 |
| 112 | 0 | 1 | 0 | 1 | 1 | 0 | 0 | 1 | 0 | 1 | 0 | 0 | 0 | 1 | 1 | 1 |
| 113 | 0 | 0 | 0 | 0 | 0 | 1 | 1 | 0 | 1 | 1 | 0 | 1 | 0 | 0 | 1 | 1 |
| 114 | 1 | 0 | 1 | 1 | 0 | 1 | 0 | 0 | 1 | 1 | 1 | 0 | 0 | 0 | 1 | 1 |
| 115 | 0 | 1 | 1 | 1 | 1 | 0 | 0 | 1 | 0 | 1 | 1 | 0 | 1 | 0 | 1 | 0 |
| 116 | 0 | 0 | 0 | 0 | 0 | 1 | 1 | 1 | 1 | 0 | 1 | 0 | 1 | 0 | 0 | 1 |
| 117 | 0 | 1 | 1 | 0 | 1 | 0 | 1 | 0 | 0 | 0 | 0 | 1 | 0 | 1 | 1 | 1 |
| 118 | 1 | 1 | 0 | 0 | 1 | 0 | 1 | 0 | 0 | 0 | 0 | 1 | 0 | 1 | 1 | 1 |
| 119 | 0 | 1 | 1 | 0 | 0 | 0 | 0 | 1 | 0 | 0 | 0 | 1 | 0 | 1 | 1 | 1 |
| 120 | 0 | 1 | 1 | 0 | 1 | 0 | 1 | 0 | 0 | 0 | 0 | 1 | 0 | 1 | 1 | 1 |
| 121 | 0 | 0 | 1 | 1 | 0 | 1 | 0 | 1 | 0 | 0 | 1 | 0 | 0 | 1 | 1 | 1 |
| 122 | 1 | 0 | 1 | 0 | 0 | 0 | 0 | 1 | 0 | 0 | 1 | 0 | 0 | 1 | 1 | 1 |
| 123 | 0 | 1 | 0 | 0 | 1 | 0 | 1 | 0 | 0 | 0 | 0 | 1 | 0 | 1 | 1 | 1 |
| 124 | 1 | 1 | 1 | 1 | 0 | 0 | 0 | 0 | 1 | 0 | 1 | 0 | 1 | 0 | 1 | 1 |
| 125 | 1 | 1 | 1 | 1 | 0 | 0 | 0 | 1 | 0 | 1 | 0 | 0 | 1 | 0 | 1 | 1 |
| 126 | 0 | 1 | 0 | 0 | 1 | 0 | 1 | 1 | 0 | 0 | 0 | 0 | 1 | 1 | 1 | 1 |
| 127 | 1 | 0 | 0 | 0 | 1 | 0 | 1 | 0 | 0 | 1 | 0 | 1 | 0 | 0 | 1 | 1 |
| 128 | 1 | 0 | 0 | 0 | 0 | 0 | 1 | 0 | 0 | 1 | 1 | 1 | 0 | 0 | 1 | 1 |
| 129 | 1 | 0 | 1 | 1 | 1 | 0 | 0 | 0 | 0 | 0 | 1 | 0 | 1 | 1 | 1 | 1 |
| 130 | 0 | 0 | 0 | 1 | 0 | 0 | 1 | 0 | 0 | 1 | 1 | 0 | 0 | 1 | 1 | 1 |
| 131 | 0 | 0 | 1 | 1 | 1 | 1 | 0 | 0 | 1 | 0 | 0 | 0 | 0 | 1 | 1 | 1 |
| 132 | 1 | 1 | 1 | 1 | 1 | 0 | 0 | 1 | 0 | 0 | 1 | 1 | 0 | 0 | 1 | 1 |
| 133 | 1 | 0 | 1 | 0 | 0 | 1 | 0 | 1 | 0 | 0 | 0 | 1 | 0 | 1 | 1 | 1 |
| 134 | 1 | 0 | 0 | 1 | 0 | 0 | 0 | 1 | 1 | 0 | 1 | 0 | 1 | 0 | 1 | 1 |
| 135 | 1 | 1 | 0 | 1 | 0 | 0 | 1 | 1 | 1 | 0 | 0 | 0 | 1 | 0 | 1 | 0 |
| 136 | 1 | 1 | 0 | 0 | 0 | 1 | 0 | 0 | 0 | 1 | 0 | 1 | 1 | 0 | 0 | 1 |
| 137 | 1 | 0 | 1 | 1 | 0 | 1 | 0 | 1 | 0 | 0 | 1 | 1 | 0 | 0 | 0 | 1 |
| 138 | 0 | 1 | 0 | 0 | 1 | 0 | 1 | 0 | 1 | 1 | 0 | 0 | 1 | 1 | 1 | 0 |
| 139 | 0 | 0 | 1 | 1 | 1 | 0 | 1 | 1 | 1 | 0 | 1 | 0 | 0 | 1 | 1 | 0 |
| 140 | 0 | 0 | 1 | 0 | 1 | 1 | 0 | 0 | 0 | 0 | 1 | 1 | 0 | 1 | 0 | 1 |
| 141 | 1 | 0 | 0 | 0 | 1 | 0 | 0 | 1 | 0 | 0 | 1 | 0 | 0 | 1 | 1 | 1 |
| 142 | 0 | 1 | 0 | 0 | 0 | 1 | 0 | 0 | 1 | 0 | 0 | 0 | 1 | 0 | 1 | 1 |
| 143 | 0 | 1 | 0 | 0 | 1 | 0 | 0 | 0 | 1 | 0 | 1 | 0 | 1 | 1 | 0 | 1 |
| 144 | 0 | 1 | 0 | 1 | 1 | 0 | 0 | 0 | 1 | 0 | 1 | 1 | 0 | 0 | 1 | 1 |
| 145 | 0 | 0 | 1 | 0 | 0 | 0 | 1 | 0 | 0 | 1 | 0 | 1 | 0 | 1 | 0 | 1 |
| 146 | 0 | 1 | 1 | 1 | 0 | 1 | 1 | 0 | 1 | 0 | 0 | 0 | 1 | 0 | 1 | 1 |
| 147 | 0 | 1 | 0 | 0 | 1 | 0 | 0 | 0 | 0 | 1 | 0 | 1 | 0 | 1 | 1 | 1 |
| 148 | 1 | 1 | 0 | 0 | 0 | 0 | 0 | 1 | 0 | 0 | 1 | 1 | 1 | 1 | 1 | 0 |
| 149 | 0 | 0 | 0 | 1 | 0 | 0 | 1 | 0 | 1 | 0 | 0 | 1 | 0 | 1 | 1 | 1 |
| 150 | 0 | 0 | 1 | 1 | 0 | 0 | 1 | 1 | 1 | 0 | 0 | 0 | 0 | 1 | 1 | 1 |
| 151 | 1 | 1 | 0 | 0 | 1 | 0 | 1 | 0 | 1 | 0 | 0 | 0 | 1 | 1 | 0 | 1 |
| 152 | 1 | 0 | 0 | 0 | 0 | 1 | 0 | 0 | 0 | 1 | 0 | 1 | 1 | 0 | 1 | 1 |
| 153 | 1 | 1 | 0 | 0 | 0 | 0 | 1 | 1 | 0 | 0 | 1 | 1 | 0 | 1 | 1 | 1 |
| 154 | 0 | 0 | 1 | 1 | 0 | 1 | 1 | 0 | 0 | 0 | 0 | 1 | 0 | 0 | 1 | 1 |
| 155 | 0 | 0 | 0 | 0 | 1 | 0 | 1 | 1 | 0 | 0 | 0 | 1 | 1 | 0 | 1 | 1 |
| 156 | 0 | 0 | 0 | 1 | 0 | 0 | 1 | 0 | 0 | 0 | 1 | 1 | 1 | 0 | 1 | 1 |
| 157 | 1 | 0 | 0 | 1 | 1 | 1 | 1 | 0 | 0 | 0 | 0 | 1 | 1 | 0 | 1 | 1 |

TABLE 1b-continued

| | | | | | | | | | | | | | | | | |
|---|---|---|---|---|---|---|---|---|---|---|---|---|---|---|---|---|
| 158 | 1 | 1 | 0 | 1 | 0 | 1 | 0 | 0 | 0 | 0 | 0 | 0 | 1 | 1 | 1 | 1 |
| 159 | 0 | 0 | 0 | 1 | 0 | 1 | 1 | 0 | 1 | 1 | 0 | 1 | 0 | 1 | 0 | 1 |
| 160 | 0 | 0 | 0 | 0 | 1 | 0 | 1 | 0 | 0 | 1 | 0 | 1 | 1 | 1 | 1 | 0 |
| 161 | 0 | 0 | 0 | 0 | 1 | 0 | 0 | 1 | 1 | 0 | 1 | 1 | 1 | 0 | 1 | 0 |
| 162 | 0 | 1 | 1 | 0 | 0 | 1 | 1 | 0 | 0 | 1 | 0 | 1 | 1 | 0 | 1 | 1 |
| 163 | 1 | 1 | 0 | 0 | 1 | 0 | 0 | 0 | 0 | 1 | 1 | 0 | 1 | 0 | 1 | 1 |
| 164 | 1 | 0 | 0 | 1 | 1 | 1 | 0 | 0 | 0 | 1 | 1 | 1 | 1 | 0 | 1 | 0 |
| 165 | 1 | 1 | 0 | 0 | 0 | 0 | 1 | 0 | 0 | 1 | 1 | 0 | 0 | 1 | 1 | 1 |
| 166 | 1 | 0 | 0 | 0 | 1 | 1 | 0 | 1 | 1 | 1 | 1 | 1 | 0 | 0 | 1 | 0 |
| 167 | 1 | 1 | 1 | 0 | 1 | 0 | 0 | 0 | 1 | 1 | 0 | 0 | 1 | 1 | 1 | 1 |
| 168 | 0 | 0 | 0 | 1 | 0 | 0 | 0 | 1 | 1 | 1 | 0 | 1 | 1 | 0 | 0 | 1 |
| 169 | 0 | 0 | 0 | 1 | 1 | 0 | 1 | 0 | 0 | 0 | 1 | 1 | 1 | 0 | 1 | 0 |
| 170 | 1 | 0 | 1 | 1 | 0 | 1 | 0 | 1 | 0 | 0 | 0 | 0 | 0 | 1 | 1 | 1 |
| 171 | 1 | 0 | 0 | 0 | 0 | 1 | 1 | 1 | 0 | 1 | 1 | 0 | 0 | 0 | 0 | 1 |
| 172 | 0 | 0 | 1 | 0 | 1 | 1 | 0 | 0 | 1 | 1 | 1 | 0 | 0 | 1 | 0 | 0 |
| 173 | 1 | 1 | 0 | 1 | 0 | 1 | 0 | 0 | 0 | 0 | 1 | 1 | 1 | 1 | 0 | 0 |
| 174 | 0 | 1 | 1 | 0 | 0 | 0 | 1 | 0 | 0 | 0 | 1 | 1 | 1 | 1 | 0 | 0 |
| 175 | 1 | 0 | 1 | 1 | 1 | 0 | 0 | 0 | 0 | 0 | 1 | 1 | 1 | 0 | 1 | 0 |
| 176 | 0 | 0 | 1 | 0 | 1 | 1 | 0 | 1 | 1 | 0 | 0 | 0 | 1 | 0 | 1 | 0 |
| 177 | 1 | 0 | 1 | 0 | 0 | 0 | 1 | 1 | 1 | 1 | 1 | 0 | 0 | 1 | 0 | 0 |
| 178 | 0 | 1 | 0 | 0 | 1 | 0 | 0 | 0 | 0 | 1 | 0 | 1 | 0 | 1 | 1 | 1 |
| 179 | 0 | 1 | 0 | 1 | 0 | 0 | 1 | 1 | 0 | 0 | 1 | 0 | 0 | 1 | 1 | 1 |
| 180 | 0 | 0 | 0 | 0 | 1 | 0 | 1 | 1 | 1 | 0 | 1 | 1 | 0 | 0 | 1 | 1 |
| 181 | 1 | 0 | 1 | 0 | 0 | 0 | 0 | 0 | 1 | 0 | 0 | 1 | 0 | 1 | 1 | 1 |
| 182 | 0 | 1 | 1 | 0 | 0 | 0 | 0 | 0 | 1 | 0 | 1 | 0 | 1 | 0 | 1 | 1 |
| 183 | 0 | 0 | 0 | 0 | 0 | 1 | 1 | 0 | 1 | 0 | 0 | 1 | 0 | 1 | 1 | 1 |
| 184 | 0 | 1 | 0 | 1 | 0 | 1 | 0 | 0 | 0 | 1 | 0 | 0 | 1 | 1 | 1 | 1 |
| 185 | 1 | 0 | 1 | 0 | 1 | 0 | 0 | 0 | 0 | 0 | 1 | 0 | 1 | 1 | 1 | 1 |
| 186 | 1 | 0 | 1 | 0 | 1 | 0 | 0 | 0 | 1 | 0 | 0 | 0 | 1 | 1 | 1 | 1 |
| 187 | 0 | 1 | 0 | 0 | 0 | 1 | 1 | 0 | 1 | 0 | 0 | 0 | 0 | 1 | 1 | 1 |
| 188 | 1 | 1 | 0 | 0 | 0 | 0 | 1 | 0 | 0 | 1 | 0 | 0 | 1 | 1 | 1 | 1 |
| 189 | 0 | 0 | 1 | 1 | 1 | 1 | 1 | 0 | 0 | 1 | 0 | 0 | 1 | 1 | 0 | 0 |
| 190 | 0 | 0 | 1 | 0 | 0 | 1 | 1 | 1 | 0 | 0 | 1 | 0 | 0 | 0 | 1 | 1 |
| 191 | 1 | 1 | 0 | 1 | 1 | 0 | 1 | 0 | 0 | 1 | 1 | 0 | 0 | 1 | 1 | 0 |
| 192 | 0 | 0 | 0 | 1 | 1 | 0 | 0 | 1 | 1 | 1 | 1 | 1 | 0 | 0 | 0 | 0 |
| 193 | 1 | 1 | 1 | 0 | 0 | 1 | 0 | 0 | 0 | 0 | 1 | 1 | 1 | 1 | 0 | 0 |
| 194 | 1 | 1 | 0 | 1 | 1 | 0 | 0 | 0 | 0 | 1 | 0 | 0 | 1 | 1 | 1 | 0 |
| 195 | 1 | 0 | 0 | 0 | 1 | 0 | 1 | 1 | 1 | 0 | 0 | 0 | 0 | 1 | 0 | 1 |
| 196 | 1 | 0 | 1 | 0 | 1 | 1 | 0 | 0 | 1 | 1 | 1 | 0 | 0 | 0 | 1 | 0 |
| 197 | 0 | 1 | 1 | 1 | 0 | 1 | 1 | 0 | 1 | 0 | 1 | 0 | 1 | 0 | 0 | 1 |
| 198 | 1 | 0 | 0 | 0 | 0 | 1 | 1 | 0 | 1 | 0 | 1 | 0 | 1 | 0 | 0 | 1 |
| 199 | 0 | 1 | 1 | 1 | 1 | 1 | 0 | 1 | 0 | 1 | 0 | 1 | 0 | 1 | 0 | 0 |
| 200 | 1 | 0 | 0 | 0 | 0 | 1 | 1 | 1 | 0 | 0 | 1 | 0 | 1 | 0 | 0 | 1 |
| 201 | 0 | 1 | 0 | 1 | 0 | 1 | 1 | 1 | 0 | 0 | 1 | 0 | 1 | 0 | 0 | 1 |
| 202 | 1 | 1 | 1 | 0 | 1 | 0 | 1 | 1 | 1 | 0 | 0 | 0 | 0 | 1 | 0 | 1 |
| 203 | 1 | 1 | 0 | 1 | 0 | 1 | 0 | 0 | 0 | 1 | 1 | 1 | 1 | 0 | 0 | 0 |
| 204 | 1 | 0 | 0 | 0 | 0 | 1 | 1 | 0 | 1 | 0 | 0 | 1 | 0 | 0 | 0 | 1 |
| 205 | 0 | 1 | 1 | 0 | 0 | 0 | 1 | 1 | 1 | 0 | 0 | 1 | 0 | 1 | 1 | 0 |
| 206 | 0 | 0 | 1 | 1 | 0 | 1 | 0 | 0 | 0 | 1 | 1 | 0 | 0 | 1 | 1 | 0 |
| 207 | 0 | 1 | 1 | 0 | 1 | 1 | 0 | 0 | 1 | 0 | 1 | 0 | 0 | 1 | 1 | 0 |
| 208 | 1 | 0 | 1 | 0 | 0 | 1 | 1 | 1 | 0 | 0 | 1 | 0 | 0 | 1 | 1 | 0 |
| 209 | 0 | 0 | 1 | 1 | 1 | 0 | 0 | 1 | 1 | 0 | 1 | 0 | 0 | 1 | 1 | 0 |
| 210 | 1 | 1 | 0 | 0 | 0 | 0 | 1 | 1 | 0 | 0 | 1 | 1 | 0 | 1 | 1 | 0 |
| 211 | 1 | 0 | 0 | 0 | 1 | 1 | 1 | 1 | 0 | 0 | 1 | 0 | 1 | 1 | 0 | 0 |
| 212 | 0 | 0 | 0 | 1 | 0 | 0 | 1 | 0 | 1 | 1 | 0 | 0 | 1 | 0 | 1 | 0 |
| 213 | 1 | 0 | 0 | 0 | 0 | 1 | 1 | 1 | 0 | 0 | 1 | 0 | 0 | 0 | 1 | 1 |
| 214 | 0 | 1 | 1 | 0 | 0 | 1 | 0 | 0 | 0 | 1 | 1 | 1 | 0 | 0 | 0 | 1 |
| 215 | 1 | 0 | 0 | 0 | 1 | 1 | 0 | 0 | 0 | 1 | 1 | 0 | 0 | 0 | 1 | 1 |
| 216 | 1 | 0 | 0 | 0 | 0 | 1 | 1 | 1 | 1 | 0 | 0 | 1 | 0 | 0 | 0 | 1 |
| 217 | 0 | 0 | 1 | 1 | 0 | 0 | 1 | 1 | 1 | 0 | 0 | 0 | 0 | 0 | 1 | 1 |
| 218 | 1 | 0 | 0 | 1 | 1 | 0 | 1 | 1 | 1 | 0 | 0 | 0 | 0 | 1 | 1 | 0 |
| 219 | 1 | 1 | 0 | 0 | 0 | 1 | 1 | 0 | 1 | 0 | 0 | 1 | 1 | 0 | 0 | 1 |
| 220 | 1 | 1 | 0 | 1 | 1 | 0 | 1 | 1 | 0 | 1 | 0 | 1 | 0 | 0 | 0 | 1 |
| 221 | 0 | 1 | 0 | 1 | 0 | 1 | 1 | 0 | 0 | 1 | 1 | 0 | 0 | 1 | 1 | 0 |
| 222 | 1 | 1 | 0 | 0 | 0 | 1 | 1 | 0 | 1 | 0 | 0 | 1 | 0 | 0 | 1 | 1 |
| 223 | 1 | 1 | 0 | 0 | 1 | 0 | 0 | 1 | 0 | 1 | 1 | 0 | 0 | 0 | 1 | 1 |
| 224 | 1 | 0 | 0 | 0 | 0 | 1 | 1 | 0 | 1 | 0 | 1 | 0 | 0 | 0 | 1 | 1 |
| 225 | 0 | 1 | 1 | 0 | 0 | 1 | 0 | 0 | 1 | 1 | 1 | 0 | 0 | 0 | 1 | 1 |

Table 1c includes sequences having a relatively small quantity of consecutive 0 or 1 in Table 1. The first sequence and the second sequence can be both optimized to include no excessively long blank energy transmission period, to prevent a channel from being preempted by another device. Likewise, third sequences T shown in Table 1d and the second sequences M shown in Table 1e that are in a one-to-one correspondence with the sequences in Table 1c may be induced according to Table 1c. Optionally, the first sequence may also be formed by repeating any sequence in Table 1e by N times. In this case, the second sequence M corresponding to the first sequence still needs to be in a bit logical inversion relationship with the first sequence; or the sequence M is a sequence in Table 1 corresponding to that in Table 1c.

TABLE 1c

| Number of a sequence | | | | | | | | S(n) | | | | | | | | |
|---|---|---|---|---|---|---|---|---|---|---|---|---|---|---|---|---|
| 1 | 0 | 0 | 0 | 1 | 0 | 1 | 1 | 0 | 1 | 0 | 1 | 1 | 0 | 1 | 1 | 1 |
| 2 | 0 | 0 | 1 | 0 | 1 | 1 | 1 | 0 | 1 | 0 | 0 | 0 | 1 | 0 | 1 | 1 |
| 3 | 0 | 1 | 0 | 0 | 0 | 1 | 1 | 1 | 0 | 1 | 1 | 0 | 1 | 1 | 1 | 0 |
| 4 | 1 | 0 | 0 | 0 | 1 | 1 | 1 | 0 | 0 | 0 | 1 | 0 | 0 | 1 | 1 | 0 |
| 5 | 1 | 0 | 1 | 0 | 0 | 1 | 0 | 0 | 1 | 0 | 1 | 1 | 1 | 0 | 1 | 1 |
| 6 | 1 | 1 | 1 | 0 | 1 | 0 | 0 | 1 | 0 | 1 | 0 | 0 | 1 | 0 | 0 | 0 |

| Number of a sequence | | | | | | | | S(n) | | | | | | | | |
|---|---|---|---|---|---|---|---|---|---|---|---|---|---|---|---|---|
| 1 | 0 | 1 | 1 | 0 | 0 | 1 | 0 | 0 | 0 | 1 | 1 | 1 | 0 | 0 | 0 | 1 |
| 2 | 0 | 1 | 0 | 1 | 1 | 0 | 1 | 1 | 1 | 0 | 0 | 1 | 1 | 0 | 0 | 0 |
| 3 | 0 | 0 | 1 | 0 | 1 | 1 | 0 | 1 | 1 | 0 | 0 | 0 | 1 | 0 | 1 | 0 |
| 4 | 1 | 1 | 1 | 0 | 1 | 1 | 0 | 1 | 0 | 1 | 1 | 0 | 1 | 0 | 0 | 0 |
| 5 | 0 | 0 | 0 | 1 | 0 | 1 | 1 | 1 | 0 | 0 | 1 | 1 | 1 | 0 | 0 | 0 |
| 6 | 1 | 0 | 0 | 1 | 1 | 0 | 1 | 1 | 1 | 0 | 0 | 0 | 1 | 1 | 1 | 0 |

TABLE 1d

| Number of a sequence | | | | | | | | T(n) | | | | | | | | |
|---|---|---|---|---|---|---|---|---|---|---|---|---|---|---|---|---|
| 1 | −1 | −1 | −1 | 1 | −1 | 1 | 1 | −1 | 1 | −1 | 1 | 1 | −1 | 1 | 1 | 1 |
| 2 | −1 | −1 | 1 | −1 | 1 | 1 | 1 | −1 | 1 | −1 | −1 | −1 | 1 | −1 | 1 | 1 |
| 3 | −1 | 1 | −1 | −1 | −1 | 1 | 1 | 1 | −1 | 1 | 1 | −1 | 1 | 1 | 1 | −1 |
| 4 | 1 | −1 | −1 | −1 | 1 | 1 | 1 | −1 | −1 | −1 | 1 | −1 | −1 | 1 | 1 | −1 |
| 5 | 1 | −1 | 1 | −1 | −1 | 1 | −1 | −1 | 1 | −1 | 1 | 1 | 1 | −1 | 1 | 1 |
| 6 | 1 | 1 | 1 | −1 | 1 | −1 | −1 | 1 | −1 | 1 | −1 | −1 | 1 | −1 | −1 | −1 |

| Number of a sequence | | | | | | | | T(n) | | | | | | | | |
|---|---|---|---|---|---|---|---|---|---|---|---|---|---|---|---|---|
| 1 | −1 | 1 | 1 | −1 | −1 | 1 | −1 | −1 | −1 | 1 | 1 | 1 | −1 | −1 | −1 | 1 |
| 2 | −1 | 1 | −1 | 1 | 1 | −1 | 1 | 1 | 1 | −1 | −1 | 1 | 1 | −1 | −1 | −1 |
| 3 | −1 | −1 | 1 | −1 | 1 | 1 | −1 | 1 | 1 | −1 | −1 | −1 | 1 | −1 | 1 | −1 |
| 4 | 1 | 1 | 1 | −1 | 1 | 1 | −1 | 1 | −1 | 1 | 1 | −1 | 1 | −1 | −1 | −1 |
| 5 | −1 | −1 | −1 | 1 | −1 | 1 | 1 | 1 | −1 | −1 | 1 | 1 | 1 | −1 | −1 | −1 |
| 6 | 1 | −1 | −1 | 1 | 1 | −1 | 1 | 1 | −1 | −1 | −1 | 1 | 1 | 1 | −1 |

40

TABLE 1e

| Number of a sequence | | | | | | | | M(n) | | | | | | | | |
|---|---|---|---|---|---|---|---|---|---|---|---|---|---|---|---|---|
| 1 | 1 | 1 | 1 | 0 | 1 | 0 | 0 | 1 | 0 | 1 | 0 | 0 | 1 | 0 | 0 | 0 |
| 2 | 1 | 1 | 0 | 1 | 0 | 0 | 0 | 1 | 0 | 1 | 1 | 1 | 0 | 1 | 0 | 0 |
| 3 | 1 | 0 | 1 | 1 | 1 | 0 | 0 | 0 | 1 | 0 | 0 | 1 | 0 | 0 | 0 | 1 |
| 4 | 0 | 1 | 1 | 1 | 0 | 0 | 0 | 1 | 1 | 1 | 0 | 1 | 1 | 0 | 0 | 1 |
| 5 | 0 | 1 | 0 | 1 | 1 | 0 | 1 | 1 | 0 | 1 | 0 | 0 | 0 | 1 | 0 | 0 |
| 6 | 0 | 0 | 0 | 1 | 0 | 1 | 1 | 0 | 1 | 0 | 1 | 1 | 0 | 1 | 1 | 1 |

| Number of a sequence | | | | | | | | M(n) | | | | | | | | |
|---|---|---|---|---|---|---|---|---|---|---|---|---|---|---|---|---|
| 1 | 1 | 0 | 0 | 1 | 1 | 0 | 1 | 1 | 0 | 0 | 0 | 1 | 1 | 1 | 0 |
| 2 | 1 | 0 | 1 | 0 | 0 | 1 | 0 | 0 | 0 | 1 | 1 | 0 | 0 | 1 | 1 | 1 |
| 3 | 1 | 1 | 0 | 1 | 0 | 0 | 0 | 1 | 1 | 1 | 0 | 0 | 1 | 0 | 1 |
| 4 | 0 | 0 | 0 | 1 | 0 | 0 | 1 | 0 | 1 | 0 | 0 | 1 | 0 | 1 | 1 | 1 |
| 5 | 1 | 1 | 0 | 1 | 0 | 0 | 0 | 1 | 1 | 0 | 0 | 0 | 1 | 1 | 1 |
| 6 | 0 | 1 | 1 | 0 | 0 | 1 | 0 | 0 | 0 | 1 | 1 | 1 | 0 | 0 | 0 | 1 |

Specifically, in a wireless communications system using a wake-up technology, it may be agreed on that one of sequences in Table 1 is the first sequence S. In this way, correspondingly, a corresponding sequence M and a corresponding sequence T may be learned based on a relationship among the sequence S, the sequence M, and the sequence T. Certainly, the sequence M or the sequence T may also be directly specified in a protocol.

The following describes in detail why the foregoing preferred sequence has the foregoing technical effects:

1. Generally, whether a feature of a sequence is good needs to be represented in a receiving process of a receiver.

In this implementation, optionally, a binary-sequence receiving manner of the foregoing OOK is used. On a receive side, a correlator is used to perform a correlation operation on a received signal, to determine whether the received signal is a WUP preamble and find a start location of the WUP preamble, and accordingly, an end location of the WUP preamble can be calculated. As shown in FIG. 2, the end location of the WUP preamble is the start location of the WUP payload.

For ease of description, any sequence in Table 1 is defined as S(n), a sequence correlated with S(n) is defined as T(n) on the receive side, and T(n) is obtained based on S(n):

$$T(n)=S(n)*2-1 \qquad (1).$$

n is a discrete expression of a time sampling point, and may be understood as an instantaneous moment. It is easily learned that T(n) is a result obtained only after keeping all 1 in S(n) unchanged, but setting all 0 to −1.

Another complementary sequence M(n) may be obtained based on S(n):

$$M(n)=NOT(S(n)) \qquad (2).$$

NOT represents a bit logical negation operation. To be specific, a negation operation is performed on bits in S(n). In other words, 0 and 1 in S(n) are respectively set to 1 and 0. For example, sequences whose sequence numbers are consistent in Table 1, Table 2, and Table 3 have relationships in the foregoing expressions (1) and (2).

During correlation, the receiver separately performs a correlation operation on S(n) and T(n) and on M(n) and T(n). To be accurate, mathematical expressions of these correlation operations are:

$$C1(\tau)=\Sigma-\infty\infty S S(n) \times T(n-\tau) \qquad (3); \text{ and}$$

$$C2(\tau)=\Sigma-\infty\infty M(n) \times T(n-\tau) \qquad (4),$$

where C1(τ) is a correlation operation result of S(n) and T(n), and τ is a time shift.

FIG. 4 is a correlation result calculated based on a sequence 7 in Table 1. For example, the result shown in FIG. 4 is obtained after calculation is performed on the sequence 7 by using software MATLAB based on the correlation operation in an operation equation (3). It can be seen from FIG. 4 that a maximum value of the correlation result of S(n) and T(n) is 16, a second maximum value is 2, and a minimum value is −2.

Figure 5:
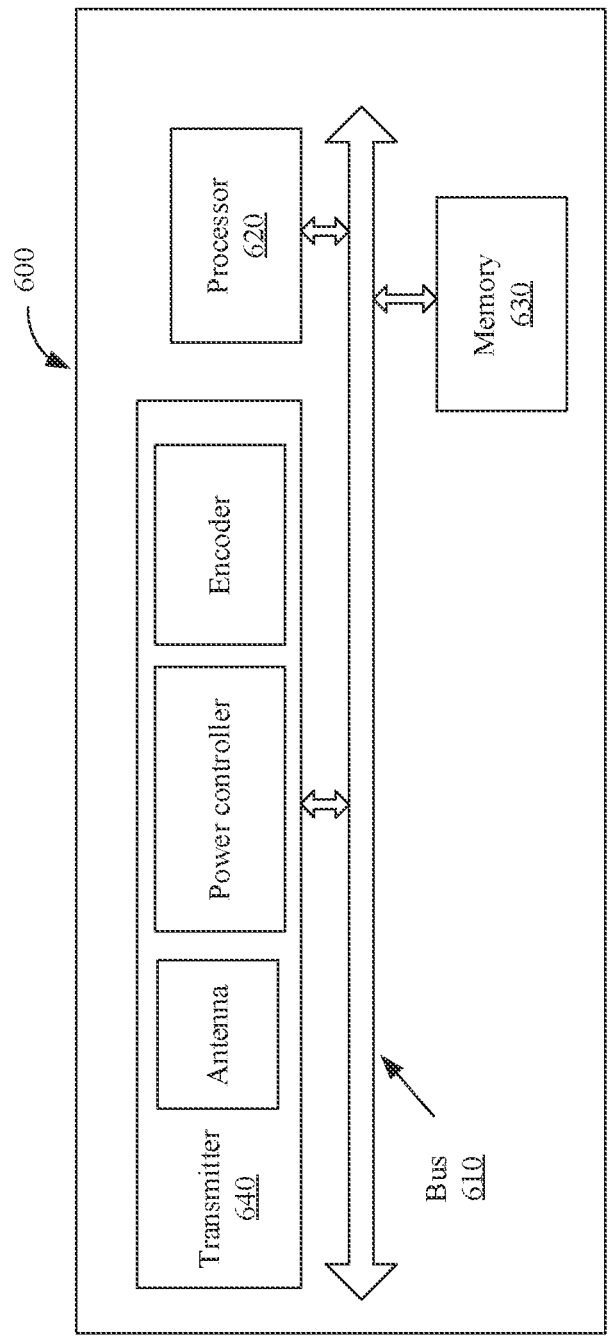
FIG. 5 is a schematic structural diagram of a sending apparatus for wake-up according to an embodiment of the present invention.

FIG. 5 is a result obtained after calculation by using software MATLAB based on a correlation operation of the operation equation (4). It can be seen from FIG. 5 that a minimum value of the correlation result of M(n) and T(n) is −16, a second minimum value is −2, and a maximum value is +2. All sequences in Table 1 have this feature (the sequences in Table 1 are exactly obtained based on the foregoing requirement or principle).

More specifically, a process of obtaining the sequences in Table 1 is mainly to search based on the following conditions to obtain preferred sequences:

First, quantities of 0 and 1 in an obtained binary sequence are the same. In this way, correspondingly, a quantity of 1 is the same as a quantity of −1 in a local sequence T(n) of a receiver. In this way, when the receiver locally generates a signal T(n), a direct current component is 0. Because a direct current component (which may be simply understood as an average value) in a circuit is vulnerable to influence of another direct current. Therefore, generally, a smaller direct current component in a signal is better.

Second, two (or more) different WUP preambles can be simply detected. The different WUP preambles may be used to indicate two (or more) types of information, for example, a current data rate.

According to an aspect, complementary sequences M(n) can be directly obtained from all sequences S(n) in Table 1 complementary sequence. Therefore, the transmitter needs to store only S(n). If M(n) needs to be sent, M(n) may be obtained by using a logical negation circuit based on S(n).

According to another aspect, the receiver needs to store only a local sequence T(n) for performing a correlation operation. If the transmitter sends S(n) (for example, indicating a WUP payload rate), the receiver obtains a result similar to that in FIG. 4 after receiving S(n) and performing correlation with local T(n). If the transmitter sends M(n) (for example, indicating another WUP payload rate), the receiver obtains a result similar to that in FIG. 5 after performing the correlation. It can be seen that the results of FIG. 4 and FIG. 5 differ greatly. In particular, peaks thereof, being 16 and −16 respectively, have completely equal absolute values, but have completely opposite signs. In this way, the receiver may determine, by analyzing a plus or minus sign (or polarity) of a peak (that is, a value whose absolute value is maximum), which WUP preamble is received by the receiver. In this way, information (for example, a WUP payload data rate) indicated by the WUP preamble may be obtained.

Briefly, the sequences in Table 1 are sequences that are preferably selected from sequences of 32 bits based on the expressions (3) and (4) and conditions a) and b), where the condition b) is that the sequences in Table 1 and the complementary sequences thereof both have correlation maximum values of max(C1(τ))=16 and min(C2(τ))=−16. According to the foregoing solution, complexity of the receiver is simplified, only one group of local sequences T(n) need to be stored, and a sequence sent by the sending apparatus can be detected by performing only one correlation operation on received data, so that information indicated by the sequence can be obtained, After the receiver performs correlation processing, a larger maximum value of an absolute value of a correlation value is better. This is because the larger maximum value of the absolute value better helps the WUR find a peak in a noise and interference environment, so that a WUR receiver easily determines that the WUR receiver receives a WUP preamble. Because after performing a correlation operation, the receiver always determines, depending on whether the maximum value of the absolute value of the correlation result exceeds a threshold, whether the receiver receives a WUP preamble, the larger maximum value of the absolute value indicates less vulnerability to interference. Briefly, the larger maximum value of the absolute value of the correlation value better helps the receiver correctly determine whether the WUP preamble is received.

For example, the maximum value of the absolute value of the correlation value in FIG. 4 and FIG. 5 is 16. It is assumed that the maximwn value of the absolute value is only 12 or less, and a threshold of correlation detection is set to 10. Once S(n) or M(n) is affected by noise and other interference, it is very likely that a maximum value of an absolute value that meets a requirement of being greater than the threshold 10 cannot be found from the absolute values of the correlation result. All sequences S(n) in Table 1 and corresponding M(n) thereof both have the maximum value 16 of the absolute values after correlation with T(n), and the maximum value 16 of the absolute value is a possible maximum absolute value obtained under the condition a) after all binary sequences of 32 bits are correlated based on expressions (3) and (4).

Therefore, a start point or an end point of the WUP preamble can be accurately detected. Generally, on the receive side, the start point or the end point is calculated based on a peak location of the correlation result. The peak is a value whose absolute value of the correlation result is maximum, and the peak may be a positive value or may be a negative value. As shown in c), the positive value or the negative value is used to indicate different information.

To accurately detect a peak location, specifically, a difference between a first maximum value and a second maximum value of absolute values of results obtained after correlation between the first sequence S and the third sequence T should be the largest. In addition, a difference between a first maximum value and a second maximum value of absolute values of results after correlation between the second sequence M and the third sequence T also should be the largest.

In other words, a difference between the peak in the absolute values of the results after the correlation between the first sequence S and the third sequence T and all other values is the largest; and a difference between the peak of the absolute values of the results after the correlation between the second sequence M and the third sequence T and all other values is also the largest.

For example, the following operations are performed, to help find a preferred first sequence S according to a principle that a larger ACMetric_S is better and a larger ACMetric_M is better:

$$\text{ACMetric\_S} = (\max(\text{abs}C1(\tau)))/(2\text{ndmax}(\text{abs}(C1(\tau)))) \quad (5); \text{and}$$

$$\text{ACMetric\_M} = (\max(\text{abs}C2(\tau)))/(2\text{ndmax}(\text{abs}(C2(\tau)))) \quad (6).$$

In the foregoing expressions, abs( ) is an absolute value operation, max( ) is an operation of obtaining a maximum value, and 2ndmax( ) is an operation of obtaining a second maximum value.

Equivalently, or similarly, the following operation is performed, to find a better first sequence according to a principle that a larger ACMetric_S" is better and a smaller ACMetric_M" is better:

$$\text{ACMetric\_S}'' = (\max(C1(\tau)))/(2\text{ndmax}(\text{abs}(C1(\tau)))) \quad (5''); \text{and}$$

$$\text{ACMetric\_M}'' = (\max(C2(\tau)))/(2\text{ndmax}(\text{abs}(C2(\tau)))) \quad (6'').$$

In the foregoing expressions, abs( ) is an absolute value operation, max( ) is an operation of obtaining a maximum value, min( ) is an operation of obtaining a minimum value, and 2ndmax( ) is an operation of obtaining a second maximum value.

Certainly, another representation manner may also be used to obtain the preferred first sequence having the greatest difference between the peak and all other values.

For example, referring to FIG. 4, a first maximum value $\max(C1(\tau))$ in the results after the correlation between S(n) and T(n) is 16.

In addition, a second maximum value 2ndmax(abs(C1(τ))) in the results after the correlation between S(n) and T(n) is 2.

Referring to FIG. 5, a first minimum value min(C2(τ)) in the result after the correlation between M(n) and T(n) is −16 (that is, the maximum value of the absolute values of the correlation results is 16).

A second maximum value 2ndmax abs(C2(τ))) in the absolute value of the result after the correlation between M(n) and T(n) is 2.

Under the foregoing conditions, when affected by noise, interference, or the like, the receiver can still easily and accurately find a location of a peak, for example, max(C1(τ)) or min(C2(τ)), to easily find the start location of the WUP preamble.

Referring to the foregoing expressions (5) and (6), ACMetric_S and ACMetric_M are respectively 8 and −8. If differences between max(C1(τ)) and the second maximum value and between min(C2(τ)) and the second maximum value are small, a maximum value of an absolute value is very likely to appear at another location once affected by noise, interference, and the like. It is assumed that max(C1(τ)) is 16, but 2ndmax(abs(C1(τ))) is 14. As a result, once affected by noise and interference, 2ndmax(abs(C1(τ))) is very likely to be increased to 17. In this case, a receiver calculates a start point of the WUP preamble based on the current max(C1(τ))=17, and an inaccurate start point calculated causes a subsequent WUP payload part to be incorrectly decoded. That is, the foregoing solution ensures a very good synchronization effect.

Regardless of whichever manner being used, in brief, a larger difference between the peak and all other values is better and better helps accurately find the peak location. Then the start location or the end location of the WUP is determined based on the peak location, to determine the start location of the payload. In this way, time synchronization precision is greatly improved. It should be specially noted that all sequences in Table 1 have a relationship that ACMetric_S and/or ACMetric_M are/is 8 (or ACMetric_S" and ACMetric_M\" are respectively 8 and −8). This is optimal values of ACMetric_S and ACMetric_M that can be attained when sequences of 32 bits obtained by using a traversal algorithm meet the conditions a) and b).

In addition to the foregoing sequences with a length of 32 bits in Table 1, Table 2, and Table 3, there may be a sequence with another length. The sequence of another length may be selected in a manner consistent with the foregoing principle, or a longer first sequence S may be constructed based on the foregoing sequence of 32 bits and the second sequence M and the third sequence T are correspondingly obtained.

Example 2 of the first sequence S, the second sequence M, and the third sequence T The first sequence S with a length of 16 bits is any sequence shown in Table 2. A number of a sequence is merely for ease of subsequent description, and constitutes no limitation.

TABLE 2

| Number of a sequence | S(n) sequence body of 16 bits |
|---|---|
| 1 | 0 0 0 1 0 1 0 1 1 0 1 1 0 0 1 1 |
| 2 | 0 0 0 1 1 1 0 1 0 1 1 0 1 1 0 0 |
| 3 | 0 0 0 1 1 1 0 1 1 0 1 0 1 1 0 0 |
| 4 | 0 0 1 0 0 1 1 0 1 0 1 1 1 1 0 0 |
| 5 | 0 0 1 0 0 1 1 1 1 0 0 1 0 1 0 1 |

TABLE 2-continued

| Number of a sequence | S(n) sequence body of 16 bits | | | | | | | | | | | | | | | |
|---|---|---|---|---|---|---|---|---|---|---|---|---|---|---|---|---|
| 6 | 0 | 0 | 1 | 0 | 1 | 0 | 0 | 0 | 1 | 1 | 1 | 1 | 1 | 1 | 0 | 0 |
| 7 | 0 | 0 | 1 | 0 | 1 | 0 | 1 | 0 | 0 | 1 | 1 | 1 | 1 | 0 | 0 | 1 |
| 8 | 0 | 0 | 1 | 0 | 1 | 0 | 1 | 1 | 0 | 0 | 1 | 1 | 1 | 1 | 0 | 0 |
| 9 | 0 | 0 | 1 | 0 | 1 | 0 | 1 | 1 | 1 | 1 | 0 | 0 | 1 | 0 | 0 | 1 |
| 10 | 0 | 0 | 1 | 0 | 1 | 1 | 1 | 0 | 1 | 0 | 0 | 1 | 1 | 1 | 0 | 0 |
| 11 | 0 | 0 | 1 | 1 | 0 | 0 | 0 | 0 | 1 | 1 | 1 | 1 | 1 | 0 | 1 | 0 |
| 12 | 0 | 0 | 1 | 1 | 0 | 0 | 0 | 1 | 0 | 1 | 1 | 1 | 1 | 0 | 0 | 0 |
| 13 | 0 | 0 | 1 | 1 | 0 | 0 | 1 | 0 | 0 | 1 | 0 | 1 | 0 | 1 | 1 | 1 |
| 14 | 0 | 0 | 1 | 1 | 0 | 0 | 1 | 0 | 1 | 0 | 1 | 1 | 1 | 0 | 0 | 0 |
| 15 | 0 | 0 | 1 | 1 | 0 | 1 | 0 | 1 | 1 | 0 | 1 | 0 | 0 | 0 | 1 | 1 |
| 16 | 0 | 0 | 1 | 1 | 0 | 1 | 0 | 1 | 1 | 0 | 1 | 1 | 1 | 0 | 0 | 0 |
| 17 | 0 | 0 | 1 | 1 | 0 | 1 | 1 | 0 | 1 | 0 | 1 | 0 | 0 | 0 | 1 | 1 |
| 18 | 0 | 0 | 1 | 1 | 0 | 1 | 1 | 0 | 1 | 0 | 1 | 1 | 1 | 0 | 0 | 0 |
| 19 | 0 | 0 | 1 | 1 | 1 | 0 | 0 | 1 | 0 | 1 | 1 | 1 | 0 | 1 | 0 | 0 |
| 20 | 0 | 0 | 1 | 1 | 1 | 0 | 1 | 0 | 0 | 1 | 0 | 1 | 0 | 0 | 1 | 1 |
| 21 | 0 | 0 | 1 | 1 | 1 | 0 | 1 | 0 | 1 | 0 | 0 | 1 | 0 | 0 | 1 | 1 |
| 22 | 0 | 0 | 1 | 1 | 1 | 1 | 0 | 0 | 1 | 0 | 0 | 1 | 0 | 1 | 0 | 1 |
| 23 | 0 | 0 | 1 | 1 | 1 | 1 | 0 | 0 | 1 | 0 | 1 | 0 | 1 | 0 | 0 | 1 |
| 24 | 0 | 0 | 1 | 1 | 1 | 1 | 0 | 0 | 1 | 1 | 0 | 1 | 0 | 1 | 0 | 0 |
| 25 | 0 | 0 | 1 | 1 | 1 | 1 | 0 | 1 | 0 | 1 | 0 | 0 | 1 | 0 | 0 | 1 |
| 26 | 0 | 0 | 1 | 1 | 1 | 1 | 0 | 1 | 0 | 1 | 0 | 0 | 1 | 1 | 0 | 0 |
| 27 | 0 | 0 | 1 | 1 | 1 | 1 | 0 | 1 | 0 | 1 | 1 | 0 | 0 | 1 | 0 | 0 |
| 28 | 0 | 0 | 1 | 1 | 1 | 1 | 1 | 0 | 0 | 0 | 1 | 0 | 1 | 0 | 0 | 1 |
| 29 | 0 | 0 | 1 | 1 | 1 | 1 | 1 | 0 | 0 | 1 | 0 | 0 | 1 | 0 | 1 | 0 |
| 30 | 0 | 0 | 1 | 1 | 1 | 1 | 1 | 0 | 1 | 0 | 0 | 0 | 1 | 1 | 0 | 0 |
| 31 | 0 | 0 | 1 | 1 | 1 | 1 | 1 | 1 | 0 | 0 | 0 | 1 | 0 | 1 | 0 | 0 |
| 32 | 0 | 1 | 0 | 0 | 1 | 1 | 0 | 0 | 0 | 1 | 1 | 1 | 1 | 0 | 1 | 0 |
| 33 | 0 | 1 | 0 | 1 | 0 | 0 | 1 | 0 | 0 | 1 | 1 | 1 | 1 | 1 | 0 | 0 |
| 34 | 0 | 1 | 0 | 1 | 0 | 0 | 1 | 1 | 1 | 1 | 0 | 0 | 1 | 0 | 0 | 1 |
| 35 | 0 | 1 | 0 | 1 | 0 | 1 | 1 | 0 | 0 | 0 | 0 | 1 | 1 | 0 | 1 | 1 |
| 36 | 0 | 1 | 0 | 1 | 0 | 1 | 1 | 0 | 1 | 1 | 0 | 0 | 0 | 1 | 1 | 1 |
| 37 | 0 | 1 | 0 | 1 | 1 | 1 | 1 | 0 | 0 | 0 | 0 | 1 | 1 | 0 | 0 | 1 |
| 38 | 0 | 1 | 0 | 1 | 1 | 1 | 1 | 0 | 0 | 0 | 1 | 1 | 0 | 0 | 1 | 0 |
| 39 | 0 | 1 | 0 | 1 | 1 | 1 | 1 | 1 | 0 | 0 | 0 | 0 | 1 | 1 | 0 | 0 |
| 40 | 0 | 1 | 1 | 0 | 0 | 0 | 0 | 0 | 1 | 1 | 1 | 1 | 1 | 0 | 1 | 1 |
| 41 | 0 | 1 | 1 | 0 | 0 | 0 | 0 | 1 | 0 | 1 | 1 | 1 | 0 | 1 | 1 | 0 |
| 42 | 0 | 1 | 1 | 0 | 0 | 0 | 0 | 1 | 1 | 0 | 1 | 0 | 1 | 0 | 1 | 1 |
| 43 | 0 | 1 | 1 | 0 | 0 | 1 | 1 | 1 | 1 | 0 | 0 | 0 | 0 | 1 | 0 | 1 |
| 44 | 0 | 1 | 1 | 0 | 1 | 0 | 1 | 0 | 1 | 1 | 0 | 0 | 0 | 0 | 1 | 1 |
| 45 | 0 | 1 | 1 | 0 | 1 | 0 | 1 | 1 | 1 | 0 | 0 | 0 | 0 | 1 | 1 | 1 |
| 46 | 0 | 1 | 1 | 0 | 1 | 1 | 0 | 0 | 0 | 1 | 0 | 1 | 0 | 1 | 1 | 1 |
| 47 | 0 | 1 | 1 | 0 | 1 | 1 | 0 | 0 | 0 | 1 | 1 | 0 | 1 | 0 | 0 | 1 |
| 48 | 0 | 1 | 1 | 0 | 1 | 1 | 0 | 1 | 0 | 1 | 0 | 0 | 0 | 0 | 1 | 1 |
| 49 | 0 | 1 | 1 | 0 | 1 | 1 | 1 | 0 | 1 | 0 | 0 | 0 | 1 | 1 | 0 | 0 |
| 50 | 0 | 1 | 1 | 0 | 1 | 1 | 1 | 1 | 0 | 0 | 0 | 0 | 1 | 1 | 0 | 0 |
| 51 | 1 | 0 | 0 | 1 | 0 | 0 | 0 | 0 | 1 | 1 | 1 | 1 | 1 | 0 | 0 | 1 |
| 52 | 1 | 0 | 0 | 1 | 0 | 0 | 0 | 1 | 0 | 1 | 1 | 1 | 1 | 0 | 0 | 1 |
| 53 | 1 | 0 | 0 | 1 | 0 | 0 | 1 | 0 | 1 | 0 | 1 | 1 | 1 | 0 | 0 | 0 |
| 54 | 1 | 0 | 0 | 1 | 0 | 0 | 1 | 1 | 1 | 1 | 0 | 0 | 1 | 0 | 1 | 0 |
| 55 | 1 | 0 | 0 | 1 | 0 | 0 | 1 | 1 | 1 | 1 | 0 | 1 | 0 | 1 | 0 | 0 |
| 56 | 1 | 0 | 0 | 1 | 0 | 1 | 0 | 0 | 0 | 1 | 1 | 1 | 1 | 1 | 0 | 0 |
| 57 | 1 | 0 | 0 | 1 | 0 | 1 | 0 | 1 | 0 | 0 | 1 | 1 | 1 | 1 | 0 | 0 |
| 58 | 1 | 0 | 0 | 1 | 1 | 0 | 0 | 0 | 1 | 1 | 1 | 1 | 0 | 1 | 0 | 0 |
| 59 | 1 | 0 | 0 | 1 | 1 | 1 | 1 | 0 | 0 | 1 | 0 | 1 | 0 | 1 | 0 | 0 |
| 60 | 1 | 0 | 0 | 1 | 1 | 1 | 1 | 0 | 1 | 0 | 0 | 0 | 1 | 0 | 0 | 1 |
| 61 | 1 | 0 | 0 | 1 | 1 | 1 | 1 | 1 | 0 | 0 | 0 | 0 | 1 | 0 | 0 | 1 |
| 62 | 1 | 0 | 1 | 0 | 0 | 0 | 0 | 1 | 1 | 1 | 1 | 0 | 0 | 1 | 1 | 1 |
| 63 | 1 | 0 | 1 | 0 | 0 | 0 | 0 | 1 | 1 | 1 | 0 | 0 | 1 | 1 | 0 | 1 |
| 64 | 1 | 0 | 1 | 0 | 0 | 0 | 0 | 1 | 1 | 1 | 1 | 0 | 0 | 1 | 1 | 0 |
| 65 | 1 | 0 | 1 | 0 | 0 | 1 | 0 | 1 | 0 | 0 | 1 | 1 | 1 | 0 | 0 | 0 |
| 66 | 1 | 0 | 1 | 0 | 1 | 0 | 0 | 1 | 1 | 1 | 0 | 0 | 0 | 1 | 0 | 0 |
| 67 | 1 | 0 | 1 | 0 | 1 | 1 | 0 | 0 | 0 | 0 | 1 | 1 | 0 | 1 | 1 | 0 |
| 68 | 1 | 0 | 1 | 0 | 1 | 1 | 0 | 1 | 0 | 0 | 0 | 0 | 0 | 1 | 1 | 1 |
| 69 | 1 | 0 | 1 | 1 | 0 | 0 | 1 | 1 | 1 | 0 | 0 | 0 | 0 | 1 | 0 | 1 |
| 70 | 1 | 1 | 0 | 0 | 0 | 0 | 0 | 1 | 1 | 1 | 0 | 1 | 0 | 1 | 1 | 1 |
| 71 | 1 | 1 | 0 | 0 | 0 | 0 | 1 | 0 | 1 | 1 | 1 | 0 | 0 | 1 | 1 | 1 |
| 72 | 1 | 1 | 0 | 0 | 0 | 0 | 1 | 1 | 0 | 1 | 1 | 0 | 1 | 0 | 1 | 0 |
| 73 | 1 | 1 | 0 | 0 | 0 | 0 | 1 | 1 | 1 | 0 | 1 | 0 | 1 | 1 | 0 | 0 |
| 74 | 1 | 1 | 0 | 0 | 0 | 0 | 1 | 0 | 0 | 0 | 1 | 1 | 0 | 1 | 1 | 1 |
| 75 | 1 | 1 | 0 | 0 | 0 | 0 | 1 | 0 | 1 | 0 | 1 | 0 | 0 | 1 | 1 | 1 |
| 76 | 1 | 1 | 0 | 0 | 0 | 0 | 1 | 0 | 1 | 0 | 1 | 0 | 1 | 1 | 1 | 0 |
| 77 | 1 | 1 | 0 | 0 | 0 | 0 | 1 | 1 | 0 | 0 | 1 | 0 | 1 | 1 | 0 | 1 |
| 78 | 1 | 1 | 0 | 0 | 0 | 0 | 1 | 1 | 0 | 1 | 0 | 0 | 1 | 1 | 1 | 0 |
| 79 | 1 | 1 | 0 | 0 | 0 | 1 | 1 | 0 | 1 | 1 | 0 | 1 | 0 | 1 | 0 | 0 |
| 80 | 1 | 1 | 0 | 0 | 0 | 1 | 0 | 1 | 0 | 1 | 1 | 0 | 1 | 1 | 0 | 0 |
| 81 | 1 | 1 | 0 | 0 | 0 | 1 | 0 | 1 | 1 | 0 | 1 | 0 | 1 | 1 | 0 | 0 |
| 82 | 1 | 1 | 0 | 0 | 0 | 1 | 1 | 0 | 1 | 0 | 0 | 0 | 1 | 0 | 1 | 1 |

TABLE 2-continued

| Number of a sequence | S(n) sequence body of 16 bits | | | | | | | | | | | | | | | |
|---|---|---|---|---|---|---|---|---|---|---|---|---|---|---|---|---|
| 83 | 1 | 1 | 0 | 0 | 1 | 0 | 0 | 1 | 0 | 1 | 0 | 0 | 0 | 1 | 1 | 1 |
| 84 | 1 | 1 | 0 | 0 | 1 | 0 | 0 | 1 | 0 | 1 | 0 | 1 | 1 | 1 | 0 | 0 |
| 85 | 1 | 1 | 0 | 0 | 1 | 0 | 1 | 0 | 0 | 1 | 0 | 0 | 0 | 1 | 1 | 1 |
| 86 | 1 | 1 | 0 | 0 | 1 | 0 | 1 | 0 | 0 | 1 | 0 | 1 | 1 | 1 | 0 | 0 |
| 87 | 1 | 1 | 0 | 0 | 1 | 1 | 0 | 1 | 0 | 1 | 0 | 0 | 0 | 0 | 1 | 1 |
| 88 | 1 | 1 | 0 | 0 | 1 | 1 | 0 | 1 | 1 | 0 | 1 | 0 | 1 | 0 | 0 | 0 |
| 89 | 1 | 1 | 0 | 0 | 1 | 1 | 1 | 0 | 1 | 0 | 0 | 0 | 0 | 0 | 1 | 1 |
| 90 | 1 | 1 | 0 | 0 | 1 | 1 | 1 | 1 | 0 | 0 | 0 | 0 | 0 | 1 | 0 | 1 |
| 91 | 1 | 1 | 0 | 1 | 0 | 0 | 0 | 1 | 0 | 1 | 1 | 0 | 0 | 0 | 1 | 1 |
| 92 | 1 | 1 | 0 | 1 | 0 | 1 | 0 | 0 | 0 | 0 | 1 | 1 | 0 | 1 | 1 | 0 |
| 93 | 1 | 1 | 0 | 1 | 0 | 1 | 0 | 0 | 1 | 1 | 0 | 0 | 0 | 0 | 1 | 1 |
| 94 | 1 | 1 | 0 | 1 | 0 | 1 | 0 | 1 | 1 | 0 | 0 | 0 | 0 | 1 | 1 | 0 |
| 95 | 1 | 1 | 0 | 1 | 0 | 1 | 1 | 1 | 0 | 0 | 0 | 0 | 0 | 0 | 1 | 1 |
| 96 | 1 | 1 | 0 | 1 | 1 | 0 | 0 | 0 | 0 | 1 | 1 | 0 | 1 | 0 | 1 | 0 |
| 97 | 1 | 1 | 0 | 1 | 1 | 0 | 0 | 1 | 0 | 1 | 0 | 0 | 0 | 0 | 1 | 1 |
| 98 | 1 | 1 | 1 | 0 | 0 | 0 | 1 | 0 | 0 | 1 | 0 | 1 | 0 | 0 | 1 | 1 |
| 99 | 1 | 1 | 1 | 0 | 0 | 0 | 1 | 0 | 1 | 0 | 0 | 1 | 0 | 0 | 1 | 1 |
| 100 | 1 | 1 | 1 | 0 | 1 | 0 | 1 | 0 | 0 | 1 | 0 | 0 | 1 | 1 | 0 | 0 |

Correspondingly, Table 2a provides sequences T that are in a one-to-one correspondence with the sequences S in Table 2.

TABLE 2a

| Number of a sequence | T(n) sequence | | | | | | | | | | | | | | | |
|---|---|---|---|---|---|---|---|---|---|---|---|---|---|---|---|---|
| 1 | -1 | -1 | -1 | 1 | -1 | 1 | -1 | 1 | 1 | -1 | 1 | 1 | -1 | -1 | 1 | 1 |
| 2 | -1 | -1 | -1 | 1 | 1 | 1 | -1 | 1 | -1 | 1 | 1 | -1 | 1 | 1 | -1 | -1 |
| 3 | -1 | -1 | -1 | 1 | 1 | 1 | -1 | 1 | 1 | -1 | 1 | -1 | 1 | 1 | -1 | -1 |
| 4 | -1 | -1 | 1 | -1 | -1 | 1 | 1 | -1 | 1 | -1 | 1 | 1 | 1 | 1 | -1 | -1 |
| 5 | -1 | -1 | 1 | -1 | -1 | 1 | 1 | 1 | 1 | -1 | -1 | 1 | -1 | 1 | -1 | 1 |
| 6 | -1 | -1 | 1 | -1 | 1 | -1 | -1 | -1 | 1 | 1 | 1 | 1 | 1 | 1 | -1 | -1 |
| 7 | -1 | -1 | 1 | -1 | 1 | -1 | 1 | -1 | -1 | 1 | 1 | 1 | 1 | -1 | -1 | -1 |
| 8 | -1 | -1 | 1 | -1 | 1 | -1 | 1 | 1 | -1 | -1 | 1 | 1 | 1 | 1 | -1 | -1 |
| 9 | -1 | -1 | 1 | -1 | 1 | -1 | 1 | 1 | 1 | -1 | -1 | 1 | -1 | -1 | -1 | 1 |
| 10 | -1 | -1 | 1 | -1 | 1 | 1 | 1 | 1 | -1 | 1 | -1 | 1 | 1 | 1 | -1 | 1 |
| 11 | -1 | -1 | 1 | 1 | -1 | -1 | -1 | 1 | 1 | 1 | 1 | 1 | -1 | 1 | -1 | 1 |
| 12 | -1 | -1 | 1 | 1 | -1 | -1 | 1 | -1 | 1 | 1 | 1 | 1 | 1 | -1 | -1 | -1 |
| 13 | -1 | -1 | 1 | 1 | -1 | 1 | -1 | -1 | 1 | -1 | 1 | -1 | 1 | 1 | 1 | 1 |
| 14 | -1 | -1 | 1 | 1 | -1 | 1 | -1 | 1 | 1 | -1 | 1 | 1 | 1 | 1 | -1 | -1 |
| 15 | -1 | -1 | 1 | 1 | -1 | 1 | -1 | 1 | 1 | -1 | -1 | -1 | -1 | 1 | 1 | 1 |
| 16 | -1 | -1 | 1 | 1 | -1 | 1 | -1 | 1 | -1 | 1 | 1 | 1 | -1 | -1 | -1 | -1 |
| 17 | -1 | -1 | 1 | 1 | -1 | 1 | 1 | -1 | 1 | -1 | 1 | -1 | -1 | -1 | 1 | 1 |
| 18 | -1 | -1 | 1 | 1 | -1 | 1 | 1 | 1 | -1 | 1 | -1 | 1 | 1 | -1 | -1 | -1 |
| 19 | -1 | -1 | 1 | 1 | 1 | 1 | -1 | -1 | -1 | 1 | 1 | 1 | 1 | -1 | -1 | -1 |
| 20 | -1 | -1 | 1 | 1 | -1 | 1 | -1 | -1 | 1 | -1 | 1 | -1 | 1 | -1 | 1 | 1 |
| 21 | -1 | -1 | 1 | 1 | 1 | -1 | 1 | -1 | 1 | -1 | 1 | -1 | 1 | -1 | 1 | 1 |
| 22 | -1 | -1 | 1 | 1 | 1 | -1 | 1 | -1 | 1 | -1 | -1 | 1 | -1 | 1 | -1 | 1 |
| 23 | -1 | -1 | 1 | 1 | 1 | 1 | 1 | -1 | 1 | -1 | 1 | -1 | 1 | -1 | 1 | 1 |
| 24 | -1 | -1 | 1 | 1 | 1 | 1 | -1 | -1 | 1 | 1 | -1 | 1 | -1 | 1 | -1 | -1 |
| 25 | -1 | -1 | 1 | 1 | 1 | 1 | -1 | 1 | -1 | 1 | -1 | -1 | 1 | -1 | -1 | 1 |
| 26 | -1 | -1 | 1 | 1 | 1 | 1 | -1 | 1 | -1 | 1 | -1 | 1 | 1 | -1 | -1 | -1 |
| 27 | -1 | -1 | 1 | 1 | 1 | 1 | -1 | 1 | 1 | -1 | 1 | 1 | -1 | 1 | -1 | -1 |
| 28 | -1 | -1 | 1 | 1 | 1 | 1 | 1 | -1 | -1 | -1 | 1 | -1 | 1 | -1 | -1 | 1 |
| 29 | -1 | -1 | 1 | 1 | 1 | 1 | 1 | -1 | 1 | -1 | -1 | 1 | 1 | -1 | 1 | -1 |
| 30 | -1 | -1 | 1 | 1 | 1 | 1 | 1 | -1 | 1 | -1 | -1 | 1 | 1 | -1 | -1 | -1 |
| 31 | -1 | -1 | 1 | 1 | 1 | 1 | 1 | 1 | -1 | -1 | 1 | -1 | 1 | -1 | 1 | -1 |
| 32 | -1 | 1 | -1 | -1 | 1 | 1 | -1 | -1 | 1 | 1 | 1 | 1 | -1 | 1 | -1 | 1 |
| 33 | -1 | 1 | -1 | 1 | -1 | -1 | 1 | -1 | -1 | 1 | 1 | 1 | 1 | 1 | -1 | -1 |
| 34 | -1 | 1 | -1 | 1 | -1 | -1 | 1 | 1 | 1 | 1 | -1 | -1 | 1 | -1 | 1 | 1 |
| 35 | -1 | 1 | -1 | 1 | -1 | 1 | 1 | 1 | -1 | -1 | 1 | 1 | 1 | -1 | 1 | -1 |
| 36 | -1 | 1 | -1 | 1 | -1 | 1 | 1 | -1 | 1 | 1 | -1 | -1 | -1 | 1 | 1 | 1 |
| 37 | -1 | 1 | -1 | 1 | 1 | 1 | -1 | -1 | -1 | 1 | 1 | 1 | 1 | -1 | -1 | 1 |
| 38 | -1 | 1 | -1 | 1 | 1 | 1 | -1 | -1 | -1 | 1 | 1 | -1 | -1 | 1 | 1 | -1 |
| 39 | -1 | 1 | -1 | 1 | 1 | 1 | 1 | -1 | -1 | -1 | -1 | 1 | 1 | -1 | 1 | -1 |
| 40 | -1 | 1 | 1 | -1 | -1 | -1 | 1 | -1 | 1 | 1 | 1 | 1 | 1 | 1 | -1 | -1 |
| 41 | -1 | 1 | 1 | -1 | -1 | -1 | 1 | -1 | 1 | 1 | 1 | -1 | 1 | 1 | -1 | -1 |
| 42 | -1 | 1 | 1 | -1 | -1 | -1 | 1 | 1 | -1 | 1 | -1 | 1 | -1 | 1 | 1 | 1 |
| 43 | -1 | 1 | 1 | -1 | -1 | 1 | 1 | 1 | -1 | -1 | -1 | -1 | 1 | -1 | 1 | 1 |
| 44 | -1 | 1 | 1 | -1 | 1 | -1 | 1 | 1 | -1 | 1 | -1 | -1 | -1 | 1 | 1 | 1 |
| 45 | -1 | 1 | 1 | -1 | 1 | 1 | 1 | 1 | -1 | -1 | -1 | -1 | -1 | 1 | 1 | 1 |
| 46 | -1 | 1 | 1 | -1 | 1 | 1 | -1 | -1 | -1 | 1 | 1 | 1 | -1 | 1 | 1 | 1 |

TABLE 2a-continued

| Number of a sequence | T(n) sequence |
|---|---|
| 47 | -1  1  1 -1  1  1 -1 -1 -1 -1  1  1 -1  1 -1  1 |
| 48 | -1  1  1 -1  1  1 -1  1 -1  1 -1 -1 -1 -1  1  1 |
| 49 | -1  1  1 -1  1  1  1 -1  1 -1 -1 -1 -1  1  1 -1 |
| 50 | -1  1  1 -1  1  1  1  1 -1 -1 -1 -1 -1  1  1 -1 |
| 51 |  1 -1 -1  1 -1 -1 -1 -1  1  1  1  1  1 -1 -1  1 |
| 52 |  1 -1 -1  1 -1 -1 -1  1 -1  1  1  1  1  1 -1  1 |
| 53 |  1 -1 -1  1 -1 -1  1 -1  1 -1  1  1  1  1 -1 -1 |
| 54 |  1 -1 -1  1 -1 -1  1  1  1  1 -1 -1  1 -1  1 -1 |
| 55 |  1 -1 -1  1 -1 -1  1  1  1  1 -1  1 -1  1 -1 -1 |
| 56 |  1 -1 -1  1 -1  1 -1 -1 -1  1  1  1  1  1 -1  1 |
| 57 |  1 -1 -1  1 -1  1 -1  1 -1 -1  1  1  1  1 -1 -1 |
| 58 |  1 -1 -1  1  1 -1 -1 -1  1  1  1  1 -1  1 -1  1 |
| 59 |  1 -1 -1  1  1  1  1 -1 -1  1 -1  1 -1  1 -1 -1 |
| 60 |  1 -1 -1  1  1  1  1 -1  1 -1  1 -1 -1  1 -1 -1 |
| 61 |  1 -1 -1  1  1  1  1 -1 -1 -1 -1  1 -1 -1  1  1 |
| 62 |  1 -1  1 -1 -1 -1 -1 -1  1  1  1  1 -1 -1  1  1 |
| 63 |  1 -1  1 -1 -1 -1 -1  1  1  1  1 -1 -1  1  1 -1 |
| 64 |  1 -1  1 -1 -1 -1  1  1  1  1  1 -1 -1  1  1 -1 |
| 65 |  1 -1  1 -1 -1  1 -1 -1 -1  1  1  1  1  1 -1 -1 |
| 66 |  1 -1  1 -1  1 -1 -1  1  1  1  1 -1 -1  1 -1 -1 |
| 67 |  1 -1  1 -1  1  1 -1 -1 -1  1  1 -1  1  1 -1  1 |
| 68 |  1 -1  1 -1  1  1  1  1 -1 -1 -1 -1 -1  1  1  1 |
| 69 |  1 -1  1  1 -1 -1  1  1  1 -1 -1 -1  1 -1  1  1 |
| 70 |  1  1 -1 -1 -1 -1 -1 -1  1  1  1 -1  1 -1  1  1 |
| 71 |  1  1 -1 -1 -1 -1 -1  1 -1  1  1  1 -1 -1  1  1 |
| 72 |  1  1 -1 -1 -1 -1  1  1  1  1 -1  1 -1  1 -1  1 |
| 73 |  1  1 -1 -1 -1 -1  1  1  1 -1  1 -1  1  1  1 -1 |
| 74 |  1  1 -1 -1 -1  1 -1 -1  1 -1  1  1 -1  1  1  1 |
| 75 |  1  1 -1 -1 -1  1 -1  1 -1  1 -1  1 -1  1  1  1 |
| 76 |  1  1 -1 -1 -1  1  1  1  1  1 -1  1 -1  1  1 -1 |
| 77 |  1  1 -1 -1 -1  1  1 -1 -1 -1  1 -1  1  1 -1  1 |
| 78 |  1  1 -1 -1 -1  1  1 -1  1 -1  1 -1  1 -1  1 -1 |
| 79 |  1  1 -1 -1 -1  1  1 -1  1 -1  1 -1  1 -1  1 -1 |
| 80 |  1  1 -1 -1 -1  1 -1  1 -1  1 -1  1  1  1 -1 -1 |
| 81 |  1  1 -1 -1 -1 -1  1 -1  1 -1  1 -1  1  1 -1 -1 |
| 82 |  1  1 -1 -1 -1  1  1 -1  1 -1 -1  1 -1  1  1  1 |
| 83 |  1  1 -1 -1  1 -1 -1  1 -1  1 -1 -1 -1  1  1  1 |
| 84 |  1  1 -1 -1  1 -1 -1  1 -1  1 -1  1  1  1 -1 -1 |
| 85 |  1  1 -1 -1  1 -1  1 -1 -1  1 -1 -1 -1  1  1  1 |
| 86 |  1  1 -1 -1  1 -1  1 -1  1 -1  1  1  1 -1 -1  1 |
| 87 |  1  1 -1 -1  1  1 -1  1 -1  1 -1 -1 -1 -1  1  1 |
| 88 |  1  1 -1 -1  1  1 -1  1 -1  1 -1  1 -1 -1  1 -1 |
| 89 |  1  1 -1 -1  1  1 -1  1  1 -1 -1 -1 -1  1  1  1 |
| 90 |  1  1 -1 -1  1  1  1  1 -1 -1 -1 -1 -1  1 -1  1 |
| 91 |  1  1 -1  1 -1 -1 -1  1 -1  1  1 -1 -1 -1  1  1 |
| 92 |  1  1 -1  1 -1  1 -1 -1 -1 -1  1  1 -1  1  1 -1 |
| 93 |  1  1 -1  1 -1  1 -1 -1  1  1 -1 -1 -1 -1  1  1 |
| 94 |  1  1 -1  1 -1  1  1 -1  1 -1 -1 -1 -1  1  1 -1 |
| 95 |  1  1 -1  1 -1  1  1  1 -1 -1 -1 -1 -1 -1  1  1 |
| 96 |  1  1 -1  1  1 -1 -1 -1 -1  1 -1  1 -1  1  1 -1 |
| 97 |  1  1 -1  1  1 -1  1  1 -1 -1 -1 -1 -1 -1  1  1 |
| 98 |  1  1  1 -1 -1 -1  1 -1 -1  1 -1  1 -1 -1  1  1 |
| 99 |  1  1  1 -1 -1 -1  1 -1  1 -1 -1  1 -1 -1  1  1 |
| 100|  1  1  1 -1  1 -1  1 -1 -1  1 -1 -1  1  1 -1 -1 |

Correspondingly, Table 2b provides sequences M that are in a one-to-one correspondence with the sequences S in Table 2. Optionally, the first sequence may also be formed by repeating any sequence in Table 2b by N times. In this case, the second sequence M corresponding to the first sequence still needs to be in a bit logical inversion relationship with the first sequence; or the sequence M is a sequence in Table 2 corresponding to that in Table 2b.

TABLE 2b

| Number of a sequence | M(n) body sequence |
|---|---|
| 1 | 1 1 1 0 1 0 1 0 0 1 0 0 1 1 0 0 |
| 2 | 1 1 1 0 0 0 1 0 1 0 0 1 0 0 1 1 |
| 3 | 1 1 1 0 0 0 1 0 0 1 0 1 0 0 1 1 |
| 4 | 1 1 0 1 1 0 0 1 0 1 0 0 0 1 1 |
| 5 | 1 1 0 1 1 0 0 0 0 1 1 0 1 0 1 0 |
| 6 | 1 1 0 1 0 1 1 1 0 0 0 0 0 0 1 1 |
| 7 | 1 1 0 1 0 1 0 1 1 0 0 0 0 1 1 0 |
| 8 | 1 1 0 1 0 1 0 0 1 1 0 0 0 0 1 1 |
| 9 | 1 1 0 1 0 1 0 0 0 0 1 1 0 1 1 0 |

TABLE 2b-continued

| Number of a sequence | M(n) body sequence | | | | | | | | | | | | | | |
|---|---|---|---|---|---|---|---|---|---|---|---|---|---|---|---|
| 10 | 1 | 1 | 0 | 1 | 0 | 0 | 0 | 1 | 0 | 1 | 1 | 0 | 0 | 0 | 1 | 1 |
| 11 | 1 | 1 | 0 | 0 | 1 | 1 | 1 | 1 | 0 | 0 | 0 | 0 | 0 | 1 | 0 | 1 |
| 12 | 1 | 1 | 0 | 0 | 1 | 1 | 1 | 0 | 1 | 0 | 0 | 0 | 0 | 0 | 1 | 1 |
| 13 | 1 | 1 | 0 | 0 | 1 | 1 | 0 | 1 | 1 | 0 | 1 | 0 | 1 | 0 | 0 | 0 |
| 14 | 1 | 1 | 0 | 0 | 1 | 1 | 0 | 1 | 0 | 1 | 0 | 0 | 0 | 0 | 1 | 1 |
| 15 | 1 | 1 | 0 | 0 | 1 | 0 | 1 | 0 | 0 | 1 | 0 | 1 | 1 | 1 | 0 | 0 |
| 16 | 1 | 1 | 0 | 0 | 1 | 0 | 1 | 0 | 0 | 1 | 0 | 0 | 0 | 1 | 1 | 1 |
| 17 | 1 | 1 | 0 | 0 | 1 | 0 | 0 | 1 | 0 | 1 | 0 | 1 | 1 | 1 | 0 | 0 |
| 18 | 1 | 1 | 0 | 0 | 1 | 0 | 0 | 1 | 0 | 1 | 0 | 0 | 0 | 1 | 1 | 1 |
| 19 | 1 | 1 | 0 | 0 | 0 | 1 | 1 | 0 | 1 | 0 | 0 | 0 | 1 | 0 | 1 | 1 |
| 20 | 1 | 1 | 0 | 0 | 0 | 1 | 0 | 1 | 1 | 0 | 1 | 0 | 1 | 1 | 0 | 0 |
| 21 | 1 | 1 | 0 | 0 | 0 | 1 | 0 | 1 | 0 | 1 | 1 | 0 | 1 | 1 | 0 | 0 |
| 22 | 1 | 1 | 0 | 0 | 0 | 0 | 1 | 1 | 0 | 1 | 1 | 0 | 1 | 0 | 1 | 0 |
| 23 | 1 | 1 | 0 | 0 | 0 | 0 | 1 | 1 | 0 | 1 | 0 | 1 | 0 | 1 | 1 | 0 |
| 24 | 1 | 1 | 0 | 0 | 0 | 0 | 1 | 1 | 0 | 0 | 1 | 0 | 1 | 0 | 1 | 1 |
| 25 | 1 | 1 | 0 | 0 | 0 | 0 | 1 | 0 | 1 | 0 | 1 | 1 | 0 | 1 | 1 | 0 |
| 26 | 1 | 1 | 0 | 0 | 0 | 0 | 1 | 0 | 1 | 0 | 1 | 1 | 0 | 0 | 1 | 1 |
| 27 | 1 | 1 | 0 | 0 | 0 | 0 | 1 | 0 | 1 | 0 | 0 | 1 | 1 | 0 | 1 | 1 |
| 28 | 1 | 1 | 0 | 0 | 0 | 0 | 0 | 1 | 1 | 1 | 0 | 1 | 0 | 1 | 1 | 0 |
| 29 | 1 | 1 | 0 | 0 | 0 | 0 | 0 | 1 | 1 | 0 | 1 | 1 | 0 | 1 | 0 | 1 |
| 30 | 1 | 1 | 0 | 0 | 0 | 0 | 0 | 1 | 0 | 1 | 1 | 1 | 0 | 0 | 1 | 1 |
| 31 | 1 | 1 | 0 | 0 | 0 | 0 | 0 | 0 | 1 | 1 | 1 | 0 | 1 | 0 | 1 | 1 |
| 32 | 1 | 0 | 1 | 1 | 0 | 0 | 1 | 1 | 1 | 0 | 0 | 0 | 0 | 1 | 0 | 1 |
| 33 | 1 | 0 | 1 | 0 | 1 | 1 | 0 | 1 | 1 | 0 | 0 | 0 | 0 | 0 | 1 | 1 |
| 34 | 1 | 0 | 1 | 0 | 1 | 1 | 0 | 0 | 0 | 0 | 1 | 1 | 0 | 1 | 1 | 0 |
| 35 | 1 | 0 | 1 | 0 | 1 | 0 | 0 | 0 | 1 | 1 | 1 | 0 | 0 | 1 | 0 | 0 |
| 36 | 1 | 0 | 1 | 0 | 1 | 0 | 0 | 1 | 0 | 0 | 1 | 1 | 1 | 1 | 0 | 0 |
| 37 | 1 | 0 | 1 | 0 | 0 | 0 | 0 | 1 | 1 | 1 | 1 | 0 | 0 | 1 | 1 | 0 |
| 38 | 1 | 0 | 1 | 0 | 0 | 0 | 0 | 1 | 1 | 1 | 0 | 0 | 1 | 1 | 0 | 1 |
| 39 | 1 | 0 | 1 | 0 | 0 | 0 | 0 | 0 | 1 | 1 | 1 | 1 | 0 | 0 | 1 | 1 |
| 40 | 1 | 0 | 0 | 1 | 1 | 1 | 1 | 1 | 0 | 0 | 0 | 0 | 1 | 0 | 0 | 0 |
| 41 | 1 | 0 | 0 | 1 | 1 | 1 | 1 | 0 | 1 | 0 | 0 | 0 | 1 | 0 | 0 | 1 |
| 42 | 1 | 0 | 0 | 1 | 1 | 1 | 1 | 0 | 0 | 1 | 0 | 1 | 0 | 1 | 0 | 0 |
| 43 | 1 | 0 | 0 | 1 | 1 | 0 | 0 | 0 | 1 | 1 | 1 | 1 | 0 | 1 | 0 | 0 |
| 44 | 1 | 0 | 0 | 1 | 0 | 1 | 0 | 1 | 0 | 0 | 1 | 1 | 1 | 1 | 0 | 0 |
| 45 | 1 | 0 | 0 | 1 | 0 | 1 | 0 | 0 | 0 | 1 | 1 | 1 | 1 | 1 | 0 | 0 |
| 46 | 1 | 0 | 0 | 1 | 0 | 0 | 1 | 1 | 1 | 1 | 0 | 1 | 0 | 1 | 0 | 0 |
| 47 | 1 | 0 | 0 | 1 | 0 | 0 | 1 | 1 | 1 | 1 | 0 | 0 | 1 | 0 | 1 | 0 |
| 48 | 1 | 0 | 0 | 1 | 0 | 0 | 1 | 0 | 1 | 0 | 1 | 1 | 1 | 1 | 0 | 0 |
| 49 | 1 | 0 | 0 | 1 | 0 | 0 | 0 | 1 | 0 | 1 | 1 | 1 | 1 | 0 | 0 | 1 |
| 50 | 1 | 0 | 0 | 1 | 0 | 0 | 0 | 0 | 1 | 1 | 1 | 1 | 1 | 0 | 0 | 1 |
| 51 | 0 | 1 | 1 | 0 | 1 | 1 | 1 | 1 | 0 | 0 | 0 | 0 | 0 | 1 | 1 | 0 |
| 52 | 0 | 1 | 1 | 0 | 1 | 1 | 1 | 0 | 1 | 0 | 0 | 0 | 0 | 1 | 1 | 0 |
| 53 | 0 | 1 | 1 | 0 | 1 | 1 | 0 | 1 | 0 | 1 | 0 | 0 | 0 | 0 | 1 | 1 |
| 54 | 0 | 1 | 1 | 0 | 1 | 1 | 0 | 0 | 0 | 0 | 1 | 1 | 0 | 1 | 0 | 1 |
| 55 | 0 | 1 | 1 | 0 | 1 | 1 | 0 | 0 | 0 | 0 | 1 | 0 | 1 | 0 | 1 | 1 |
| 56 | 0 | 1 | 1 | 0 | 1 | 0 | 1 | 1 | 1 | 0 | 0 | 0 | 0 | 0 | 1 | 1 |
| 57 | 0 | 1 | 1 | 0 | 1 | 0 | 1 | 0 | 1 | 1 | 0 | 0 | 0 | 1 | 1 | 1 |
| 58 | 0 | 1 | 1 | 0 | 0 | 1 | 1 | 1 | 1 | 0 | 0 | 0 | 0 | 1 | 0 | 1 |
| 59 | 0 | 1 | 1 | 0 | 0 | 0 | 0 | 1 | 1 | 0 | 1 | 0 | 1 | 0 | 1 | 1 |
| 60 | 0 | 1 | 1 | 0 | 0 | 0 | 0 | 1 | 0 | 1 | 1 | 1 | 0 | 1 | 1 | 0 |
| 61 | 0 | 1 | 1 | 0 | 0 | 0 | 0 | 0 | 1 | 1 | 1 | 1 | 0 | 1 | 1 | 0 |
| 62 | 0 | 1 | 0 | 1 | 1 | 1 | 1 | 1 | 0 | 0 | 0 | 0 | 1 | 1 | 0 | 0 |
| 63 | 0 | 1 | 0 | 1 | 1 | 1 | 1 | 0 | 0 | 0 | 1 | 1 | 0 | 0 | 1 | 0 |
| 64 | 0 | 1 | 0 | 1 | 1 | 1 | 1 | 0 | 0 | 0 | 0 | 1 | 1 | 0 | 0 | 1 |
| 65 | 0 | 1 | 0 | 1 | 0 | 1 | 0 | 1 | 1 | 0 | 0 | 0 | 0 | 1 | 1 | 1 |
| 66 | 0 | 1 | 0 | 1 | 0 | 1 | 1 | 0 | 0 | 0 | 1 | 1 | 0 | 1 | 1 | 1 |
| 67 | 0 | 1 | 0 | 1 | 0 | 0 | 1 | 1 | 1 | 1 | 0 | 0 | 1 | 0 | 0 | 1 |
| 68 | 0 | 1 | 0 | 1 | 0 | 0 | 1 | 0 | 0 | 1 | 1 | 1 | 1 | 1 | 0 | 0 |
| 69 | 0 | 1 | 0 | 1 | 0 | 0 | 0 | 0 | 1 | 1 | 1 | 1 | 1 | 0 | 1 | 0 |
| 70 | 0 | 0 | 1 | 1 | 1 | 1 | 1 | 1 | 0 | 0 | 0 | 1 | 0 | 1 | 0 | 0 |
| 71 | 0 | 0 | 1 | 1 | 1 | 1 | 0 | 1 | 0 | 0 | 0 | 1 | 1 | 0 | 0 | 0 |
| 72 | 0 | 0 | 1 | 1 | 1 | 1 | 1 | 0 | 0 | 0 | 1 | 0 | 0 | 1 | 0 | 0 |
| 73 | 0 | 0 | 1 | 1 | 1 | 1 | 1 | 0 | 0 | 0 | 1 | 0 | 1 | 0 | 0 | 1 |
| 74 | 0 | 0 | 1 | 1 | 1 | 1 | 0 | 1 | 0 | 1 | 1 | 0 | 0 | 1 | 0 | 0 |
| 75 | 0 | 0 | 1 | 1 | 1 | 1 | 0 | 1 | 0 | 1 | 0 | 0 | 1 | 1 | 0 | 0 |
| 76 | 0 | 0 | 1 | 1 | 1 | 1 | 0 | 1 | 0 | 1 | 0 | 0 | 1 | 0 | 0 | 1 |
| 77 | 0 | 0 | 1 | 1 | 1 | 1 | 0 | 0 | 1 | 1 | 0 | 1 | 0 | 1 | 0 | 0 |
| 78 | 0 | 0 | 1 | 1 | 1 | 1 | 0 | 0 | 1 | 0 | 1 | 0 | 1 | 0 | 0 | 1 |
| 79 | 0 | 0 | 1 | 1 | 1 | 1 | 0 | 0 | 1 | 0 | 0 | 1 | 0 | 1 | 0 | 1 |
| 80 | 0 | 0 | 1 | 1 | 1 | 0 | 1 | 0 | 1 | 0 | 0 | 1 | 0 | 0 | 1 | 1 |
| 81 | 0 | 0 | 1 | 1 | 1 | 0 | 1 | 0 | 0 | 1 | 1 | 0 | 1 | 0 | 0 | 1 |
| 82 | 0 | 0 | 1 | 1 | 1 | 0 | 0 | 1 | 0 | 1 | 1 | 1 | 0 | 1 | 0 | 0 |
| 83 | 0 | 0 | 1 | 1 | 0 | 1 | 1 | 0 | 1 | 0 | 1 | 1 | 0 | 0 | 0 | 1 |
| 84 | 0 | 0 | 1 | 1 | 0 | 1 | 1 | 0 | 1 | 0 | 1 | 0 | 0 | 0 | 1 | 1 |
| 85 | 0 | 0 | 1 | 1 | 0 | 1 | 0 | 1 | 1 | 0 | 1 | 1 | 1 | 0 | 0 | 0 |
| 86 | 0 | 0 | 1 | 1 | 0 | 1 | 0 | 1 | 1 | 0 | 1 | 0 | 0 | 0 | 1 | 1 |

TABLE 2b-continued

| Number of a sequence | M(n) body sequence |
|---|---|
| 87 | 0 0 1 1 0 0 1 0 1 0 1 1 1 1 0 0 |
| 88 | 0 0 1 1 0 0 1 0 0 1 0 1 0 1 1 1 |
| 89 | 0 0 1 1 0 0 0 1 0 1 1 1 1 1 0 0 |
| 90 | 0 0 1 1 0 0 0 0 1 1 1 1 1 0 1 0 |
| 91 | 0 0 1 0 1 1 1 0 1 0 0 1 1 1 0 0 |
| 92 | 0 0 1 0 1 0 1 1 1 1 0 0 1 0 0 1 |
| 93 | 0 0 1 0 1 0 1 1 0 0 1 1 1 1 0 0 |
| 94 | 0 0 1 0 1 0 1 0 0 1 1 1 1 0 0 1 |
| 95 | 0 0 1 0 1 0 0 0 1 1 1 1 1 1 0 0 |
| 96 | 0 0 1 0 0 1 1 1 1 0 0 1 0 1 0 1 |
| 97 | 0 0 1 0 0 1 1 0 1 0 1 1 1 1 0 0 |
| 98 | 0 0 0 1 1 1 0 1 1 0 1 0 1 1 0 0 |
| 99 | 0 0 0 1 1 1 0 1 0 1 1 0 1 1 0 0 |
| 100 | 0 0 0 1 0 1 0 1 1 0 1 1 0 0 1 1 |

Table 2c includes sequences having a relatively small quantity of consecutive 0 or 1 in Table 2. The first sequence and the second sequence can be both optimized to include no excessively long blank energy transmission period, to prevent a channel from being preempted by another device. Likewise, the third sequences T shown in Table 2d and the second sequences M shown in Table 2e that are in a one-to-one correspondence with the sequences in Table 2c may be induced based on Table 2c. Optionally, the first sequence may also be formed by repeating any sequence in Table 2e for N times. In this case, the second sequence M corresponding to the first sequence still needs to be in a bit logical inversion relationship with the first sequence; or the sequence M is a sequence in Table 1 corresponding to that in Table 1c.

Example 3 of the first sequence S, the second sequence M, and the third sequence T.

In another implementation, a transmitter stores each sequence of 32 bits in Table 1 (alternatively, Table 1 may be obtained by storing Table 1a or Table 1b). However, duration of each bit is determined as 2 microseconds. Therefore, a total time length of each sequence in Table 1 (and Table 1a, Table 1b, Table 1c, Table 1d, and Table 1e) is obtained and is 64 microseconds. Optionally, duration of each bit may also be 4 microseconds, 8 microseconds, or 16 microseconds, so that a total time length of each sequence in Table 1 (and Table 1a, Table 1b, Table 1c, Table 1d, and Table 1e) is obtained and is 128 microseconds, 256 microseconds, or 512 microseconds.

TABLE 2c

| Number of a sequence | S(n) |
|---|---|
| 1 | 0 0 1 0 1 1 1 0 1 0 0 1 1 1 0 0 |
| 2 | 0 1 1 0 1 0 1 0 1 1 0 0 0 0 1 1 |
| 3 | 1 1 0 0 0 1 0 1 0 1 1 0 1 1 0 0 |
| 4 | 1 1 1 0 1 0 1 0 0 1 0 0 1 1 0 0 |

TABLE 2d

| Number of a sequence | T(n) |
|---|---|
| 1 | -1 -1 1 -1 1 1 1 -1 1 -1 -1 1 1 1 -1 -1 |
| 2 | -1 1 1 -1 1 -1 1 -1 1 1 -1 -1 -1 -1 1 1 |
| 3 | 1 1 -1 -1 1 1 -1 1 1 -1 1 -1 1 1 -1 -1 |
| 4 | 1 1 1 -1 1 -1 1 -1 -1 1 -1 -1 1 1 -1 -1 |

TABLE 2e

| Number of a sequence | M(n) |
|---|---|
| 1 | 1 1 0 1 0 0 0 1 0 1 1 0 0 0 1 1 |
| 2 | 1 0 0 1 0 1 0 1 0 0 1 1 1 1 0 0 |
| 3 | 0 0 1 1 1 0 1 0 1 0 0 1 0 0 1 1 |
| 4 | 0 0 0 1 0 1 0 1 1 0 1 1 0 0 1 1 |

In another implementation, the transmitter stores each sequence of 16 bits in Table 2 (alternatively, Table 2 may be obtained by storing table 2a or Table 2b), but duration of each bit is determined as 4 microseconds. Therefore, a total time length of each sequence in Table 2 (and Table 2a, Table 2b, Table 2c, Table 2d, and Table 2e) is obtained and is 64 microseconds. Optionally, duration of each bit may also be 4 microseconds, 8 microseconds, or 16 microseconds, so that a total time length of each sequence in Table 2 (and Table 2a, Table 2b, Table 2c, Table 2d, and Table 2e) is obtained and is 64 microseconds, 128 microseconds, or 256 microseconds.

When the preamble sequence (binary sequence) in the foregoing embodiments is applied to the transmitter or the receiver, there are the following technical effects:

A direct current component of the receiver is 0, and is not vulnerable to another direct current.

This helps the WUR detect whether a currently received packet is a WUP.

This helps distinguish a data rate used for the subsequent WUP payload.

The WUR achieves a better synchronization effect when decoding the WUP preamble.

The following briefly describes how to obtain the sequence in the foregoing Table 1 or Table 2, to enable the foregoing sequence to have the foregoing advantages in an application of the preamble. Whether a sequence feature in a wireless wake-up communications system is good needs to be represented in a receiving process of a receiver. In a binary-sequence receiving manner based on OOK, a correlator correlator is usually used to perform a correlation operation on a received signal, to determine whether the signal is a WUP preamble and find a start location of the WUP preamble, and accordingly, an end location of the WUP preamble can be calculated, where the end location is also a start location of WUP payload, as shown in FIG. 2.

For ease of description, any sequence in Table 1 is defined as S(n), and S(n) is used to generate the WUR preamble described below. First, based on S(n), a preamble sequence may be generated as follows:

$$SS(n)=[S(n)\ S(n)], \quad (1).$$

A sequence that correlates with S(n) is defined as T(n), and T(n) is also obtained based on S(n), as shown in Table 2:

$$T(n)=S(n)*2-1 \quad (2).$$

n is a discrete expression of a time-sampling point, and may be understood as an instantaneous moment. It is easily learned that T(n) is a result obtained only after keeping all 1 in S(n) unchanged, but setting all 0 to −1.

Another preamble sequence M(n) continues to be obtained based on S(n), as shown in Table 3:

$$M(n)=NOT(S(n)) \quad (3).$$

NOT represents a logical negation operation. To be specific, a negation operation is performed on bits in S(n). In other words, 0 and 1 in S(n) are respectively set to 1 and 0.

During correlation, the receiver separately performs a correlation operation on SS(n) and T(n) and on M(n) and T(n). To be accurate, mathematical expressions of these correlation operations are:

$$C1(\tau)=\Sigma-\infty\infty SS(n)\times T(n-\tau) \quad (4); \text{ and}$$

$$C2(\tau)=\Sigma-\infty\infty M(n)\times T(n-\tau) \quad (5).$$

C1(τ) is a correlation operation result of S(n) and T(n), and τ is a time shift.

Some operations are defined: abs( ) is an absolute value operation, max( ) is an operation of obtaining a maximum value, 2ndmax( ) is an operation of obtaining a second maximum value, and min( ) is an operation of obtaining a minimum value. Two sequence performance standards are defined:

$$ACMetric\_SS=(\max\ abs((C1(\tau))))/(2ndmax\ (abs(C1(\tau)))) \quad (6); \text{ and}$$

$$ACMetric\_M=(\max\ (abs(C2(\tau))))/(2ndmax\ (abs(C2(\tau)))) \quad (7).$$

According to expression (2), expressions (6) and (7) are equivalent to the following expressions (8) and (9):

$$ACMetric\_SS=(\min(C1(\tau)))/(2ndmax\ (abs(C1(\tau)))) \quad (8); \text{ and}$$

$$ACMetric\_M=(\max(C2(\tau)))/(2ndmax\ (abs(C2(\tau)))) \quad (9).$$

In addition, for ease of implementation, based on expression (3), expression (2) may also be converted into:

$$T(n)=M(n)*2-1 \quad (10).$$

In this case, expressions (6) and (7) are equivalent to the following expression (11) and (12):

$$ACMetric\_SS=(\max(C1(\tau)))/(2ndmax\ (abs(C1(\tau)))) \quad (11); \text{ and}$$

$$ACMetric\_M=(\min(C2(\tau)))/(2ndmax\ (abs(C2(\tau)))) \quad (12).$$

The following uses an example to randomly select a sequence in Table 1, and calculate a correlation result. For example, the result shown in FIG. 4 is obtained after calculation is performed on the sequence 167 by using software MATLAB based on the correlation operation of operation equations (1) to (5). A solid line in FIG. 4 represent the calculation result of expression (4), and a dashed line in FIG. 4 represent the calculation result of expression (5). It may be obtained from the figure that, for the solid line, a result obtained based on expression (6) is 16/2=8. For the dashed line, a result obtained based on expression (7) is 16/3=5.3. A result obtained by using the solid lines is a maximum value that can be obtained based on expressions (1) to (7) in all sequences of 32 bits, and a result obtained by using the dashed lines is a maximum value that can be obtained when the maximum value 8 in expression (6) is obtained based on the solid line and the manners in expressions (1) to (7) are considered.

The following explains why a 32-bit-length binary sequence with such a feature is expected to be traversed. Reasons are as follows according to sub-clause 1.2:

First, it is further required that quantities of 0 and 1 should be the same in a found binary sequence. Quantities of 1 and −1 in the local sequence T(n) of the receiver may be the same. In this way, when the receiver locally generates a signal T(n), a direct current component is 0 (the direct current component may be simply understood as an average value, and a direct current component in a circuit is vulnerable to influence of another direct current. Therefore, usually, it is expected that a smaller direct current component in a signal is better).

Second, the WUP preamble is expected to indicate two lengths. Because two preamble sequences SS(n) and M(n) can be directly obtained from all sequences S(n) in Table 1, only S(n) needs to be stored in the transmitter. Only a local sequence T(n) needs to be stored in the receiver for performing a correlation operation. If the transmitter sends a WUP payload rate, a preamble of this segment of the WUR payload is one of SS(n) and M(n). After receiving the preamble and completing correlation with the local T(n), the receiver obtains one of results in FIG. 4, that is, the dashed line or the solid line. It can be seen that the dashed-line and solid-line results in FIG. 4 differ greatly. In particular, peaks thereof, being 16 and −16 respectively, have completely equal absolute values, but have completely opposite signs. In this way, the receiver may determine, by analyzing a plus or minus sign (or polarity) of a peak, which type of WUP preamble is received by the receiver. In addition, for the solid-line result, the receiver may determine again that the preamble is SS(n) based on two peaks that appear. In this manner, a determining correct ratio of SS(n) is higher than that of M(n). Such a detection manner not only distinguishes different WUP payload data rates, but also simplifies complexity of the receiver. Only one group of local sequences T(n) need to be stored, and only one correlation operation needs to be performed.

Third, it can be learned that a maximum value of absolute values of the correlation values is 16 in FIG. 4. A larger value is better, and a larger maximum value better helps the WUR find the peak in a noise and interference environment, so that the WUR receiver determines that the WUR receiver receives a WUP preamble. After performing a correlation operation, the receiver always determines, depending on whether a maximum value of absolute values of a correlation result exceeds a threshold, whether the receiver receives the WUP preamble. Assuming that if the maximum value of the absolute value is only 12 or less, and a threshold of correlation detection is set to 10, once SS(n) or M(n) is affected by noise and other interference, it is very likely that a maximum value of an absolute value that meets the threshold requirement 10 cannot be found in the correlation values. In conclusion, the larger maximum value of the absolute value better helps the receiver correctly determine whether the WUP preamble is received. After SS(n) and M(n) generated by all sequences S(n) in Table 1 are all correlated with T(n), maximum values of absolute values are all 16, and the maximum value 16 of the absolute value is a possible maximum absolute value obtained under the condition a) after all 32-hit binary sequences are correlated based on expressions (3) and (4).

Fourth, it may be further learned that max(abs(C1($\tau$)))=16 and max(abs(C2($\tau$)))=16 in FIG. 4. In addition, 2ndmax(abs (C1($\tau$)))=2, and 2ndmax(abs(C2($\tau$)))=3. In this way, an advantage is achieved, that is, when there is influence such as noise and interference, locations of max(abs(C1($\tau$))) and max(abs(C2($\tau$))) can still be easily found. Because ACMetric_SS and ACMetric_M are respectively 8 and 5.3, the start location of the WUP preamble can be easily found. For example, if a difference between max(abs(C1($\tau$))) and the second maximum value and between max(abs(C2($\tau$))) and the second maximum value is small, once there is influence such as noise and interference, a maximum value of an absolute value may easily appear at another location. For example, if max(abs(C1($\tau$))) is 16, but 2ndmax(abs(C1($\tau$))) is 14, once there is influence of noise and interference, 2ndmax(ahs(C1($\tau$))) is very likely to be increased to 17, the receiver calculates the start point of the WUP preamble based on the current max(C1($\tau$))=17. Consequently, a result is apparently inaccurate, and directly causes the subsequent WUP payload part to be incorrectly decoded. In conclusion, a larger ACMetric_SS and a smaller ACMetric_M are better, and facilitate time synchronization precision. All sequences in Table 1 have a relationship that ACMetric_SS and ACMetric_M are respectively 8 and 5.3. This is a possible maximum value of ACMetric_SS that can be attained when sequences of 32 bits that are obtained by using a traversal algorithm meet conditions a) and b). When it is ensured that ACMetric_SS reaches the maximum value 8, a maximum attainable value of ACMetric_M is 5.3. In search for such a binary sequence of 32 bits, it is always first ensured that AC-Metric_SS reaches a maximum value 8, and then whether ACMetric_M of the sequence can reach 5.3 is calculated. If ACMetric_M reaches 5.3, the sequence meets the requirement.

Correspondingly, a sending apparatus for wake up applicable to the foregoing sending apparatus and a receiving apparatus for wake-up applicable to the foregoing receiving apparatus are further provided.

Referring to FIG. 5, a sending apparatus 600 for wake-up mainly includes a transmitter. The transmitter may include a transmit circuit, a power controller, an encoder, and an antenna.

Figure 6:
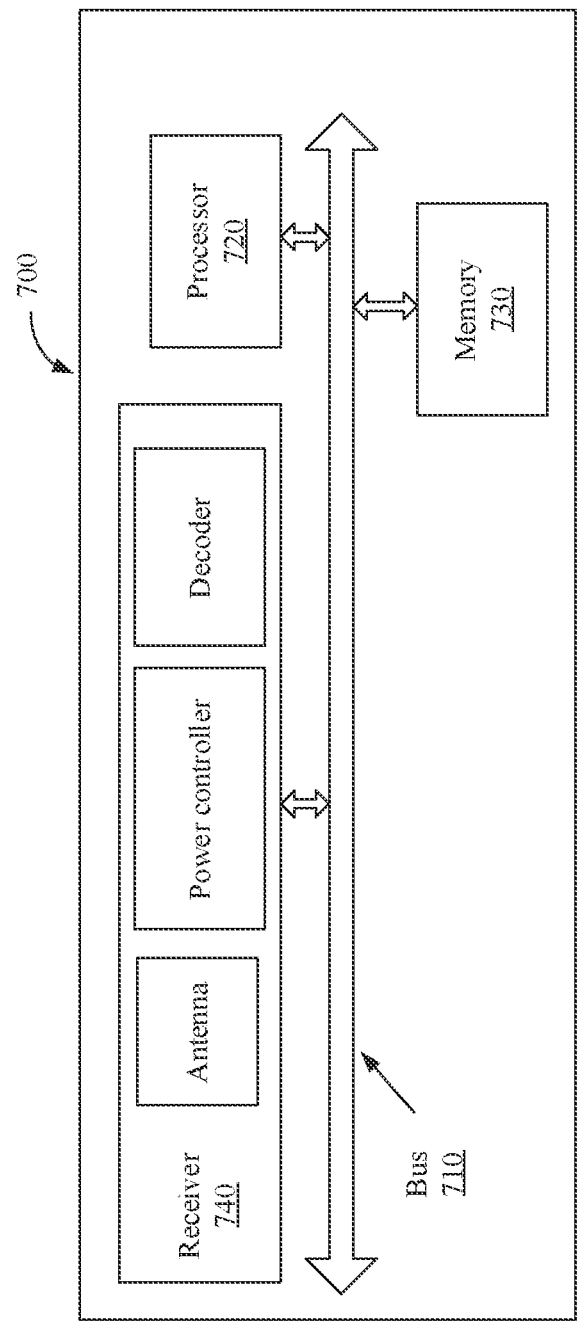
FIG. 6 is a schematic structural diagram of a receiving apparatus for wake-up according to an embodiment of the present invention.

Referring to FIG. 6, a receiving apparatus 700 for wake-up mainly includes a receiver. The receiver may include a receive circuit, a power controller, a decoder, and an antenna.

The sending apparatus 600 or the receiving apparatus 700 may further include a processor and a memory. The processor may further be referred to as a CPU. The memory may include a read-only memory and a random access memory, and provide an instruction and data to the processor. A part of the memory may further include a non-volatile random access memory (NVRAM).

In a specific application, the sending apparatus 600 or the receiving apparatus 700 may be built in or may be a wireless communications device such as a terminal device or an access point, and may further include a carrier accommodating a transmit circuit and the receive circuit, to allow data transmission and receiving between the sending apparatus and the receiving apparatus and a remote location. The transmit circuit and the receive circuit may be coupled into the antenna. Components of the sending apparatus 600 and the receiving apparatus 700 may be coupled together by using a bus. In addition to a data bus, the bus further includes a power bus, a control bus, and a status signal bus. However, for the purpose of clarity, various buses are all marked as the bus in figures. In different specific products, the decoder may be integrated with a processing unit.

The processor can implement or perform the steps and the logical block diagrams that are disclosed in the apparatus embodiments of the present invention. A general-purpose processor may be a microprocessor, or the processor may be any conventional processor, decoder, or the like. The steps of the apparatus disclosed with reference to the embodiments of the present invention may be directly presented as being executed and completed by a hardware processor, or executed and completed by a combination of hardware in a decoding processor and a software module. The software module may be located in a mature storage medium in the art, such as a random access memory, a flash memory, a read-only memory, a programmable read-only memory, or an electrically erasable programmable memory.

It should be understood that in the embodiments of the present invention, the processor may be a central processing unit (Central Processing Unit, "CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide an instruction and data for the processor. A part of the memory may further include a non-volatile random access memory. For example, the memo may further store information about a device type.

In addition to a data bus, a bus system may further include a power source bus, a control bus, a status signal bus, and the like. However, for clear description, various types of buses in the figures are marked as the bus system.

In an implementation process, the steps in the foregoing apparatus may be completed by using an integrated logic circuit of hardware in the processor, or using an instruction in a form of software. The steps of the apparatus disclosed with reference to the embodiments of the present invention may be directly presented as being executed and completed by a hardware processor, or executed and completed by a combination of hardware in a processor and a software module. The software module may be located in a mature storage medium in the art, such as a random access memory, a flash memory, a read-only memory, a programmable read-only memory, an electrically erasable programmable memory, and a register. The storage medium is located in the memory, and the processor reads information from the memory and completes the steps in the foregoing apparatus with reference to hardware thereof. To avoid repetition, details are not described herein again.

A resource scheduling device 600 according to the embodiments of the present invention may correspond to a receiving apparatus (for example, a terminal device) of apparatuses of the embodiments of the present invention. In addition, each unit, namely, each module, in the resource scheduling device 600 and the foregoing other operations and/or functions are separately intended to implement the corresponding procedure of an apparatus 200. For clarity, details are not described herein again.

In the resource scheduling device according to the embodiments of the present invention, at least some bits in a bit sequence are used to indicate whether one or more of resource block locations possibly obtained by dividing a to-be-allocated frequency domain resource is a to-be-allocated resource block actually obtained by dividing the to-be-allocated frequency domain resource, and based on a distribution status of the to-be-allocated resource blocks actually obtained by dividing the to-be-allocated frequency domain resource and with reference to the resource block locations possibly obtained by dividing the to-be-allocated frequency domain resource, bit sequences of different lengths can be generated flexibly. Therefore, transmission resource overheads of resource scheduling can be reduced.

It should be understood that in various embodiments of the present invention, sequence numbers of the foregoing processes do not mean execution sequences. The execution sequences of the processes should be determined based on functions and internal logic of the processes, and shall not constitute any limitation on the implementation processes of the embodiments of the present invention.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different apparatuses to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, refer to a corresponding process in the foregoing apparatus embodiments, and details are not described herein again.

In the several embodiments provided in this application, it should be understood that the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a transmitting apparatus, or the like) to execute all or some of the steps of the method in the embodiments of the present invention. The storage medium includes any medium, such as a USB flash drive, a removable hard disk, a read-only memory (read-only memory, ROM), a random access memory (random access memory, RAM), a magnetic disk, or an optical disc that can store program code.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention should be subject to the protection scope of the claims.

The invention claimed is:

1. An apparatus, comprising:
   at least one processor;
   one or more memories coupled to the at least one processor and storing programming instructions for execution by the at least one processor to obtain a wake-up packet (WUP), wherein the WUP comprises a preamble sequence having a synchronization function, and wherein:

the preamble sequence comprises two consecutive first sequences S, wherein the two consecutive first sequences S are used to indicate that a data rate used for a WUP payload of the WUP is a first value; and a transceiver, the transceiver configured to send the WUP, wherein:

the first sequence S has a length of 32 bits, and the first sequence S is

[1 0 1 0 0 1 0 0
1 0 1 1 1 0 1 1
0 0 0 1 0 1 1 1
0 0 1 1 1 0 0 0].

2. The apparatus according to claim 1, wherein a time of each bit in the first sequence S is 2 microseconds.

3. The apparatus according to claim 1, wherein the first value is 62.5 kbps or 250 kbps.

4. The apparatus according to claim 1, wherein the apparatus is an Internet of Things station (IoT STA) in an IoT network.

5. The apparatus according to claim 1, wherein the apparatus is an access point station (AP STA) in a wireless local area network (WLAN).

6. The apparatus according to claim 1, wherein the apparatus is a non-access-point station (non-AP STA) in a wireless local area network (WLAN).

7. A method, comprising:

receiving, by a receiving apparatus, a wake-up packet (WUP); and determining that a sequence in the WUP is a wake-up preamble sequence, wherein the sequence in the WUP comprises two consecutive first sequences S, or determining that the sequence in the WUP comprises a second sequence M, wherein the two consecutive first sequences S are used to indicate that a data rate used for a WUP payload of the WUP is a first value, wherein the second sequence M is used to indicate that a data rate used for the WUP payload of the WUP is a second value, wherein the second sequence M and a first sequence S are in a bit logical negation relationship, and wherein:

the first sequence S has a length of 32 bits, and the first sequence S is

[1 0 1 0 0 1 0 0
1 0 1 1 1 0 1 1
0 0 0 1 0 1 1 1
0 0 1 1 1 0 0 0].

8. The method according to claim 7, wherein determining that the sequence in the WUP is the wake-up preamble sequence, comprises:

performing correlation processing on the sequence of the WUP and a third sequence T stored in the receiving apparatus, and determining that the sequence of the WUP is the wake-up preamble sequence based on a correlation processing result, wherein T meets one of the following relationships: T=S*2−1, T=[2 consecutive Ss]*2−1, T=M*2−1, or T=[2 consecutive Ms]*2−1.

9. The method according to claim 8, wherein determining that the sequence in the WUP is the wake-up preamble sequence based on the correlation processing result comprises:

when an absolute value of either a maximum value or a minimum value of the correlation processing result is greater than or equal to a threshold, determining that the wake-up preamble sequence is correctly detected; and determining whether the two consecutive first sequences S or the second sequence M are or is received by determining a plus/minus sign of a value whose absolute value is the maximum value.

10. The method according to claim 7, wherein a time of each bit in the first sequence S is 2 microseconds.

11. The method according to claim 7, wherein the first value is 62.5 kbps, and wherein the second value is 250 kbps.

12. The method according to claim 7, wherein the receiving apparatus is an Internet of Things station (IoT STA) in an IoT network.

13. The method according to claim 7, wherein receiving apparatus is an access point station (AP STA) in a wireless local area network (WLAN).

14. An apparatus, comprising:

a transceiver, the transceiver configured to receive a data packet, wherein the data packet includes a wake-up packet (WUP);

at least one processor; and one or more memories coupled to the at least one processor and storing programming instructions for execution by the at least one processor to:

determine that a sequence in the data packet is a wake-up preamble sequence, wherein the sequence comprises two consecutive first sequences S, or determine that the sequence comprises a second sequence M, wherein the two consecutive first sequences S are used to indicate that a data rate used for a WUP payload of the WUP is a first value, wherein the second sequence M is used to indicate that a data rate used for the WUP payload of the WUP is a second value, wherein the second sequence M and a first sequence S are in a bit logical negation relationship, and wherein:

the first sequence S has a length of 32 bits, and the first sequence S is

[1 0 1 0 0 1 0 0
1 0 1 1 1 0 1 1
0 0 0 1 0 1 1 1
0 0 1 1 1 0 0 0].

15. The apparatus according to claim 14, wherein determining that the sequence in the data packet is the wake-up preamble sequence, comprises:

performing correlation processing on the sequence of the WUP and a third sequence T stored in the apparatus, and determining that the sequence of the WUP is the wake-up preamble sequence based on a correlation processing result, wherein T meets one of the following relationships: T=S*2−1, T=[2 consecutive Ss]*2−1, T=M*2−1, or T=[2 consecutive Ms]*2−1.

16. The apparatus according to claim 15, wherein determining that the sequence of the WUP is the wake-up preamble sequence based on the correlation processing result comprises:

when an absolute value of either a maximum value or a minimum value of the correlation processing result is greater than or equal to a threshold, determine that the wake-up preamble sequence is correctly detected; and determine whether the two consecutive first sequences S or the second sequence M are or is received by determining a plus/minus sign of a value whose absolute value is the maximum value.

17. The apparatus according to claim 14, wherein a time of each bit in the first sequence S is 2 microseconds.

18. The apparatus according to claim 14, wherein the first value is 62.5 kbps, and wherein the second value is 250 kbps.

19. The apparatus according to claim 14, wherein the apparatus is an Internet of Things station (IoT STA) in an IoT network.

20. The apparatus according to claim 14, wherein the apparatus is an access point station (AP STA) in a wireless local area network (WLAN).

* * * * *